(12) United States Patent
Tanaka et al.

(10) Patent No.: US 7,911,885 B2
(45) Date of Patent: Mar. 22, 2011

(54) RECORDING CONTROL DEVICE AND METHOD, PROGRAM, AND RECORDING MEDIUM

(75) Inventors: Hisao Tanaka, Tokyo (JP); Takashi Furukawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/524,227

(22) PCT Filed: Jun. 9, 2004

(86) PCT No.: PCT/JP2004/008394
§ 371 (c)(1),
(2), (4) Date: Feb. 9, 2005

(87) PCT Pub. No.: WO2004/112023
PCT Pub. Date: Dec. 23, 2004

(65) Prior Publication Data
US 2005/0270825 A1    Dec. 8, 2005

(30) Foreign Application Priority Data

Jun. 11, 2003 (JP) .............................. P2003-165858

(51) Int. Cl.
    *G11C 11/00* (2006.01)
(52) U.S. Cl. ......... 369/30.04; 386/95; 386/98; 386/112; 386/126; 369/59.25; 369/30.3; 369/30.07; 369/30.25
(58) Field of Classification Search .............. 386/95, 386/98, 112, 125, 126; 369/59.25, 30.04, 369/32.01, 30.07, 30.3, 30.25, 30.37, 275.3
See application file for complete search history.

(56) References Cited

U.S. PATENT DOCUMENTS

| | | | | |
|---|---|---|---|---|
| 5,802,245 | A * | 9/1998 | Kunihiro | 386/98 |
| 6,115,202 | A * | 9/2000 | Yoshida et al. | 360/72.2 |
| 6,118,754 | A * | 9/2000 | Sako et al. | 369/275.3 |
| 6,330,392 | B1 * | 12/2001 | Nakatani et al. | 386/52 |
| 6,363,212 | B1 * | 3/2002 | Fujinami et al. | 386/104 |
| 6,496,896 | B1 * | 12/2002 | Inoue | 710/306 |
| 6,633,515 | B1 * | 10/2003 | Van Nieuwenhoven et al. | 369/30.04 |
| 6,904,095 | B1 * | 6/2005 | Wilkinson et al. | 375/240.26 |
| 2001/0010752 | A1 | 8/2001 | Ando et al. | |
| 2001/0020261 | A1 * | 9/2001 | Ando et al. | 711/4 |
| 2002/0034144 | A1 * | 3/2002 | Kotani | 369/59.25 |
| 2002/0164149 | A1 * | 11/2002 | Wilkinson | 386/46 |
| 2003/0085997 | A1 * | 5/2003 | Takagi et al. | 348/143 |

(Continued)

FOREIGN PATENT DOCUMENTS

EP          11118998      *  3/2000

(Continued)

*Primary Examiner* — Wayne R Young
*Assistant Examiner* — Linh T Nguyen
(74) *Attorney, Agent, or Firm* — Frommer Lawrence & Haug LLP; William S. Frommer; Thomas F. Presson

(57) ABSTRACT

A recording medium and having efficiency of a reading and a writing process. Audio annual ring data, video annual ring data, low-resolution annual ring data, and meta annual ring data extracted from data series of metadata, an audio file, a video file, and low resolution data are written to a free space on an optical disk in order of a body, a footer, and a header in order to improve the convenience of the recording medium by enabling a quick edit process. For example, the efficiency of the reading and writing process is improved by preventing occurrence of an unnecessary writing process.

3 Claims, 56 Drawing Sheets

U.S. PATENT DOCUMENTS

| | | | |
|---|---|---|---|
| 2003/0097462 A1* | 5/2003 | Parent et al. | 709/236 |
| 2003/0180031 A1* | 9/2003 | Kikuchi et al. | 386/46 |
| 2004/0057704 A1* | 3/2004 | Katsuo et al. | 386/125 |
| 2004/0244047 A1* | 12/2004 | Shinkai et al. | 725/115 |
| 2005/0025460 A1* | 2/2005 | Hyodo et al. | 386/95 |
| 2007/0067468 A1 | 3/2007 | Hyodo et al. | |

FOREIGN PATENT DOCUMENTS

| | | |
|---|---|---|
| EP | 1 118 998 | 7/2001 |
| EP | 1 357 554 | 10/2003 |
| EP | 1 426 958 | 6/2004 |
| EP | 1 427 217 | 6/2004 |
| JP | 58 53010 | 3/1983 |
| JP | 59-212968 | 12/1984 |
| JP | 8 102148 | 4/1996 |
| JP | 11 238361 | 8/1999 |
| JP | 2002-57979 | 2/2002 |
| JP | 2002-218398 | 8/2002 |
| JP | 2002-230952 | 8/2002 |
| JP | 2002218398 A * | 8/2002 |
| JP | 2004-508777 | 3/2004 |
| JP | 2004-112425 | 4/2004 |
| JP | 2004-336593 | 11/2004 |
| WO | WO 00/14740 | 3/2000 |
| WO | WO 02/21845 | 3/2002 |
| WO | WO 2004 100543 | 11/2004 |

* cited by examiner

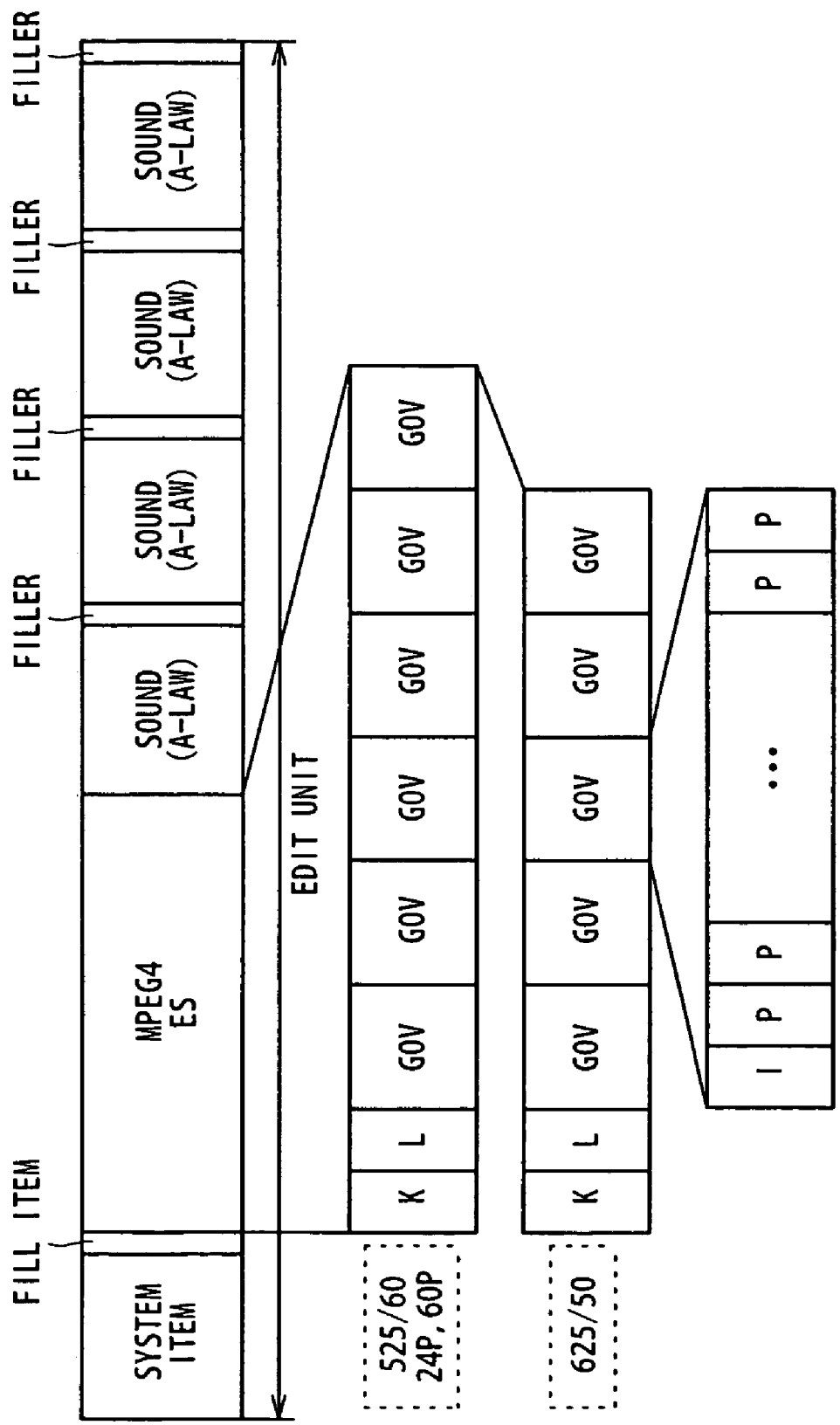

F I G. 2 3

|  | VALUE | GOV | FRAME/GOV |
|---|---|---|---|
| 525/60 | 384000 | 64000 | 10 |
| 24P | 384000 | 64000 | 8 |
| 60P | 384000 | 64000 | 20 |
| 626/50 | 384000 | 76800 | 10 |

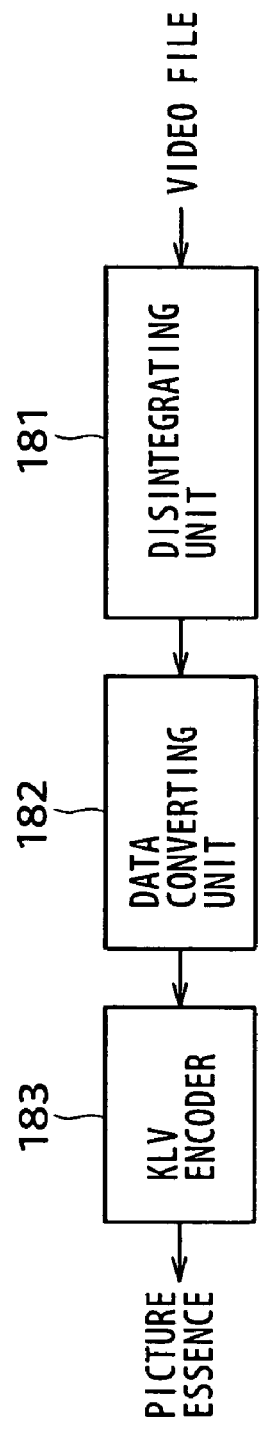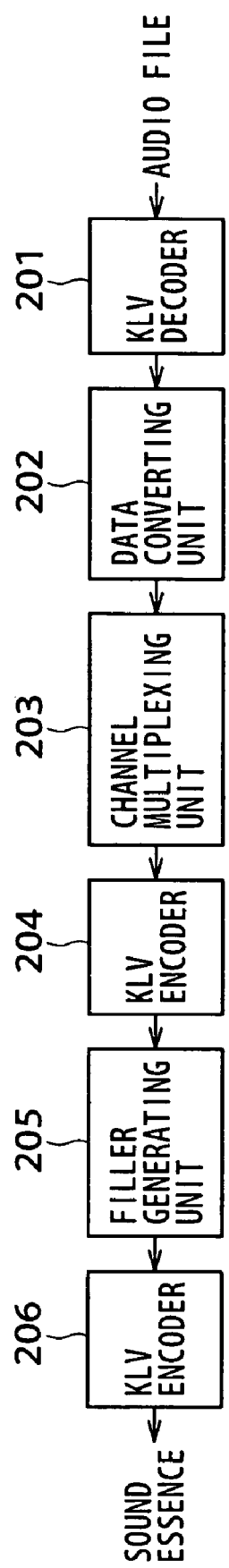

F I G. 36
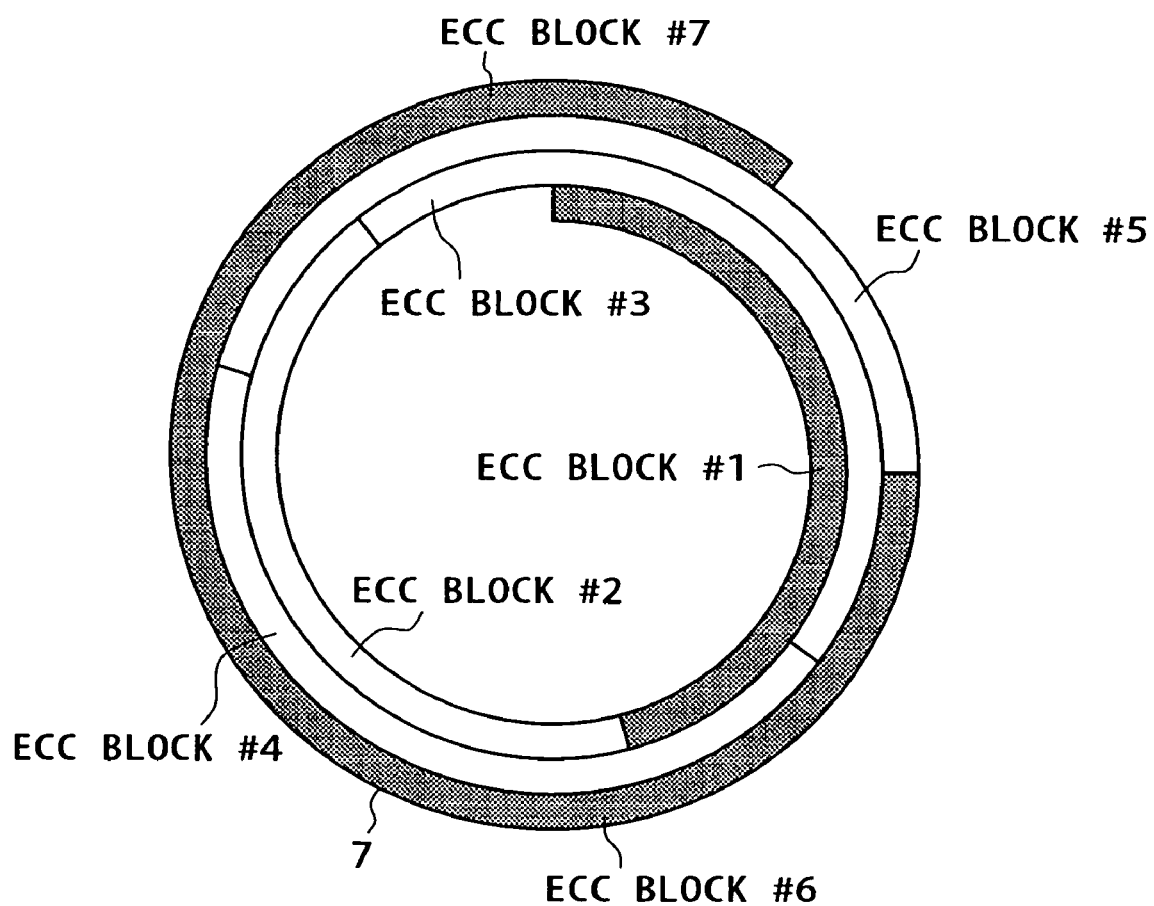

F I G. 47
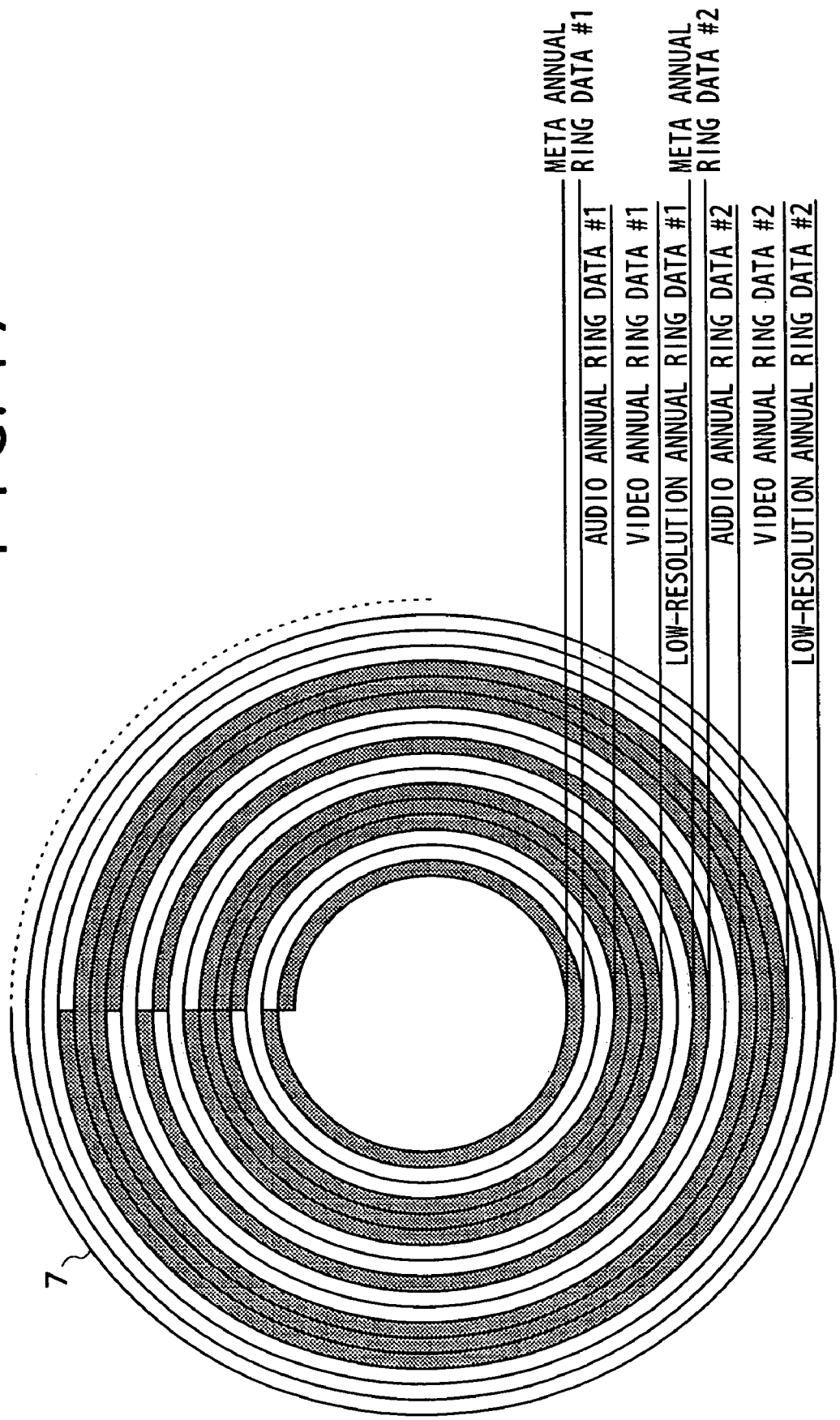

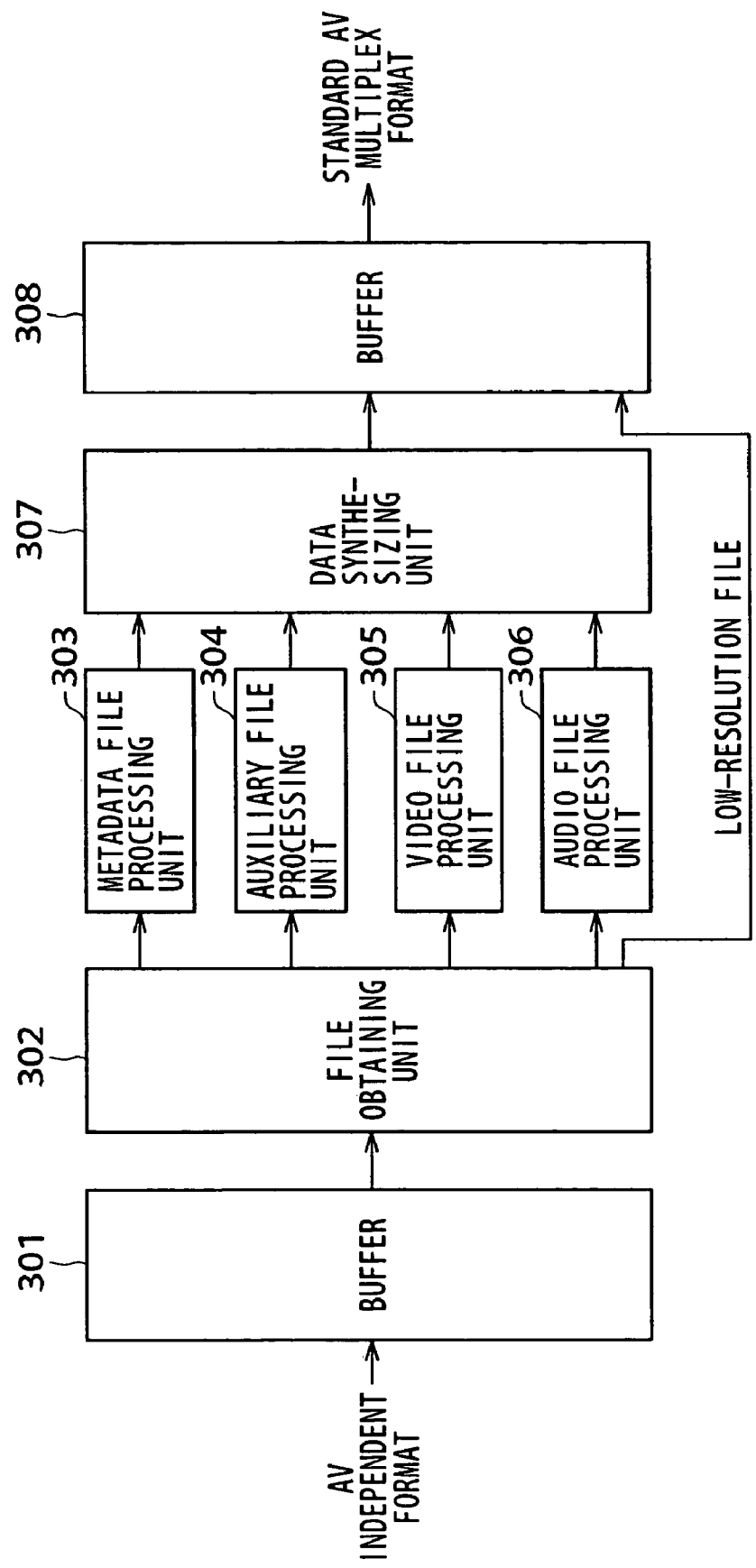

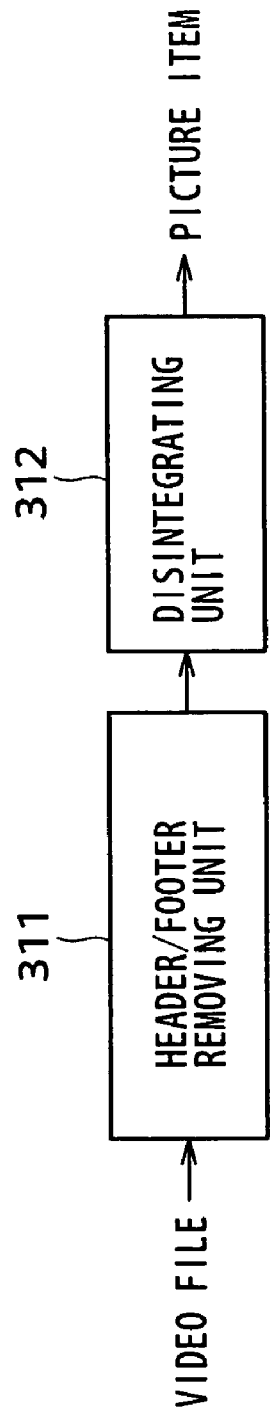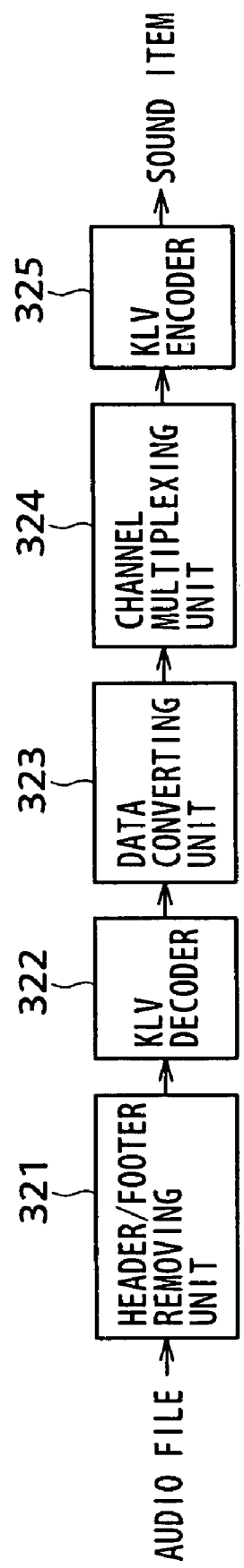

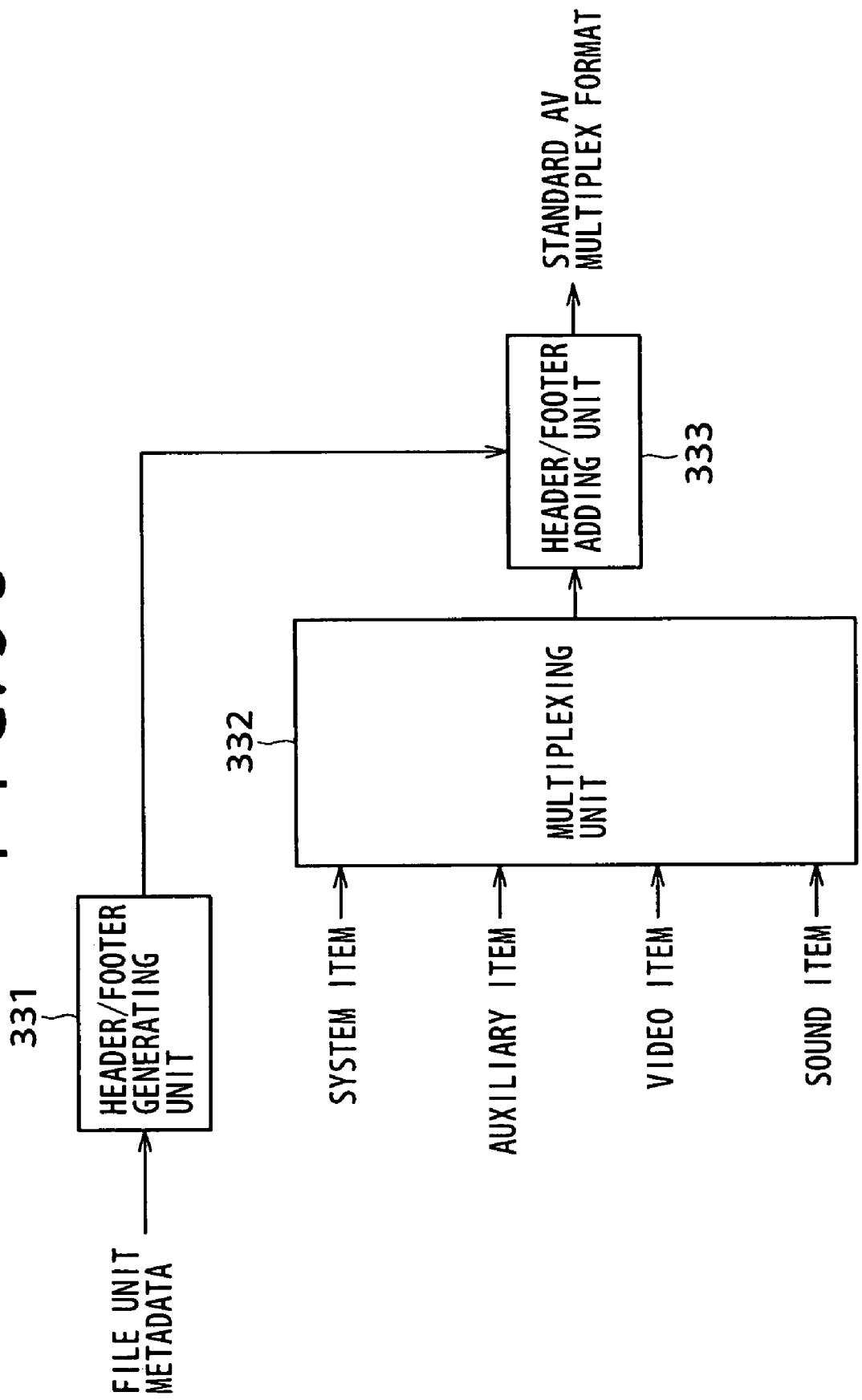

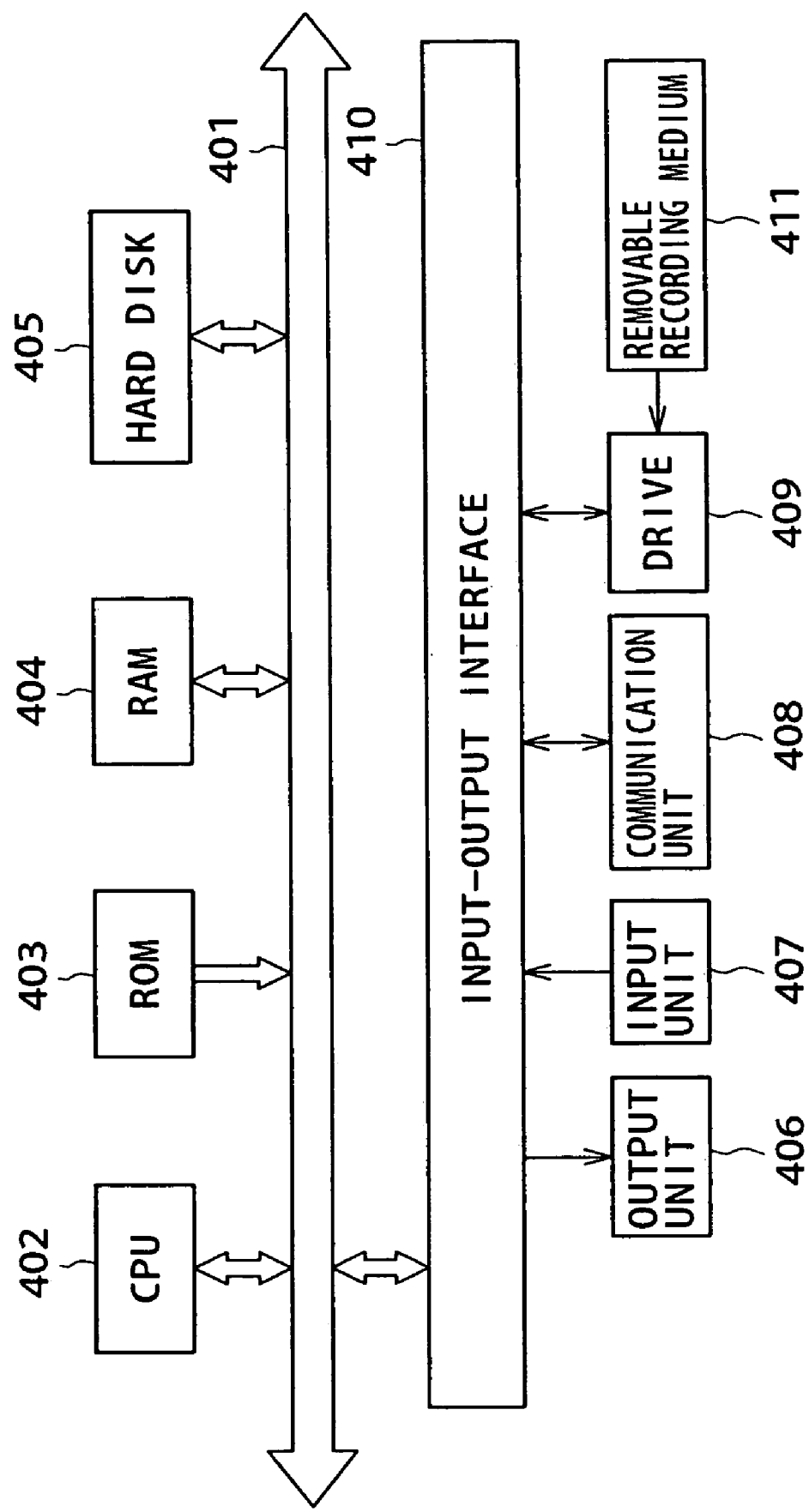

RECORDING CONTROL DEVICE AND METHOD, PROGRAM, AND RECORDING MEDIUM

TECHNICAL FIELD

The present invention relates to an apparatus and a method for recording control, a program, and a recording medium, and particularly to an apparatus and a method for recording control, a program, and a recording medium that record files.

BACKGROUND ART

Recently, with standardization of communication protocols and the like, and lower prices and the like of communication devices, personal computers having a communication I/F (Interface) as standard have become common.

In addition to the personal computers, broadcast apparatus for business use such for example as AV (Audio Visual) servers and VTRs (Video Tape Recorders) which apparatus have a communication I/F as standard or are capable of being provided with a communication I/F have become common. Such broadcast apparatus exchange files of video data and audio data (both will hereinafter be referred to collectively as AV data as appropriate) with each other.

Conventionally, as a format of a file to be exchanged between broadcast apparatus, each type of apparatus or each manufacturer, for example, generally uses an original format. It is therefore difficult to exchange files between broadcast apparatus of different apparatus types or manufacturers.

Accordingly, as a format for file exchange, MXF (Material exchange Format), for example, is proposed and is now being standardized.

MXF is a format in which not only file exchange but also streaming is taken into consideration, and in which video data and audio data are multiplexed in small units such as frames or the like.

As described above, in MXF, video data and audio data are multiplexed in each frame unit in consideration of streaming. It is therefore difficult to capture an MXF file in a storage in a broadcast apparatus and edit video data and audio data separately from each other (AV independent editing).

There is accordingly a method of capturing an MXF file in a broadcast apparatus and thereafter converting the MXF file into a file in an original format. However, when the MXF file is converted into the file in the original format totally different from MXF and the file in the original format is recorded in a storage in the broadcast apparatus, it is difficult for another broadcast apparatus to handle the file.

Specifically, for example, even when a file in an original format recorded in a storage of a certain broadcast apparatus is accessed by another broadcast apparatus via a communication I/F such for example as IEEE (Institute of Electrical and Electronics Engineers) 1394 or USB (Universal Serial Bus), in a case where the other broadcast apparatus cannot understand the original format, the other broadcast apparatus cannot handle (for example read, in this case) the file in the original format.

Also, in a case where the storage in which the file in the original format is recorded in the certain broadcast apparatus is a removable recording medium such for example as an optical disk, even when the removable recording medium is loaded into the other broadcast apparatus, the other broadcast apparatus cannot handle the file in the original format if the other broadcast apparatus cannot understand the original format.

In addition, depending on a procedure for writing the file to the recording medium, there occurs a case where one data writing process needs to be performed twice, for example, and thus an unnecessary writing process can occur.

DISCLOSURE OF THE INVENTION

The present invention has been made in view of the above, and it is an object of the present invention to improve convenience of the recording medium by enabling a quick edit process, for example, and improve efficiency of a reading and a writing process by preventing occurrence of an unnecessary writing process.

According to the present invention, there is provided a recording control apparatus characterized by comprising: first generating means for generating second data logically disposed at a start of a file; and recording control means for performing recording control to record the file onto a recording medium such that first data of each data series is recorded so as to be disposed periodically and the second data is recorded next.

The recording control apparatus further comprises second generating means for generating third data logically disposed at an end of the file, wherein the recording control means can perform recording control to record the file onto the recording medium in temporal order of the first data, the third data, and the second data.

The recording control apparatus further comprises second generating means for generating third data that makes data amounts of the first data and the second data integral multiples of a unit of reading and writing of the recording medium, by being added to the first data or the second data, wherein the recording control means can perform recording control to record the first data made to have the data amount of an integral multiple of the unit of reading and writing of the recording medium by adding the third data onto the recording medium such that boundaries of the first data coincide with boundaries of the unit, and to record the second data made to have the data amount of an integral multiple of the unit by adding the third data onto the recording medium such that boundaries of the second data coincide with boundaries of the unit.

According to the present invention, there is provided a recording control method characterized by comprising: a generating step for generating second data logically disposed at a start of a file; and a recording control step for performing recording control to record the file onto a recording medium such that first data of each data series is recorded so as to be disposed periodically and the second data is recorded next.

According to the present invention, there is provided a program characterized by making a computer perform: a generating step for generating second data logically disposed at a start of a file; and a recording control step for performing recording control to record the file onto a recording medium such that first data of each data series is recorded so as to be disposed periodically and the second data is recorded next.

According to the present invention, there is provided a recording medium characterized in that first data is recorded on the recording medium such that the first data of each series is periodically disposed in predetermined data amounts separately, and following the first data, second data logically disposed at a start of a file is recorded on the recording medium.

The recording control apparatus and method and the program according to the present invention generate second data logically disposed at a start of a file, and record the file onto a recording medium such that first data of each data series is recorded so as to be disposed periodically and the second data is recorded next.

On the recording medium according to the present invention, first data is recorded such that the first data of each series is periodically disposed in predetermined data amounts separately, and following the first data, second data logically disposed at a start of a file is recorded.

BRIEF DESCRIPTION OF THE DRAWINGS

FIG. 22 is a diagram showing a structure of a picture essence;

FIG. 23 is a diagram of assistance in explaining data amounts of the picture essence having a KLV structure;

FIG. 26 is a block diagram of assistance in explaining a configuration of a video file processing unit;

FIG. 27 is a block diagram of assistance in explaining a configuration of an audio file processing unit;

FIG. 36 is a diagram showing a recorded state of audio data and video data on an optical disk;

FIG. 47 is a diagram showing a recorded state of data on the optical disk;

FIG. 50 is a block diagram showing an example of configuration of an independent/standard converting unit;

FIG. 51 is a block diagram showing an example of configuration of a video file processing unit;

FIG. 52 is a block diagram showing an example of configuration of an audio file processing unit;

FIG. 53 is a block diagram showing an example of configuration of a data synthesizing unit;

FIG. 59 is a block diagram showing an example of configuration of an embodiment of a computer to which the present invention is applied.

BEST MODE FOR CARRYING OUT THE INVENTION

Figure 1:
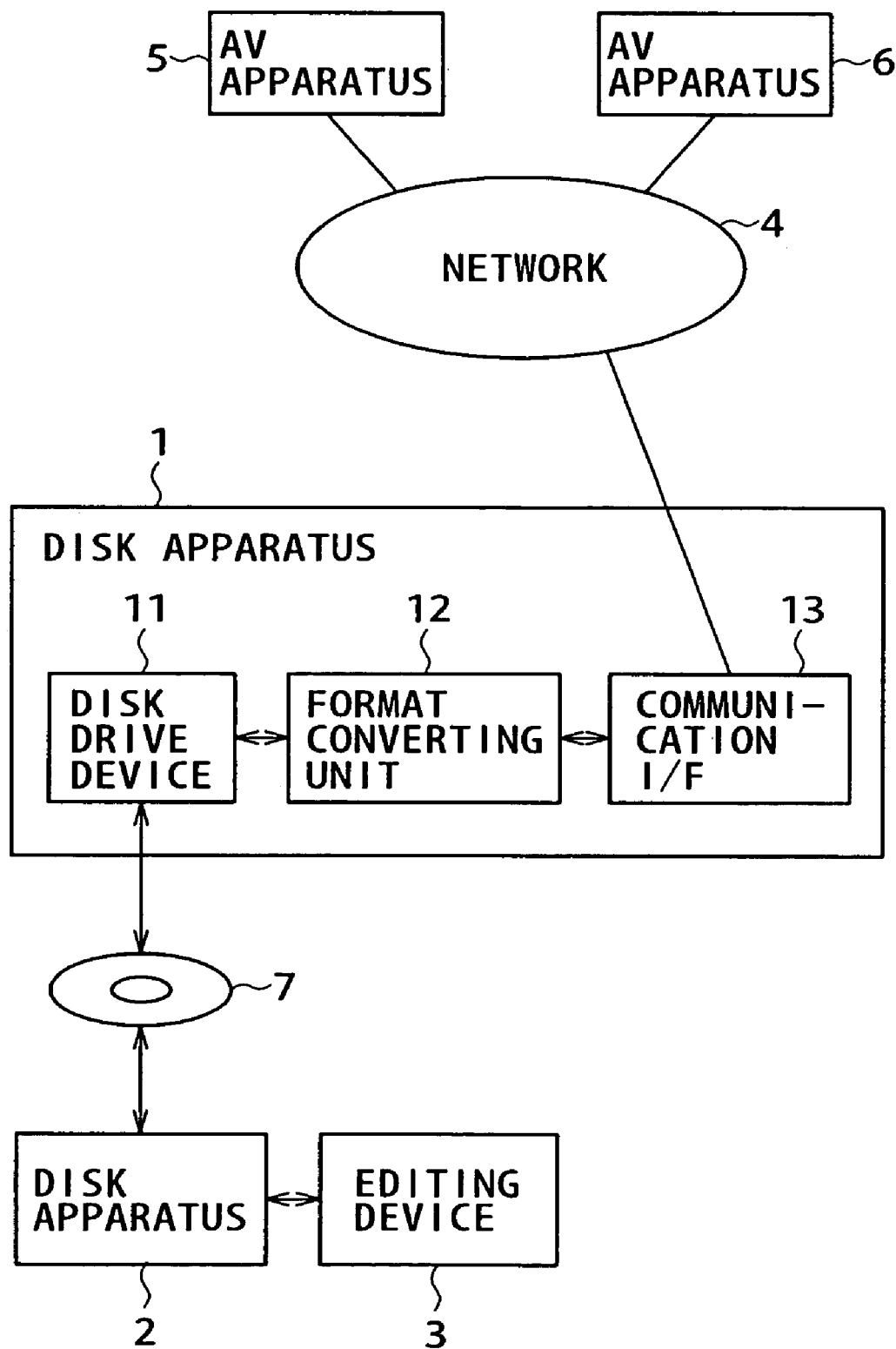
FIG. 1 is a block diagram showing an example of configuration of one embodiment of an AV network system to which the present invention is applied.

FIG. 1 shows an example of configuration of one embodiment of an AV network system (a system refers to a logical set of a plurality of apparatus regardless of whether each component apparatus is present within the same casing) to which the present invention is applied.

A disk apparatus 1 includes a disk drive device 11, a format converting unit 12, and a communication I/F 13. The disk apparatus 1 receives a file of AV data transmitted via a network 4, and records the file onto an optical disk 7. Also, the disk apparatus 1 reads a file of AV data recorded on the optical disk 7, and transmits the file via the network 4.

Specifically, the optical disk 7 can be loaded into and unloaded from the disk drive device 11. By driving the optical disk 7 loaded into the disk drive device 11, the disk drive device 11 records (writes) a file in an AV independent format to be described later which file is supplied from the format converting unit 12 onto the optical disk 7, and reads a file in the AV independent format from the optical disk 7 to supply the file to the format converting unit 12.

The format converting unit 12 converts the file in the AV independent format supplied from the disk drive device 11 into a file in a standard AV multiplex format to be described later, and then supplies the file to the communication I/F 13. Also, the format converting unit 12 converts a file in the standard AV multiplex format supplied from the communication I/F 13 into a file in the AV independent format, and then supplies the file in the AV independent format to the disk drive device 11.

The communication I/F 13 for example includes an IEEE (Institute of Electrical and Electronics Engineers) 1394 port, a USB (Universal Serial Bus) port, an NIC (Network Interface Card) for LAN (Local Area Network) connection, or an analog modem, a TA (Terminal Adapter) and DSU (Digital Service Unit), an ADSL (Asymmetric Digital Subscriber Line) modem or the like. The communication I/F 13 exchanges files in the standard AV multiplex format via the network 4 such as the Internet or an intranet, for example. Specifically, the communication I/F 13 transmits a file in the standard AV multiplex format supplied from the format converting unit 12 via the network 4, and receives a file in the standard AV multiplex format transmitted via the network 4 and then supplies the file in the standard AV multiplex format to the format converting unit 12.

In the thus configured disk apparatus 1, the communication I/F 13 receives a file in the standard AV multiplex format transmitted via the network 4, and then supplies the file in the standard AV multiplex format to the format converting unit 12. The format converting unit 12 converts the file in the standard AV multiplex format from the communication I/F 13 into a file in the AV independent format, and then supplies the file in the AV independent format to the disk drive device 11. Then, the disk drive device 11 records the file in the AV independent format from the format converting unit 12 onto the optical disk 7 loaded therein.

Further, in the disk apparatus 1, the disk drive device 11 reads a file in the AV independent format from the optical disk 7 loaded therein, and then supplies the file in the AV independent format to the format converting unit 12. The format converting unit 12 converts the file in the AV independent format from the disk drive device 11 into a file in the standard AV multiplex format, and then supplies the file in the standard AV multiplex format to the communication I/F 13. Then, the communication I/F 13 transmits the file in the standard AV multiplex format from the format converting unit 12 via the network 4.

Files in the standard AV multiplex format comply with an MXF standard, for example. A file in the standard AV multiplex format includes a header, a body, and a footer. Since the file in the standard AV multiplex format complies with the MXF standard, video data and audio data as AV data are multiplexed and disposed in one frame unit, for example, in the body.

AV apparatus 5 and 6 connected to the network 4 in FIG. 1 comply with the MXF standard, being able to handle files in compliance with the MXF standard. Thus the AV apparatus 5 and 6 can transmit files in the standard AV multiplex format to the disk apparatus 1 via the network 4. Further, the AV apparatus 5 and 6 can receive a file in the standard AV multiplex format transmitted from the disk apparatus 1 via the network 4. Thus, file exchange of files in the standard AV multiplex format can be performed between the disk apparatus 1 and the AV apparatus 5 and 6 via the network 4. Further, the AV apparatus 5 and 6 can subject a received file in the standard AV multiplex format to various processing including streaming reproduction and the like.

Apparatus complying with the current MXF standard such as the AV apparatus 5 and 6 will hereinafter be described as standard apparatus as appropriate.

A file in the AV independent format, on the other hand, includes a header, a body, and a footer as with files in the standard AV multiplex format. However, only the format of the body is different from that of the standard AV multiplex format. That is, in the case of files in the AV independent format, video data and audio data are included in different files. A video file as a file of video data has a header and a footer in the same form as a file in the standard AV multiplex format. However, the video file has video data disposed en bloc in a body thereof. Also, an audio file as a file of audio data has a header and a footer in the same form as a file in the standard AV multiplex format. However, the audio file has audio data disposed en bloc in a body thereof.

Hence, if a video file and an audio file in the AV independent format are transmitted from the disk apparatus 1 to the AV apparatus 5 and 6, the AV apparatus 5 and 6 as standard apparatus cannot handle video data and audio data disposed in the bodies of the video file and the audio file in the AV independent format unless the AV apparatus 5 and 6 support the AV independent format, but the AV apparatus 5 and 6 can handle the video file and the audio file in the AV independent format themselves. That is, the video file and the audio file in the AV independent format include a header, a body, and a footer as with files in the standard AV multiplex format. As the header and the footer, a header and a footer in the same format as that of files in the standard AV multiplex format are used. Therefore, unless "contents" of the body (data disposed in the body) are referred to, the video file and the audio file in the AV independent format themselves are equivalent to files in the standard multiplex AV format (comply with the standard AV multiplex format). Thus, even when the AV apparatus 5 and 6 as standard apparatus do not support the AV independent format, the AV apparatus 5 and 6 can handle the video file and the audio file in the AV independent format themselves.

Hence, only file exchange of files in the AV independent format can be performed between the disk apparatus 1 and the AV apparatus 5 and 6 as standard apparatus.

As described above, a file in the AV independent format is equivalent to a file in the standard AV multiplex format unless "contents" of the body are referred to. It can be said from this point of view that files in the AV independent format are compatible with files in the standard AV multiplex format.

In FIG. 1, the optical disk 7 can be loaded into and unloaded from a disk apparatus 2. As with the AV apparatus 5 and 6, the disk apparatus 2 is for example a standard apparatus. The disk apparatus 2 reads the video file and the audio file in the AV independent format from the optical disk 7 loaded therein, and then supplies the video file and the audio file in the AV independent format to an editing device 3.

That is, as described above, the video file and the audio file in the AV independent format are equivalent to files in the standard AV multiplex format unless "contents" of the bodies are referred to. Thus, the disk apparatus 2 as a standard apparatus can read the video file and the audio file in the AV independent format from the optical disk 7.

The editing device 3 supports the AV independent format, and is thus able to handle files in the AV independent format. The editing device 3 subjects the video file and the audio file in the AV independent format supplied from the disk apparatus 2 to AV independent editing, for example. The editing device 3 supplies the video file and the audio file in the AV independent format as a result of the editing to the disk apparatus 2.

Then, the disk apparatus 2 records the video file and the audio file in the AV independent format supplied from the editing device 3 onto the optical disk 7 loaded in the disk apparatus 2.

That is, as described above, the video file and the audio file in the AV independent format are equivalent to files in the standard AV multiplex format unless "contents" of the bodies are referred to. Thus, the disk apparatus 2 as a standard apparatus can record the video file and the audio file in the AV independent format onto the optical disk 7.

As described above, while a file in the standard AV multiplex format has video data and audio data multiplexed and disposed in one frame unit, for example, in the body of the file, a video file and an audio file in the AV independent format have video data and audio data disposed en bloc in the bodies of the video file and the audio file, thus facilitating editing such as AV independent editing or the like. Since the files in the AV independent format have a header and a footer in the same format as that of files in the standard AV multiplex format, unless contents of the bodies are referred to, the files in the AV independent format are compatible with files in the standard AV multiplex format. Thus, the files in the AV independent format can be handled by standard apparatus.

Figure 2:
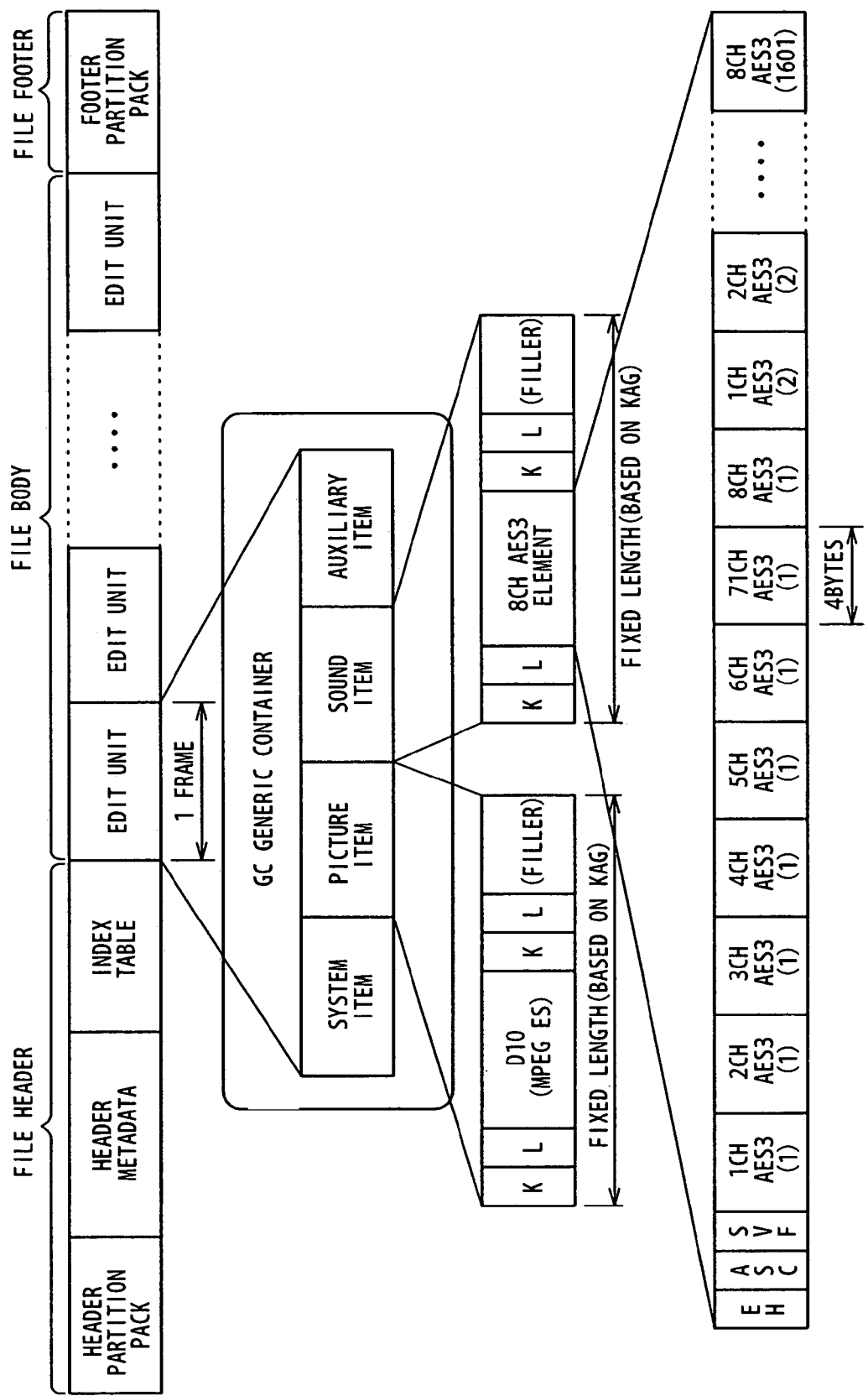
FIG. 2 is a diagram showing a standard AV multiplex format.

Next, FIG. 2 shows an example of the standard AV multiplex format.

FIG. 2 shows the standard AV multiplex format in a case where video data encoded by an MPEG (Moving Picture Experts Group) IMX system referred to as D10 and non-compressed audio data in an AES (Audio Engineering Society) 3 format are used as video data and audio data, respectively, disposed in the body.

Incidentally, video data and audio data in various other formats such as DV (Digital Video) and the like can be disposed in the body.

A file in the standard AV multiplex format is formed by sequentially disposing a header (File Header), a body (File Body), and a footer (File Footer) from a start of the file.

The header has a header partition pack (Header Partition Pack), header metadata (Header Metadata), an index table (Index Table) sequentially disposed from a start of the header. Disposed in the header partition pack are data for identifying the header, the format of data disposed in the body, information indicating a file format, and the like. Disposed in the header metadata are a date of creation of the file and file unit metadata such as information on data disposed in the body, for example. Disposed in the index table is a table indicating positions of edit units to be described later which units are disposed in the body.

In this case, the metadata includes a time code added to each frame or the like of a video file, a UMID (Unique Material Identifier), GPS (Global Positioning System) information indicating a position where image pickup by a video camera was performed, a date and time (year, month, day, hour, minute, and second) of the image pickup, ARIB (Association of Radio Industries and Businesses) metadata, information on setting/control of the video camera that performed the image pickup, and the like. Incidentally, the ARIB metadata is standardized by ARIB and superimposed by a standard communication interface such as an SDI (Serial Digital Interface) or the like. The information on setting/control of the video camera is for example an IRIS control value, a white balance/black balance mode, lens information on the zoom and focus of a lens, and the like.

Incidentally, the index table is an option, which may be included or omitted in the header. In addition to the index table, various optional data can be disposed in the header.

As the information indicating the file format which information is disposed in the header partition pack, information indicating the standard AV multiplex format is used in a file in the standard AV multiplex format, and information indicating the AV independent format is used in a file in the AV independent format. However, the format itself of the header partition pack is the same in the standard AV multiplex format and the AV independent format.

The footer includes a footer partition pack (Footer Partition Pack). Data for identifying the footer and the like are disposed in the footer partition pack.

The body includes one or more edit units (Edit Units). An edit unit is a unit for one frame, in which unit AV data for one frame and the like are disposed.

Specifically, an edit unit is formed by disposing a system item (System Item), a picture item (Picture Item), a sound item (Sound Item), and an auxiliary item (Auxiliary Item) from a start of the edit unit.

Disposed in the system item is metadata (frame unit metadata) for a frame of video data disposed in the picture item in a stage succeeding the system item. The frame unit metadata includes for example a time code.

Disposed in the picture item is video data for one frame. In FIG. 2, video data in the above-described D10 format is disposed in the picture item.

The video data for one frame is KLV-coded into a KLV (Key, Length, Value) structure, and disposed in the picture item.

The KLV structure is formed by sequentially disposing a key (Key), a length (Length), and a value (Value) from a start of the KLV structure. Disposed in the key is a 16-byte label in compliance with an SMPTE 298M standard, which label indicates a type of data disposed in the value. Disposed in the length is data length of the data disposed in the value. Disposed in the value is the content data, that is, video data for one frame in this case.

The data length of the picture item is a fixed length based on KAG (KLV Alignment Grid). For the fixed length of the picture item, a filler (Filler) as data for stuffing is also converted into a KLV structure, and disposed in the rear of the video data of the picture item.

The fixed length based on KAG, which is the data length of the picture item, is for example an integral multiple (for example 512 bytes or 2 Kbytes) of sector length of the optical disk 7. In this case, so-called compatibility between the optical disk 7 and the picture item is enhanced, resulting in a higher speed of reading and writing of the picture item on the optical disk 7.

The above-described system item, and the sound item and the auxiliary item to be described later also use the KLV structure as with the picture item, and have the fixed length based on KAG as data length thereof.

Disposed in the sound item is audio data for one frame in the frame of the video data disposed in the picture item, the audio data having a KLV structure as in the case of the above-described picture item.

A plurality of pieces of audio data, for example pieces of audio data for eight channels are multiplexed and disposed in the sound item.

Specifically, in a value of the KLV structure of the sound item, an element header EH (Element Header), an audio sample count ASC (Audio Sample Count), a stream valid flag SVF (Stream Valid Flags), and the multiplexed eight-channel audio data are sequentially disposed from a start of the value.

The eight-channel audio data in the sound item is multiplexed by disposing samples of the audio data in order of a first sample, a second sample, . . . of audio data of each of the eight channels in one frame. A number in parentheses in the audio data shown at a bottom part of FIG. 2 indicates what number sample a sample of the audio data is.

In the element header EH, data for identifying the element header, and the like are disposed. In the audio sample count ASC, the number of samples of the audio data disposed in the sound item is disposed. The stream valid flag SVF is an 8-bit (1-byte) flag. Each bit of the stream valid flag SVF indicates whether audio data of a channel corresponding to the bit is valid or invalid. That is, each bit of the stream valid flag SVF is for example 1 when audio data of a channel corresponding to the bit is valid, and is for example 0 when the audio data of the channel corresponding to the bit is invalid.

The auxiliary item has necessary user data disposed therein. Thus, the auxiliary item is an area where a user can dispose arbitrary data.

As described above, in the standard AV multiplex format, the system item having frame unit metadata disposed therein, the picture item having video data disposed therein, the sound item having audio data disposed therein, and the auxiliary item having user data disposed therein are multiplexed in one frame unit. Further, the sound item has eight-channel audio data multiplexed in one sample unit.

Thus, with files having video data and audio data separately disposed therein en bloc, reproduction of the video data and the audio data cannot be started until all of the en bloc video data file and audio data file are received; however, in the standard AV multiplex format, since video data and audio data are multiplexed in frame units, on receiving video data and audio data for one frame, the video data and the audio data for the frame can be reproduced immediately. The standard AV multiplex format can therefore be said to be suitable for streaming.

As described above, the standard AV multiplex format is suitable for streaming because video data and audio data are multiplexed in frame units in the standard AV multiplex format. However, the standard AV multiplex format makes it difficult to perform AV independent editing in which video data and audio data are edited separately from each other.

In addition, file unit metadata is scattered in system items of edit units, and is therefore difficult to handle at the time of editing and the like.

Further, the AES3 format usable in the standard AV multiplex format specifies assignment of at least four bytes to one sample of audio data, thus increasing size of the file as a whole.

Figure 3:
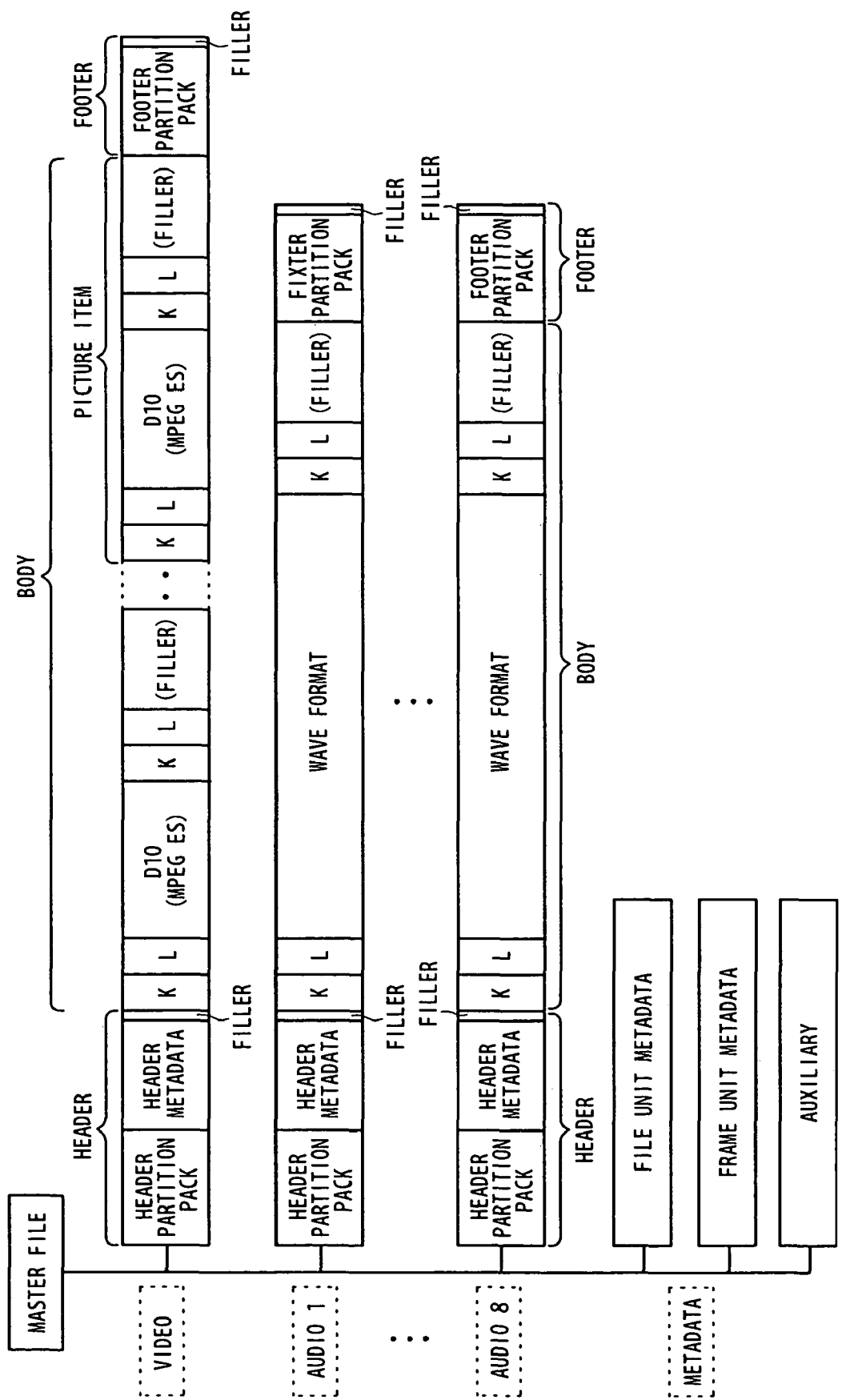
FIG. 3 is a diagram showing an AV independent format.

FIG. 3 shows an example of the AV independent format.

In the AV independent format, each of the video data, the audio data, the file unit metadata, and the user data multiplexed in the standard AV multiplex format is disposed en bloc in a file.

Specifically, in the AV independent format, picture items having the video data disposed therein in the standard AV multiplex format are disposed en bloc in a body, and further a header and a footer in the same format as in the standard AV multiplex format are added to the body to form a video file.

Since the picture items having an integral multiple of the sector length of the optical disk 7 are disposed en bloc in the body of the video file in the AV independent format, size of the body as a whole is also an integral multiple of the sector length of the optical disk 7. That is, the body of the video file in the AV independent format has such a size as to be in sector alignment.

Further, the size of the body as a whole in the video file is an integral multiple of ECC block length of the optical disk 7. As later described, a last filler of the body is adjusted in size so that the size of the body as a whole in the video file is an integral multiple of ECC (Error Correction Code) block length of the optical disk 7.

An ECC block is a unit that is subjected to ECC processing and is a unit of reading and writing of the optical disk 7.

Incidentally, a sector is an example of a physical unit area on the optical disk 7, and an ECC block is an example of a unit of reading and writing of the optical disk 7. Further, the physical unit area on the optical disk 7 can be for example a plurality of and a fixed number of sectors. The unit of reading and writing of the optical disk 7 can be for example a plurality of and a fixed number of physical unit areas.

The ECC processing is performed in ECC block units by a signal processing unit 115 to be described later, for example. An ECC block can be formed by one or more sectors.

In description to be made in the following, one sector is a physical unit area on the optical disk 7, and one ECC block is a unit of reading and writing that includes one or more sectors.

FIG. 2 shows the index table in the header of the file in the standard AV multiplex format. However, as described above, the index table is an option in MXF. The video file in FIG. 3 does not use the index table (the same is true for audio files to be described later).

In the AV independent format, the eight-channel audio data multiplexed and disposed in sound items in the standard AV multiplex format is separated into audio data of each channel. The audio data converted from the AES3 format to a WAVE format is disposed having a KLV structure in a body of a file of each channel. Further, a header and a footer in the same format as in the standard AV multiplex format are added to the body to form an audio file.

That is, in the AV independent format, an audio file of each channel is formed independently for the eight-channel audio data. The audio file of each channel is formed by disposing in the body the audio data of that channel converted into the WAVE format and into the KLV structure en bloc, and further adding a header and a footer in the same format as in the standard AV multiplex format to the body.

Whereas audio data of a certain channel in the WAVE format which data is converted into the KLV structure en bloc is disposed in a body of an audio file in the AV independent format as described above, size of the audio data as a whole is not necessarily an integral multiple of the ECC block length of the optical disk 7. Accordingly, a filler in a KLV structure is disposed in the rear of the audio data in the KLV structure in the body of the audio file in the AV independent format. Also, a filler is disposed in the rear of the header and in the rear of the footer.

In the AV independent format, a file unit metadata file in which file unit metadata disposed in header metadata in the standard AV multiplex format is disposed en bloc, and a frame unit metadata file in which system items having frame unit metadata disposed therein in the standard AV multiplex format are disposed en bloc are formed in addition to the video file and the respective audio files of the eight channels. Further, an auxiliary file in which auxiliary items having user data disposed therein in the standard AV multiplex format are disposed en bloc is formed in the AV independent format.

Then, a master file (Master File) describing a pointer to each of the video file, the respective audio files of the eight channels, the file unit metadata file, the frame unit metadata file, and the auxiliary file is formed in the AV independent format.

Specifically, the master file is described in XML (Extensible Markup Language), for example. As the pointer to each of the video file, the respective audio files of the eight channels, the file unit metadata file, the frame unit metadata file, and the auxiliary file, a file name of each file, for example, is described in the master file.

It is thus possible to refer from the master file to the video file, the respective audio files of the eight channels, the file unit metadata file, the frame unit metadata file, and the auxiliary file.

Incidentally, the auxiliary file can be an optional file, for example.

Also, while the file unit metadata file, the frame unit metadata file, and the auxiliary file in FIG. 3 do not have a header and a footer in the same format as in the standard AV multiplex format, the file unit metadata file, the frame unit metadata file, and the auxiliary file can be formed with a header and a footer in the same format as in the standard AV multiplex format added thereto.

Further, file unit metadata of a minimum set is disposed in header metadata forming the header of the video file and the audio files in the AV independent format.

Specifically, since the file unit metadata file in which file unit metadata disposed in header metadata in the standard AV multiplex format is disposed en bloc is present in the AV independent format, repeated disposition of the file unit metadata disposed in the metadata file in the header metadata forming the header of the video file and the audio files is redundant, and also increases size of the files as a whole in the AV independent format.

However, the header metadata in MXF is an essential item of the header. If the header is formed with no header metadata disposed at all, the header is not in the same format as in the standard AV multiplex format.

On the other hand, in MXF, the file unit metadata to be disposed in the header metadata includes various items, and of the items, there are essential items and optional items.

Accordingly, in order to suppress increase in file size and maintain compatibility with the standard AV multiplex format, file unit metadata of a minimum set, that is, only metadata of items required to be disposed in the header metadata in MXF is disposed in the header metadata forming the headers of the video file and the audio files in the AV independent format.

As described above, in the AV independent format, the video data is disposed en bloc in the video file, and the audio data of each channel is disposed en bloc in the audio file of that channel. It is therefore possible to readily perform editing such as AV independent editing in which the video data and the audio data are edited separately from each other.

Further, in the AV independent format, the audio data is in the WAVE format, and therefore the amount of data can be reduced as compared with the case where audio data in the AES3 format is used as in the standard AV multiplex format. As a result, in recording the files in the AV independent format onto a storage such as the optical disk 7 or the like, storage space required for the recording can be reduced as compared with the case of recording the file in the standard AV multiplex format.

The video file and the audio files in the AV independent format are formed by disposing a header, a body, and a footer from a start as with files in the standard AV multiplex format. Further, the header and the footer are in the same format as in the standard AV multiplex format. In a case where the disk apparatus 1 records the video file and the audio files in the AV independent format onto the removable optical disk 7 and the optical disk 7 is loaded into the disk apparatus 2, when the disk apparatus 2 is a standard apparatus (apparatus capable of handling MXF files), the disk apparatus 2 can read the video file and the audio files in the AV independent format from the optical disk 7.

Further, in the AV independent format, the file unit metadata and the frame unit metadata are each brought together into one file separately from each other. Therefore search process using the metadata becomes easier.

Figure 4:
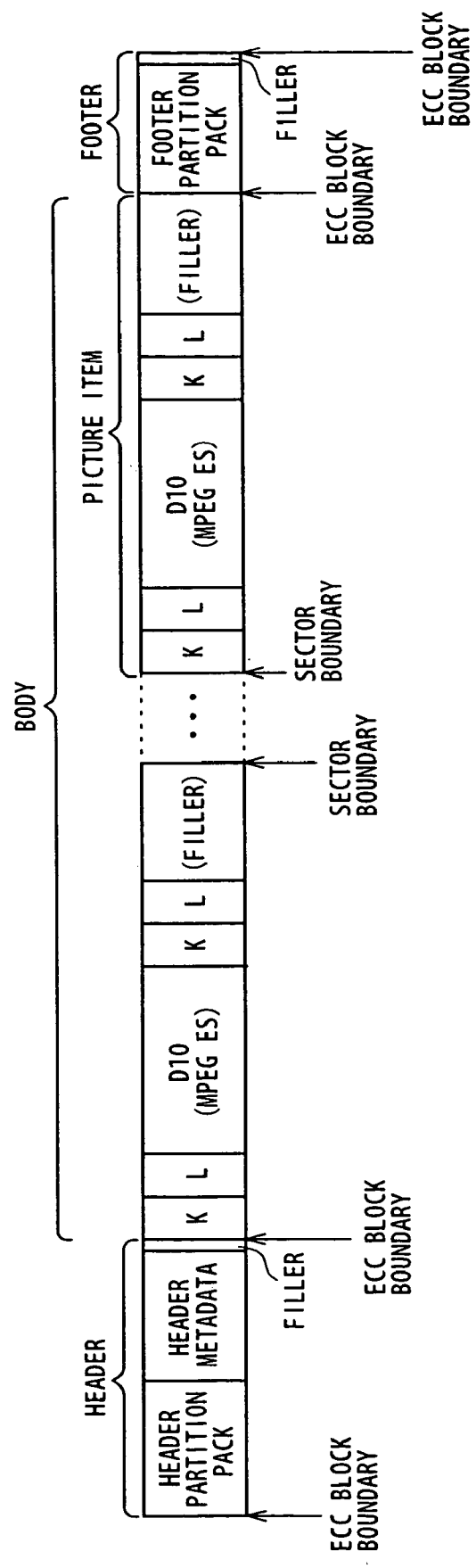
FIG. 4 is a diagram showing the AV independent format.
Figure 5:
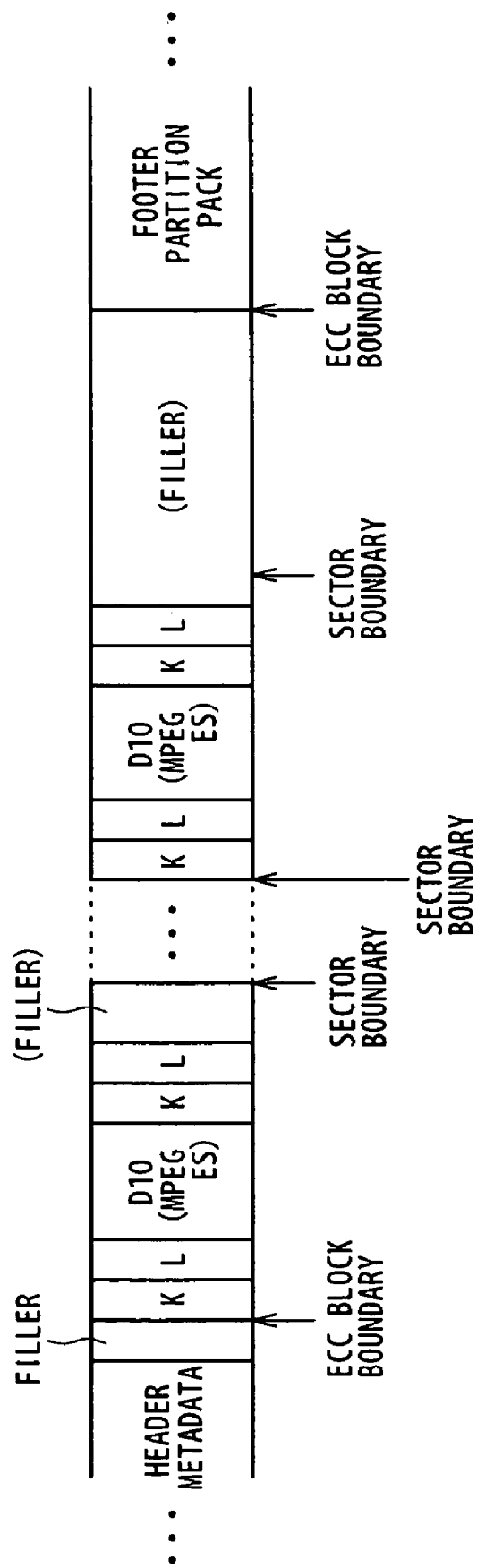
FIG. 5 is a diagram showing the AV independent format.

FIG. 4 and FIG. 5 are diagrams of assistance in explaining amounts of data of the video file in the AV independent format. As shown in FIG. 4, a filler is disposed in the rear of the header of the video file in the AV independent format, and size of the header as a whole is an integral multiple of the ECC block length of the optical disk 7. The video file is written to the optical disk 7 such that boundaries of the header of the video file coincide with boundaries of ECC blocks of the optical disk 7.

A filler is disposed in the rear of the footer of the video file, and size of the footer as a whole is an integral multiple of the ECC block length of the optical disk 7. The video file is written to the optical disk 7 such that boundaries of the footer of the video file coincide with boundaries of ECC blocks of the optical disk 7.

Size of the body as a whole of the video file is an integral multiple of the ECC block length of the optical disk 7. The video file is written to the optical disk 7 such that boundaries of the body coincide with boundaries of ECC blocks of the optical disk 7. Further, each picture item of the body and a filler in the rear of the picture item are an integral multiple of the sector length of the optical disk 7. The video file is written to the optical disk 7 such that a boundary on a front side of the picture item coincides with a sector boundary and a boundary on a rear side of the filler added to the picture item coincides with a sector boundary.

As shown in FIG. 5, the last filler of the body is adjusted in size so that the size of the body as a whole becomes an integral multiple of the ECC block length of the optical disk 7. When the video file is written to the optical disk 7, a boundary on a rear side of the filler added to the last picture item of the body coincides with an ECC block boundary.

Figure 6:
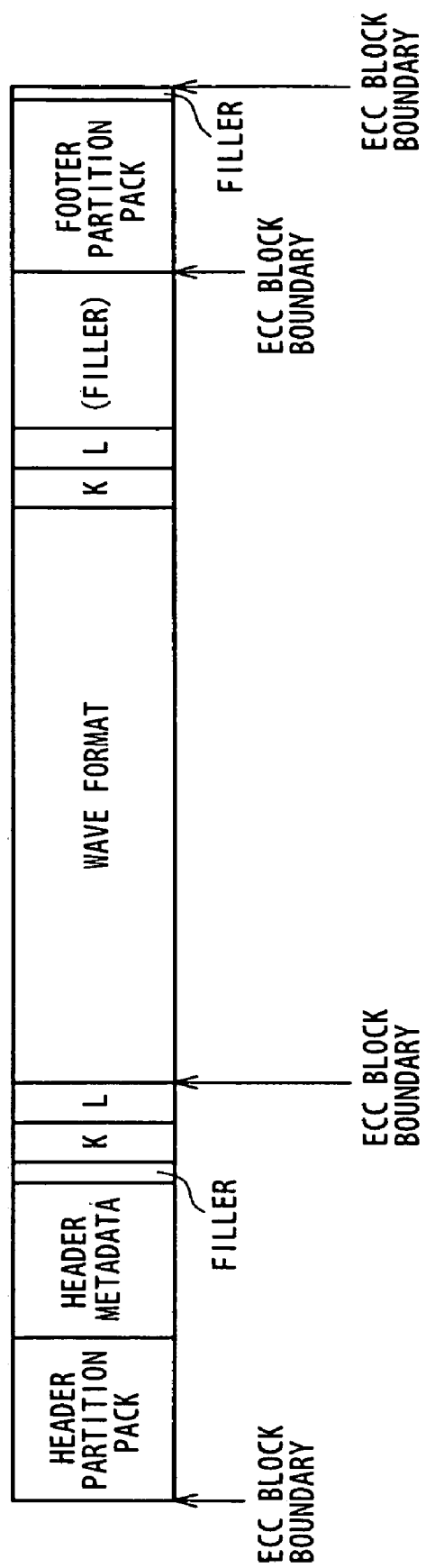
FIG. 6 is a diagram showing the AV independent format.

FIG. 6 is a diagram of assistance in explaining amounts of data of an audio file in the AV independent format. A filler at a last part of a header of the audio file is adjusted in size so that size of the header of the audio file and a key and a length of audio data having a KLV structure in a body becomes an integral multiple of the ECC block length of the optical disk 7. The audio file is written to the optical disk 7 such that a boundary on a front side of the header of the audio file coincides with a boundary of ECC blocks of the optical disk 7. Also, the audio file is written to the optical disk 7 such that a boundary on a rear side of the length coincides with a boundary of ECC blocks of the optical disk 7.

Size of a value of the audio data having the KLV structure in the body and a filler having a KLV structure added to the body is an integral multiple of the ECC block length of the optical disk 7. The audio file is written to the optical disk 7 such that a boundary on a rear side of the body coincides with a boundary of ECC blocks of the optical disk 7.

A filler is disposed in the rear of a footer of the audio file, and size of the footer as a whole is an integral multiple of the ECC block length of the optical disk 7. The audio file is written to the optical disk 7 such that a front boundary and a rear boundary of the footer of the audio file coincide with boundaries of ECC blocks of the optical disk 7.

Figure 7:
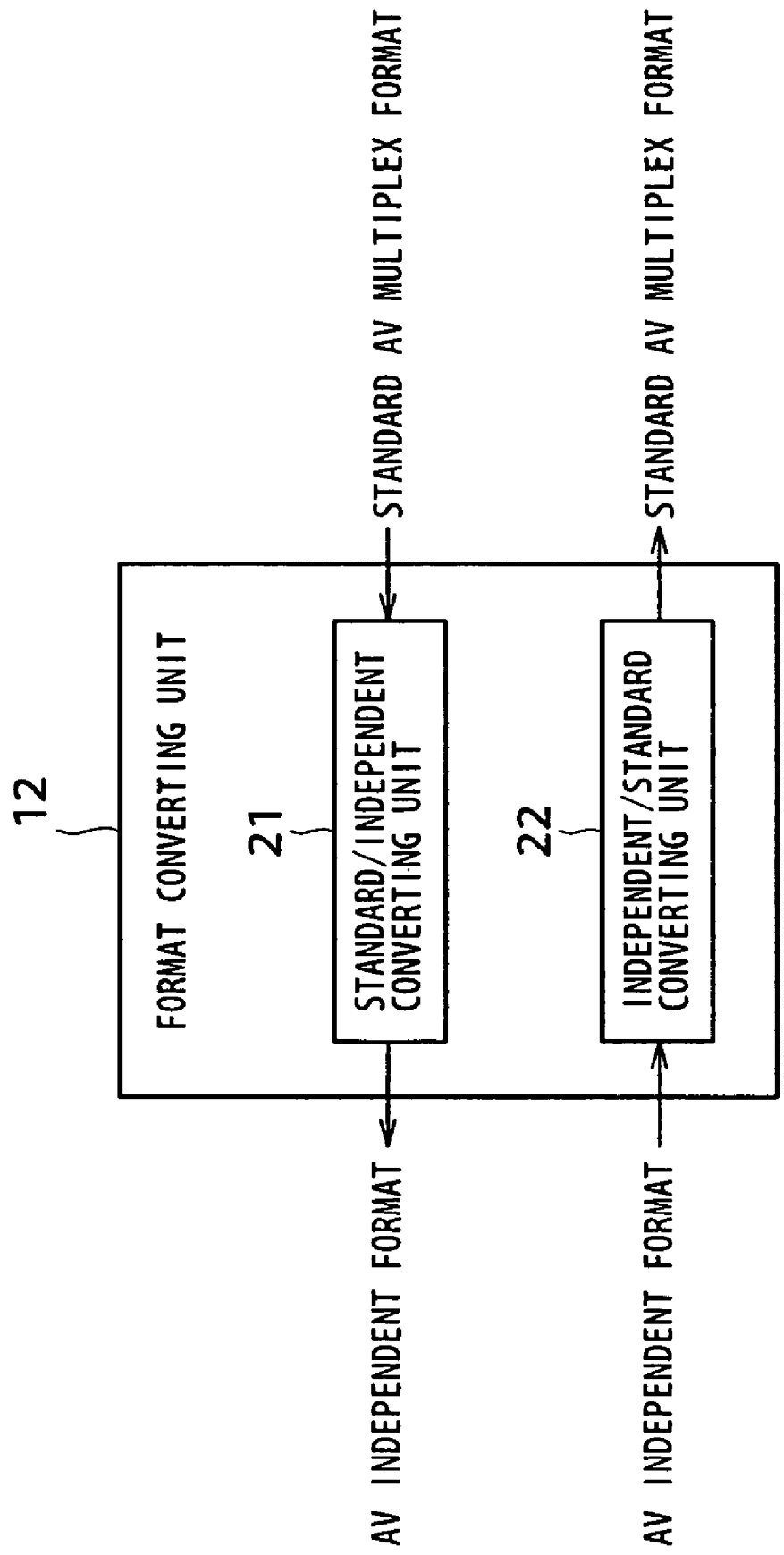
FIG. 7 is a block diagram showing an example of configuration of a format converting unit.

FIG. 7 shows an example of configuration of the format converting unit 12 of the disk apparatus 1 in FIG. 1.

The format converting unit 12 includes a standard/independent converting unit 21 and an independent/standard converting unit 22.

The standard/independent converting unit 21 converts a file in the standard AV multiplex format of FIG. 2 which file is supplied from the communication I/F 13 into a file in the AV independent format of FIG. 3, and then supplies the file in the AV independent format to the disk drive device 11. The independent/standard converting unit 22 converts a file in the AV independent format of FIG. 3 which file is supplied from the disk drive device 11 into a file in the standard AV multiplex format of FIG. 2, and then supplies the file in the standard AV multiplex format to the communication I/F 13.

Figure 8:
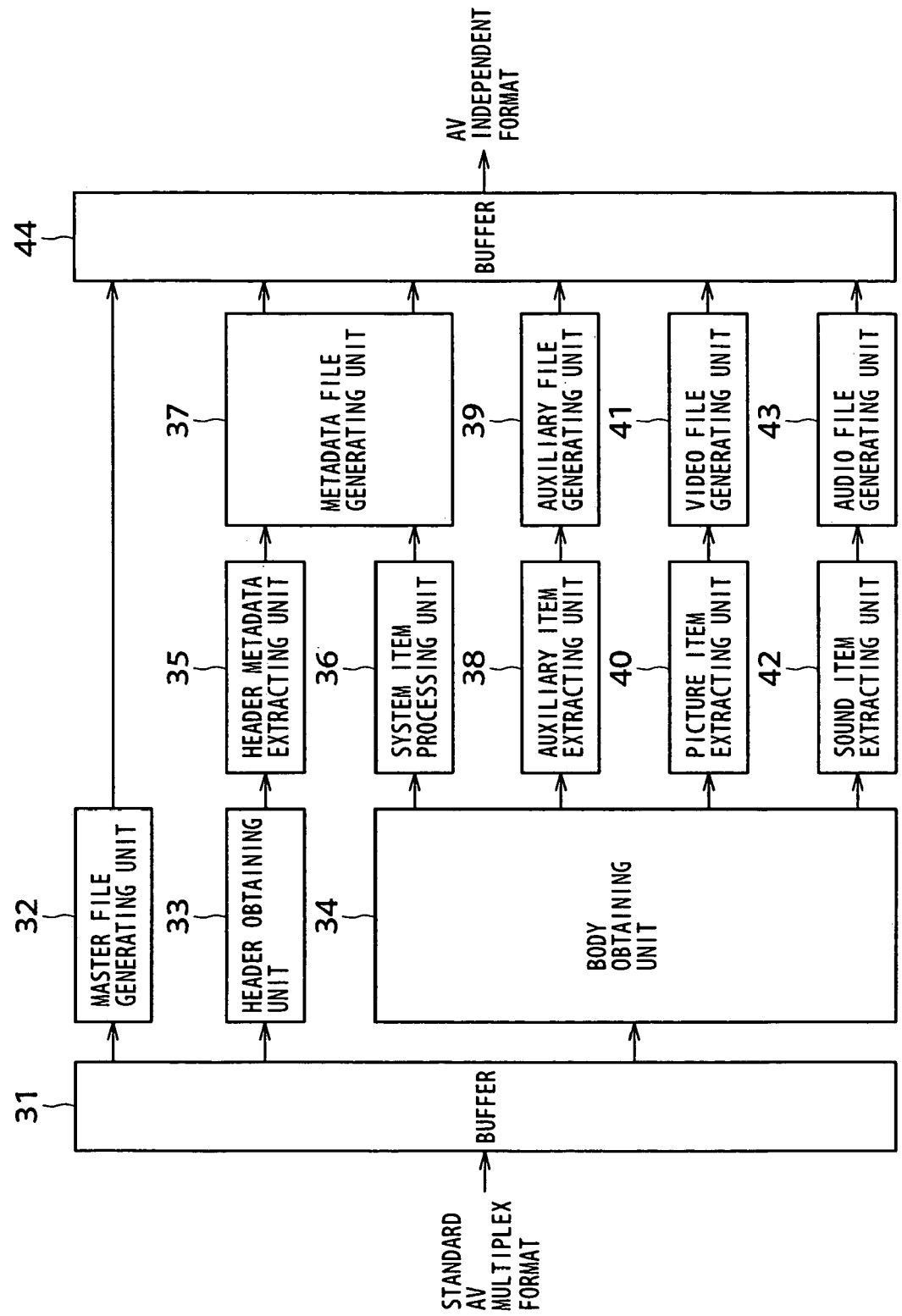
FIG. 8 is a block diagram showing an example of configuration of a standard/independent converting unit.

FIG. 8 shows an example of configuration of the standard/independent converting unit 21 in FIG. 7.

A buffer 31 is supplied with a file in the standard AV multiplex format from the communication I/F 13. The buffer 31 temporarily stores the file in the standard AV multiplex format supplied thereto.

When the file in the standard AV multiplex format is stored in the buffer 31, a master file generating unit 32 generates a master file in the AV independent format for the file in the standard AV multiplex format. The master file generating unit 32 then supplies the master file in the AV independent format to a buffer 44.

A header obtaining unit 33 obtains a header by extracting the header from the file in the standard AV multiplex format stored in the buffer 31. The header obtaining unit 33 then supplies the header to a header metadata extracting unit 35.

A body obtaining unit 34 obtains a body by extracting the body from the file in the standard AV multiplex format stored in the buffer 31. The body obtaining unit 34 then supplies the body to a system item processing unit 36, an auxiliary item extracting unit 38, a picture item extracting unit 40, and a sound item extracting unit 42.

The header metadata extracting unit 35 extracts header metadata from the header supplied from the header obtaining unit 33. The header metadata extracting unit 35 supplies file unit metadata disposed in the header metadata to a metadata file generating unit 37. The system item processing unit 36 extracts a system item having frame unit metadata disposed therein from each edit unit of the body supplied from the body obtaining unit 34. The system item processing unit 36 then supplies the system item to the metadata file generating unit 37. The metadata file generating unit 37 generates a file unit metadata file in which the file unit metadata supplied from the header metadata extracting unit 35 is disposed. The metadata file generating unit 37 also generates a frame unit metadata file in which system items of edit units which items are supplied from the system item processing unit 36 are disposed en bloc (sequentially). The metadata file generating unit 37 supplies the file unit metadata file and the frame unit metadata file to the buffer 44.

The auxiliary item extracting unit 38 extracts an auxiliary item having frame unit user data disposed therein from each edit unit of the body supplied from the body obtaining unit 34. The auxiliary item extracting unit 38 then supplies the auxiliary item to an auxiliary file generating unit 39. The auxiliary file generating unit 39 generates an auxiliary file in which auxiliary items of the edit units which items are supplied from the auxiliary item extracting unit 38 are disposed en bloc. The auxiliary file generating unit 39 then supplies the auxiliary file to the buffer 44.

The picture item extracting unit 40 extracts a picture item having frame unit video data disposed therein from each edit unit of the body supplied from the body obtaining unit 34. The picture item extracting unit 40 then supplies the picture item to a video file generating unit 41. The video file generating unit 41 generates a video file by disposing picture items of the edit units which items are supplied from the picture item extracting unit 40 in a body en bloc, and further adding a header and a footer in the same format as that of the file in the standard AV multiplex format to the body. The video file generating unit 41 then supplies the video file to the buffer 44.

The sound item extracting unit 42 extracts a sound item having frame unit audio data disposed therein from each edit unit of the body supplied from the body obtaining unit 34. The sound item extracting unit 42 then supplies the sound item to an audio file generating unit 43. The audio file generating unit 43 generates an audio file for each channel by disposing en bloc audio data of each channel disposed in sound items of the edit units which items are supplied from the sound item extracting unit 42 in a body for each channel, and further adding a header and a footer in the same format as that of the file in the standard AV multiplex format to the body. The audio file generating unit 43 then supplies the audio file of each channel to the buffer 44.

The buffer 44 temporarily stores the master file supplied from the master file generating unit 32, the file unit metadata file and the frame unit metadata file supplied from the metadata file generating unit 37, the auxiliary file supplied from the auxiliary file generating unit 39, the video file supplied from the video file generating unit 41, and the audio file of each channel supplied from the audio file generating unit 43. The buffer 44 supplies these files as files in the AV independent format to the disk drive device 11.

Figure 9:
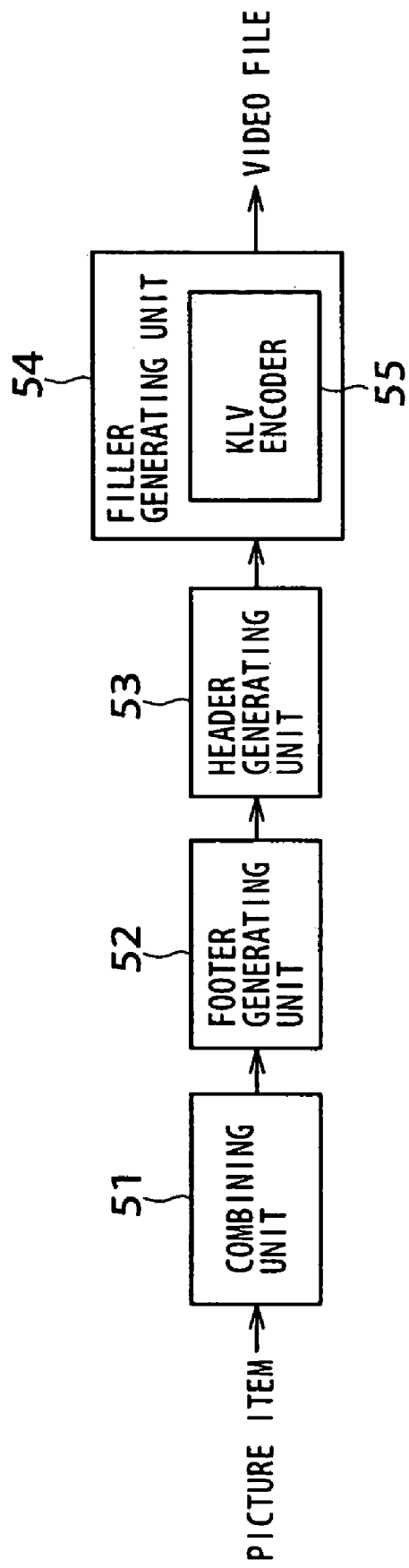
FIG. 9 is a block diagram showing an example of configuration of a video file generating unit.

FIG. 9 shows an example of configuration of the video file generating unit 41 in FIG. 8.

The picture items of the edit units which items are supplied from the picture item extracting unit 40 are supplied to a combining unit 51. The combining unit 51 sequentially combines (connects) the picture items of the edit units which items are supplied to the combining unit 51. The combining unit 51 then supplies the combined picture items of the edit units to a footer generating unit 52. With the combined picture items of the edit units supplied from the combining unit 51 as a body, the footer generating unit 52 generates a footer to be added to the body which footer is in the same format as that of the file in the standard AV multiplex format. The footer generating unit 52 supplies the footer and the body to a header generating unit 53.

The header generating unit 53 generates a header to be added to the footer and the body supplied from the footer generating unit 52. The header generating unit 53 supplies the header, the body, and the footer to a filler generating unit 54.

The filler generating unit 54 generates a filler to be added to the header and a filler to be added to the footer. Further, the filler generating unit 54 generates the last filler of the body. A KLV encoder 55 in the filler generating unit 54 encodes the last filler of the body into a KLV structure.

The filler generating unit 54 constructs and outputs a video file in the AV independent format including the header, the body, and the footer having a filler added thereto.

A filler generated by the filler generating unit 67 is added to the header, the body, or the footer of the video file, whereby the data amounts of the header, the body, and the footer are adjusted to be an integral multiple of the ECC block length of the optical disk 7.

Thus, when the video file is written to the optical disk 7, recording of the header, the body, or the footer in a part of an ECC block is prevented, so that the audio file can be read and written more efficiently.

Since each of the header, the body, and the footer is an integral multiple of the ECC block length of the optical disk 7, when recording is performed such that boundaries of each of the header, the body, and the footer coincide with ECC block boundaries, it is possible to write or read the header, the body, or the footer by writing to a minimum number of ECC blocks or reading from a minimum number of ECC blocks when writing or reading only the header, only the body, or only the footer. That is, a process of reading and writing of the video file from and to the optical disk 7 can be performed more efficiently.

Figure 10:
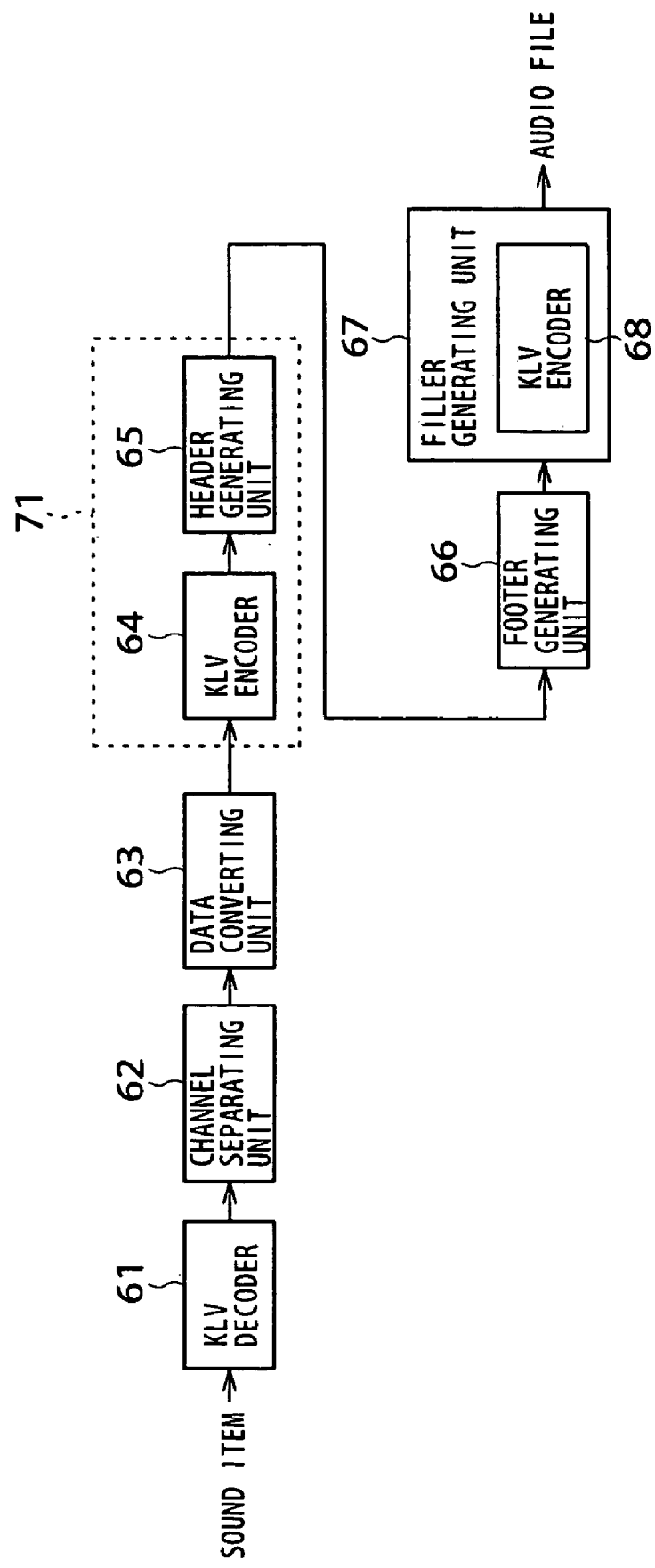
FIG. 10 is a block diagram showing an example of configuration of an audio file generating unit.

FIG. 10 shows an example of configuration of the audio file generating unit 43 in FIG. 8.

The sound items of the edit units which items are supplied from the sound item extracting unit 42 are supplied to a KLV decoder 61. The KLV decoder 61 disintegrates the KLV structure of audio data disposed in the sound items of the edit units, and supplies multiplexed eight-channel audio data (hereinafter referred to as multiplexed audio data as appropriate) obtained as a result of the disintegration to a channel separating unit 62.

The channel separating unit 62 separates audio data of each channel from the multiplexed audio data in the sound items, the multiplexed audio data being supplied from the KLV decoder 61, collects the audio data of each channel for each channel, and then supplies the collected audio data of each channel to a data converting unit 63.

The data converting unit 63 converts an encoding system of the audio data of each channel supplied from the channel separating unit 62. Specifically, audio data in the standard AV multiplex format is encoded in the AES3 format, whereas audio data in the AV independent format is encoded in the WAVE format. Thus, the data converting unit 63 converts the audio data encoded in the AES3 format (audio data in the AES3 format) supplied from the channel separating unit 62 to audio data encoded in the WAVE format (audio data in the WAVE format).

Incidentally, while in this case, the data converting unit 63 converts audio data in the AES3 format into audio data in the WAVE format, the data converting unit 63 can convert audio data into audio data in other than the WAVE format. That is, the audio data conversion of the data converting unit 63 is performed for the purpose of reducing a data amount of audio data in the AES3 format. Thus the data converting unit 63 may use any encoding system as long as the encoding system can achieve the purpose.

Also, when the data amount of audio data is not a problem, the audio file generating unit 43 may be configured without the data converting unit 63.

The audio data in the WAVE format of each channel which data is obtained by the data converting unit 63 is supplied to a KLV encoder 64. The KLV encoder 64 KLV-codes each piece of audio data collected for each channel which data is supplied from the data converting unit 63 into a KLV structure. The KLV encoder 64 supplies the result to a header generating unit 65.

With each piece of audio data of each channel supplied from the KLV encoder 64 as a body, the header generating unit 65 generates a header to be added to the body of each channel which header is in the same format as that of the file in the standard AV multiplex format. The header generating unit 65 supplies the body and the header to a footer generating unit 66.

The footer generating unit 66 generates a footer to be added to the body in the same format as that of the file in the standard AV multiplex format. The footer generating unit 66 supplies the header, the footer, and the body to a filler generating unit 67.

The filler generating unit 67 generates a filler to be added to the header, a filler to be added to the body, and a filler to be added to the footer. As shown in FIG. 6, the filler generating unit 67 generates a filler such that a data amount of the header and a key and a length added by the KLV encoder 64 is an integral multiple of a data amount of an ECC block. The filler generating unit 67 adds the generated filler to the rear of the header. As shown in FIG. 6, the filler generating unit 67 generates a filler such that a data amount of the footer is an integral multiple of a data amount of an ECC block. The filler generating unit 67 adds the generated filler to the rear of the footer.

A KLV encoder 68 in the filler generating unit 67 encodes the filler to be added to the body into a KLV structure. As shown in FIG. 6, the filler generating unit 67 generates the filler encoded into the KLV structure such that a data amount of the audio data is an integral multiple of a data amount of an ECC block. The filler generating unit 67 adds the generated filler to the rear of the audio data.

Incidentally, the KLV encoder 64 and the header generating unit 65 include a front data generating unit 71.

A filler generated by the filler generating unit 54 is thus added to the header, the audio data, or the footer, whereby the data amounts of the header and the key and the length added by the KLV encoder 64, the audio data, and the footer in the audio file are adjusted to be an integral multiple of the ECC block length of the optical disk 7.

Thus, when the audio file is written to the optical disk 7, recording of the header, the body, or the footer in a part of an ECC block is prevented, so that the video file can be read and written more efficiently.

Since each of the header and the key and the length added by the KLV encoder 64, the audio data, and the footer is an integral multiple of the ECC block length of the optical disk 7, when recording is performed such that boundaries of each of the header and the key and the length added by the KLV encoder 64, the audio data, and the footer coincide with ECC block boundaries, it is possible to write or read the header and the key and the length added by the KLV encoder 64, the audio data, and the footer by writing to a minimum number of ECC blocks or reading from a minimum number of ECC blocks when writing or reading only the header and the key and the length added by the KLV encoder 64, only the audio data, or only the footer. That is, a process of reading and writing of the audio file from and to the optical disk 7 can be performed more efficiently.

The standard/independent converting unit 21 in FIG. 7 performs a master file generating process for generating the master file as a file in the AV independent format, a metadata file generating process for generating each of the file unit metadata file and the frame unit metadata file, an auxiliary file generating process for generating the auxiliary file, a video file generating process for generating the video file, and an audio file generating process for generating the audio files.

The master file generating process, the metadata file generating process, the auxiliary file generating process, the video file generating process, and the audio file generating process performed by the standard/independent converting unit 21 will now be described with reference to flowcharts of FIGS. 11 to 16.

Figure 11:
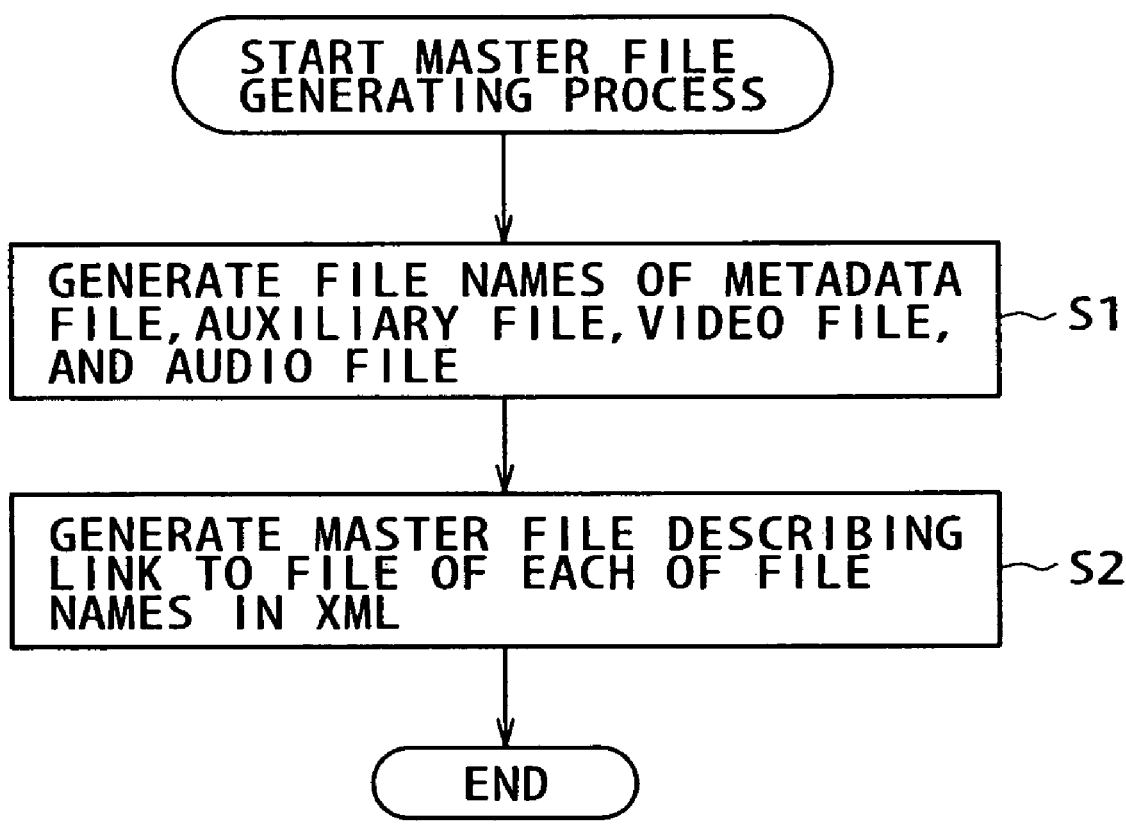
FIG. 11 is a flowchart of assistance in explaining a master file generating process.

The master file generating process will first be described with reference to the flowchart of FIG. 11.

When a file in the standard AV multiplex format is supplied to and stored in the buffer 31 (FIG. 8), for example, the master file generating process is started. First, in step S1, the master file generating unit 32 (FIG. 8) generates file names of a file unit metadata file, a frame unit metadata file, an auxiliary file, a video file, and an audio file of each channel. The process proceeds to step S2. In step S2, the master file generating unit 32 generates a master file describing a link to the file of each file name generated in step S1 in XML. The master file generating unit 32 supplies the master file to the buffer 44 to store the master file in the buffer 44. Then the master file generating process is ended.

Figure 12:
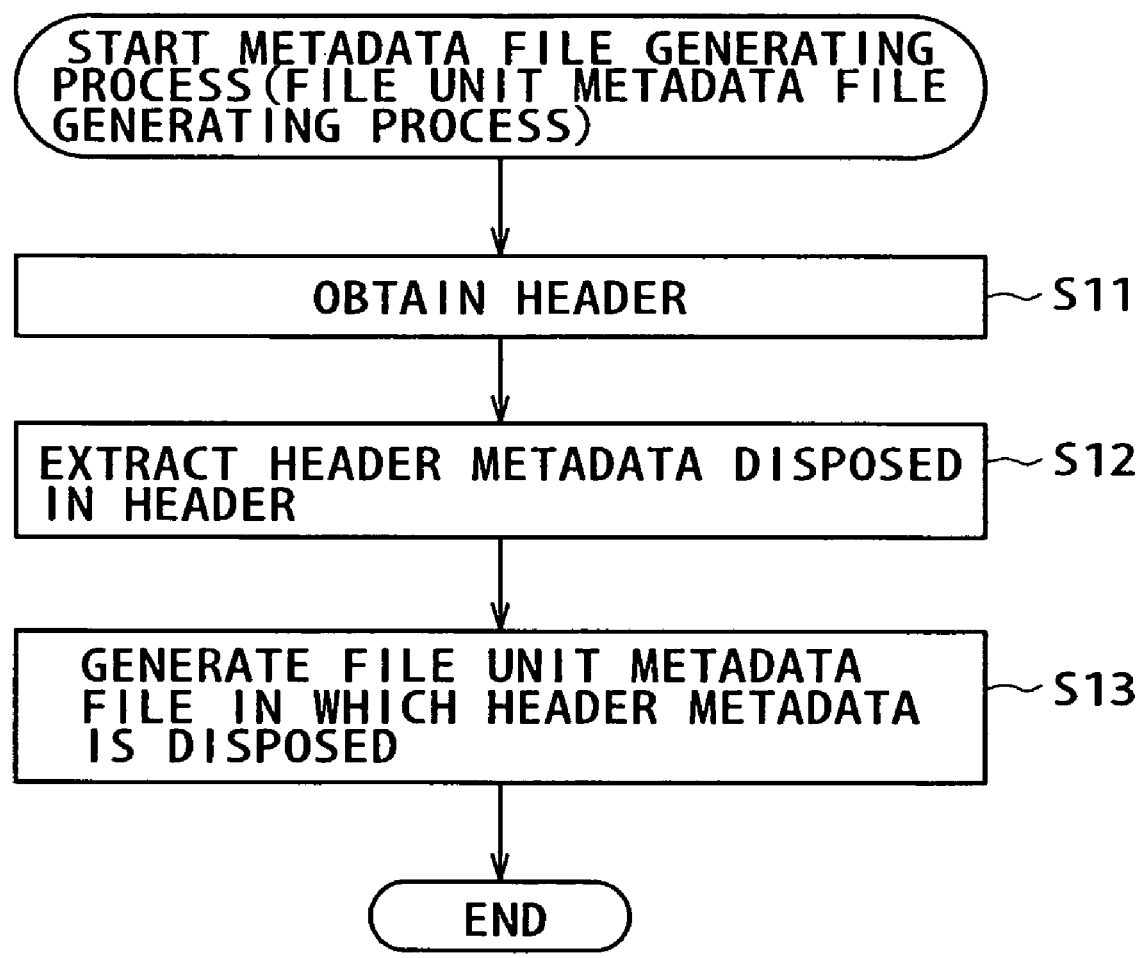
FIG. 12 is a flowchart of assistance in explaining a file unit metadata file generating process.

The file unit metadata file generating process for generating the file unit metadata file will next be described with reference to the flowchart of FIG. 12.

When a file in the standard AV multiplex format is supplied to and stored in the buffer 31 (FIG. 8), for example, the file unit metadata file generating process is started. First, in step S11, the header obtaining unit 33 obtains a header from the file in the standard AV multiplex format stored in the buffer 31. The header obtaining unit 33 supplies the header to the header metadata extracting unit 35. The process proceeds to step S12. In step S12, the header metadata extracting unit 35 extracts header metadata from the header supplied from the header obtaining unit 33. The header metadata extracting unit 35 supplies file unit metadata disposed in the header metadata to the metadata file generating unit 37. The process proceeds to step S13. In step S13, the metadata file generating unit 37 generates a file unit metadata file in which the file unit metadata supplied from the header metadata extracting unit 35 is disposed. The metadata file generating unit 37 supplies the file unit metadata file to the buffer 44 to store the file unit metadata file in the buffer 44. Then the file unit metadata file generating process is ended.

Figure 13:
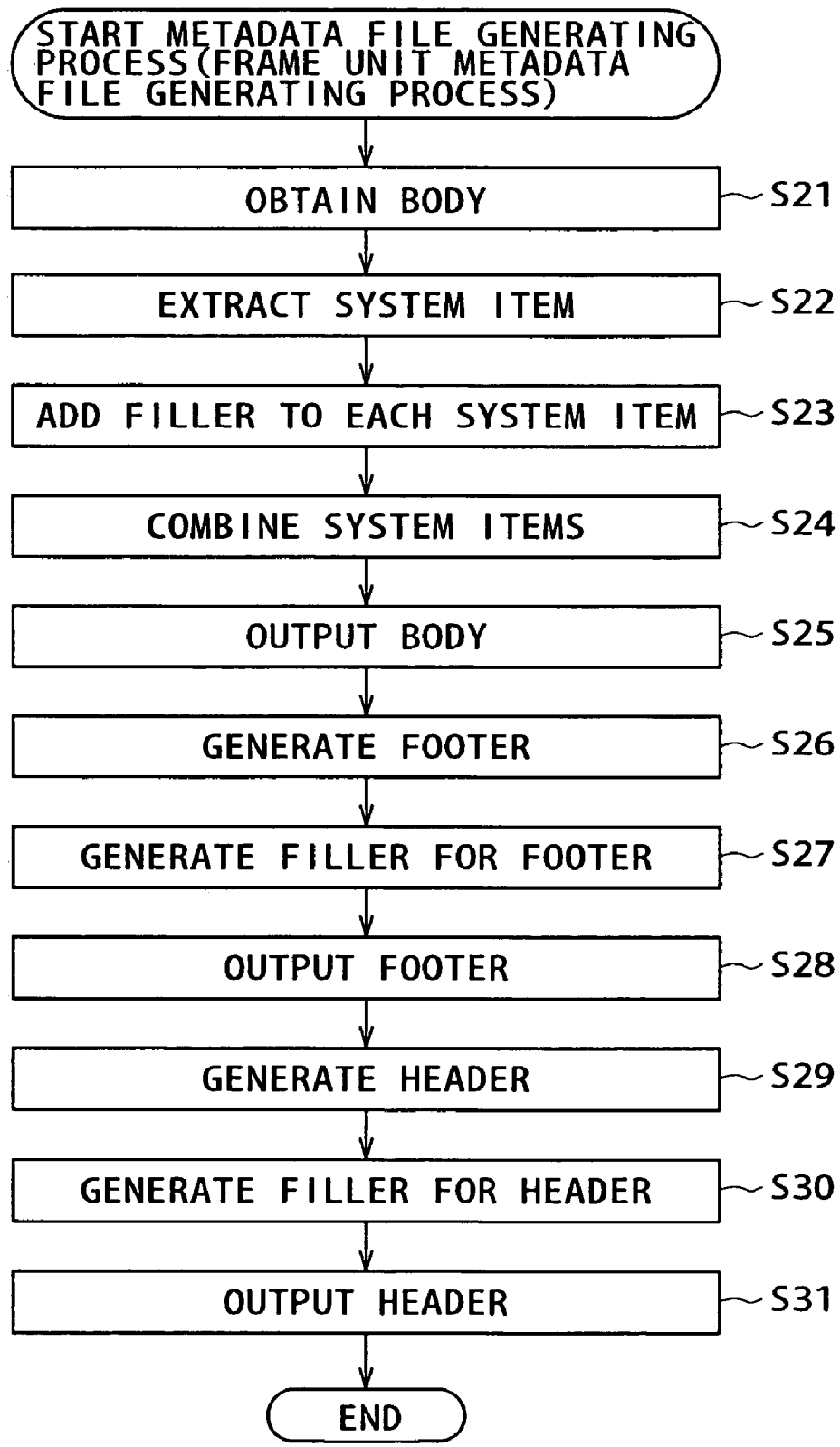
FIG. 13 is a flowchart of assistance in explaining a frame unit metadata file generating process.

The frame unit metadata file generating process for generating the frame unit metadata file will next be described with reference to the flowchart of FIG. 13.

When a file in the standard AV multiplex format is supplied to and stored in the buffer 31 (FIG. 8), for example, the frame unit metadata file generating process is started. First, in step S21, the body obtaining unit 34 obtains a body from the file in the standard AV multiplex format stored in the buffer 31. The body obtaining unit 34 supplies the body to the system item processing unit 36. The process proceeds to step S22. In step S22, the system item processing unit 36 extracts a system item having frame unit metadata disposed therein from each edit unit of the body supplied from the body obtaining unit 34. The system item processing unit 36 then supplies the system item to the metadata file generating unit 37. The process proceeds to step S23. In step S23, the metadata file generating unit 37 adds a filler to the system item of each edit unit supplied from the system item processing unit 36. The process proceeds to step S24.

In step S24, the metadata file generating unit 37 combines system items having a filler added thereto with each other, and thereby generates a body of a frame unit metadata file in which the system items of edit units are disposed en bloc. The metadata file generating unit 37 supplies the generated body to the buffer 44. The process proceeds to step S25. In step S25, the buffer 44 outputs the body of the metadata file. The process proceeds to step S26.

In step S26, the metadata file generating unit 37 generates a footer. The process proceeds to step S27. In step S27, the metadata file generating unit 37 generates a filler for the footer. The metadata file generating unit 37 supplies the footer having the filler added thereto to the buffer 44. The process proceeds to step S28. In step S28, the buffer 44 outputs the footer. The process proceeds to step S29.

In step S29, the metadata file generating unit 37 generates a header. The process proceeds to step S30. In step S30, the metadata file generating unit 37 generates a filler for the header. The metadata file generating unit 37 supplies the header having the filler added thereto to the buffer 44. The process proceeds to step S31. In step S31, the buffer 44 outputs the header. Then, the frame unit metadata file generating process is ended.

Figure 14:
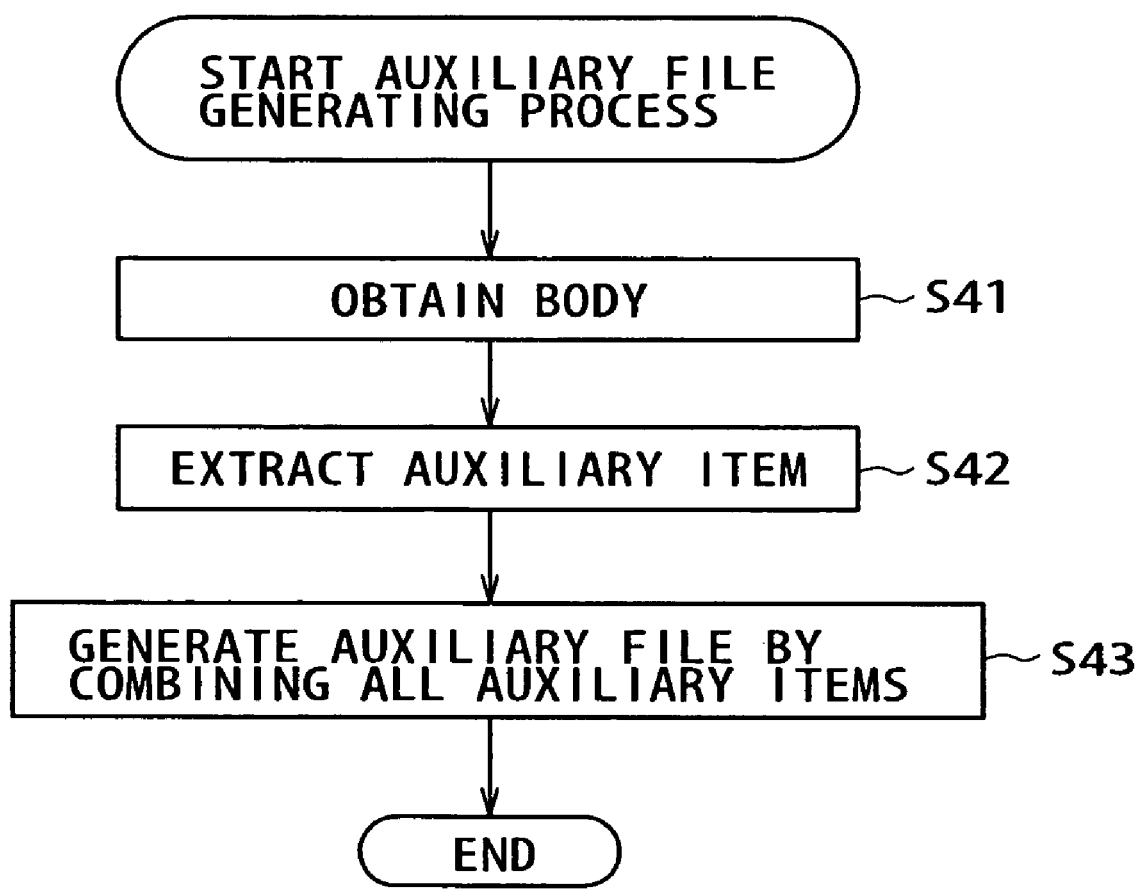
FIG. 14 is a flowchart of assistance in explaining an auxiliary file generating process.

The auxiliary file generating process for generating the auxiliary file will next be described with reference to the flowchart of FIG. 14.

When a file in the standard AV multiplex format is supplied to and stored in the buffer 31 (FIG. 8), for example, the auxiliary file generating process is started. First, in step S41, the body obtaining unit 34 obtains a body from the file in the standard AV multiplex format stored in the buffer 31. The body obtaining unit 34 supplies the body to the auxiliary item extracting unit 38. The process proceeds to step S42. In step S42, the auxiliary item extracting unit 38 extracts an auxiliary item from each edit unit of the body supplied from the body obtaining unit 34. The auxiliary item extracting unit 38 then supplies the auxiliary item to the auxiliary file generating unit 39. The process proceeds to step S43. In step S43, the auxiliary file generating unit 39 combines auxiliary items of edit units supplied from the auxiliary item extracting unit 38 with each other, and thereby generates an auxiliary file in which the auxiliary items of the edit units are disposed en bloc. The auxiliary file generating unit 39 supplies the auxiliary file to the buffer 44 to store the auxiliary file in the buffer 44. Then the auxiliary file generating process is ended.

Figure 15:
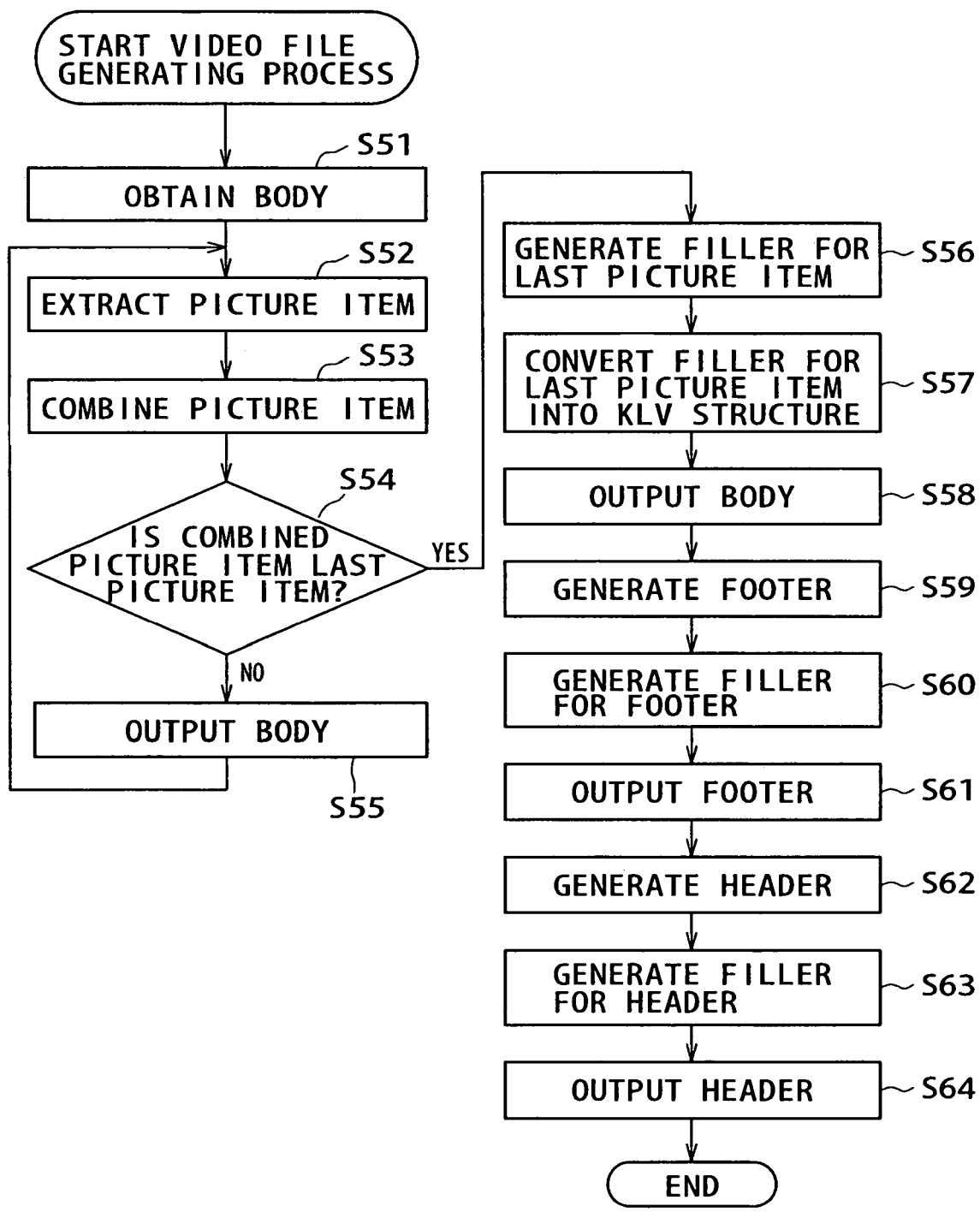
FIG. 15 is a flowchart of assistance in explaining a video file generating process.

The video file generating process for generating the video file will next be described with reference to the flowchart of FIG. 15.

When a file in the standard AV multiplex format is supplied to and stored in the buffer 31 (FIG. 8), for example, the video file generating process is started. First, in step S51, the body obtaining unit 34 obtains a body from the file in the standard AV multiplex format stored in the buffer 31. The body obtaining unit 34 supplies the body to the picture item extracting unit 40. The process proceeds to step S52. In step S52, the picture item extracting unit 40 extracts a picture item from each edit unit of the body supplied from the body obtaining unit 34. The picture item extracting unit 40 then supplies the picture item to the video file generating unit 41. The process proceeds to step S53. In step S53, the combining unit 51 in the video file generating unit 41 (FIG. 9) combines the picture item of each edit unit supplied from the picture item extracting unit 40, and thereby generates a body in which picture items of edit units are disposed en bloc. The process proceeds to step S54.

The video file generating unit 41 in step S54 determines whether the combined picture item is a last picture item. When the combined picture item is not a last picture item, the process proceeds to step S55, where the generated body is outputted to the buffer 44. The process returns to step S52 to repeat the above-described process. In this case, the footer generating unit 52, the header generating unit 53, and the filler generating unit 54 passes the body as it is.

When the video file generating unit 41 in step S54 determines that the combined picture item is a last picture item, the process proceeds to step S56, where the filler generating unit 54 in the video file generating unit 41 (FIG. 9) generates a filler for the last picture item which filler is adjusted in data amount such that when the filler is converted into a KLV structure, a data amount of the body is an integral multiple of an ECC block. The process proceeds to step S57. In step S57, the KLV encoder 55 converts the filler of the last picture item into a KLV structure. The process proceeds to step S58. In step S58, the video file generating unit 41 outputs the filler converted into the KLV structure as the body. The process proceeds to step S59.

In step S59, the footer generating unit 52 generates a footer. The process proceeds to step S60. In step S60, the filler generating unit 54 generates a filler for the footer which filler is adjusted in data amount so that a data amount of the footer is an integral multiple of an ECC block. The process proceeds to step S61. In step S61, the video file generating unit 41 outputs the footer. The process proceeds to step S62.

In step S62, the header generating unit 53 generates a header. The process proceeds to step S63. In step S63, the filler generating unit 54 generates a filler for the header which filler is adjusted in data amount so that a data amount of the header is an integral multiple of an ECC block. The process proceeds to step S64. In step S64, the video file generating unit 41 outputs the header. Then the video file generating process is ended.

Thus, the header is generated after the body and the footer. Therefore the header, which includes data that is not determined until the body is set, such as video data reproduction time, a time code (TC) or the like, can be generated by one process.

For example, if the header is generated first, the data such as the video data reproduction time, the time code (TC) or the like is not determined until the generation of the body is completed, and thus cannot be written to the body. When the generation of the body is completed, the video data reproduction time, the time code (TC) or the like needs to be written to the header again, thus doubling the trouble. In this case, in recording the video file onto a recording medium such as the optical disk 7 or the like, an additional process of seeking the header occurs, or since the data amount of the header is not determined, it is difficult to secure an area required to record the header, which may sometimes result in the header being recorded at a position distant from the body and the footer on the optical disk 7.

When the header is generated after the body and the footer, it is possible to save such double trouble and generate the header including the data that is not determined until the body is set by one process. In addition, when the video file is recorded onto a recording medium such as the optical disk 7 or the like, it is possible to record the header following the body and the footer reliably.

Figure 16:
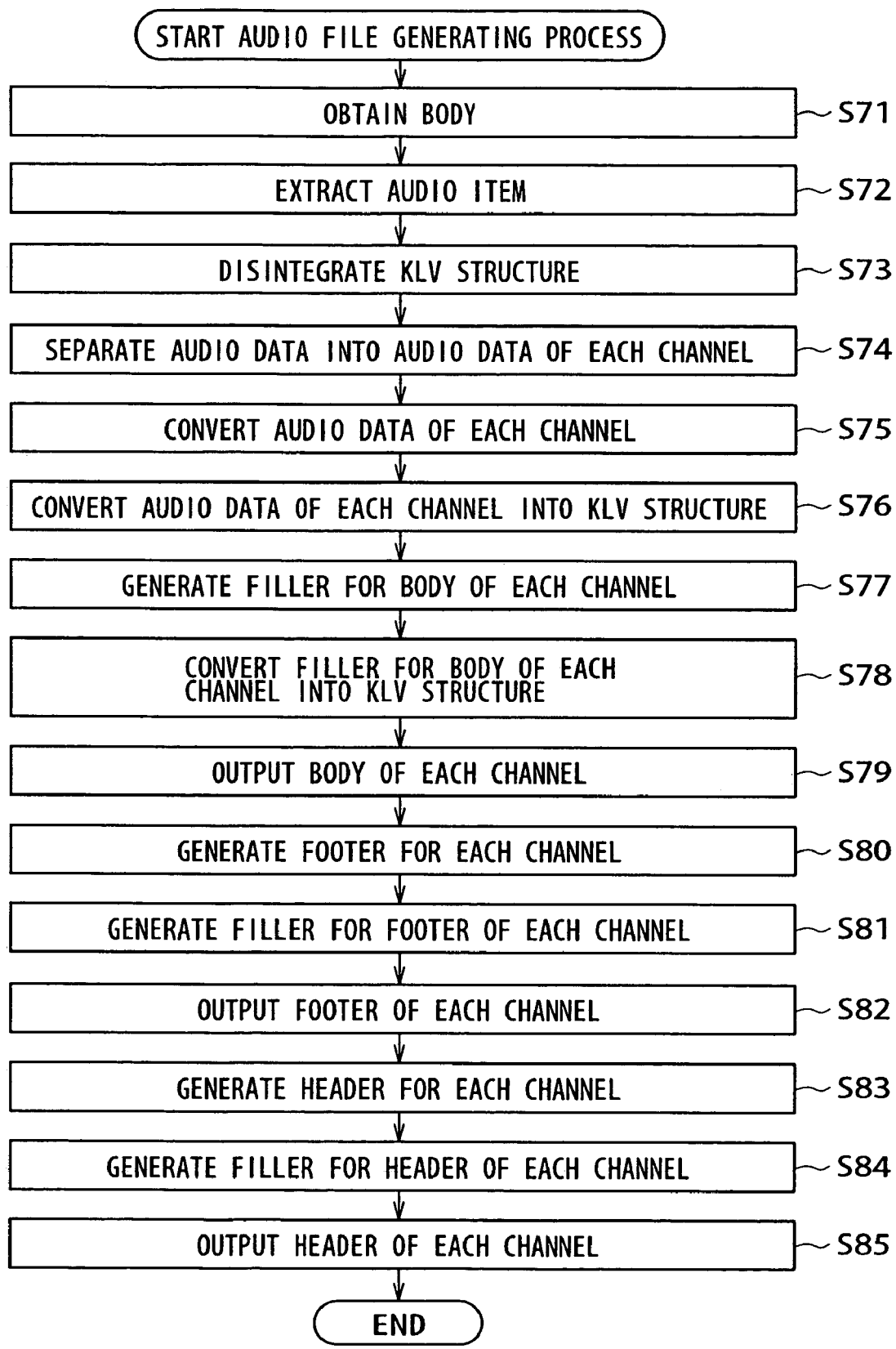
FIG. 16 is a flowchart of assistance in explaining an audio file generating process.

The audio file generating process for generating the audio file will next be described with reference to the flowchart of FIG. 16.

When a file in the standard AV multiplex format is supplied to and stored in the buffer 31 (FIG. 8), for example, the audio file generating process is started. First, in step S71, the body obtaining unit 34 obtains a body from the file in the standard AV multiplex format stored in the buffer 31. The body obtaining unit 34 supplies the body to the sound item extracting unit 42. The process proceeds to step S72. In step S72, the sound item extracting unit 42 extracts a sound item from each edit unit of the body supplied from the body obtaining unit 34. The sound item extracting unit 42 then supplies the sound item to the audio file generating unit 43. The process proceeds to step S73. In step S73, the KLV decoder 61 in the audio file generating unit 43 (FIG. 10) disintegrates the KLV structure of audio data disposed in the sound item of each edit unit, and supplies multiplexed eight-channel audio data (multiplexed audio data) obtained as a result of the disintegration to the channel separating unit 62. The process proceeds to step S74.

In step S74, the channel separating unit 62 separates audio data in the AES3 format of each channel from the multiplexed audio data in each sound item, the multiplexed audio data being supplied from the KLV decoder 61, disposes the audio data in the AES3 format of each channel en bloc for each channel, and then supplies the audio data of each channel to the data converting unit 63.

The process proceeds to step S75, where the data converting unit 63 converts the audio data in the AES3 format of each channel which data is supplied from the channel separating unit 62 into audio data in the WAVE format. The data converting unit 63 supplies the audio data in the WAVE format to the KLV encoder 64. The process proceeds to step S76. In step S76, the KLV encoder 64 KLV-codes each piece of audio data in the WAVE format collected for each channel which data is supplied from the data converting unit 63 into a KLV structure. Thereby the KLV encoder 64 generates a body of each channel in which body the audio data in the WAVE format of the channel is disposed en bloc. The process proceeds to step S77.

In step S77, the filler generating unit 67 generates a filler for the body of each channel which filler is adjusted in data amount such that when the filler is converted into a KLV structure, a data amount of the audio data is an integral multiple of an ECC block. The process proceeds to step S78. In step S78, the KLV encoder 68 KLV-codes the filler of the body of each channel into a KLV structure. The process proceeds to step S79. In step S79, the audio file generating unit 43 outputs the body of each channel. The process proceeds to step S80. When the body of each channel is outputted, the value of the audio data and the filler in the KLV structure are outputted, and the key and the length of the audio data are not outputted.

In step S80, the footer generating unit 66 generates a footer for each channel. The process proceeds to step S81. In step S81, the filler generating unit 67 generates a filler for the footer of each channel which filler is adjusted in data amount so that a data amount of the footer is an integral multiple of an ECC block. The process proceeds to step S82. In step S82, the audio file generating unit 43 outputs the footer of each channel. The process proceeds to step S83.

In step S83, the header generating unit 65 generates a header for each channel. The process proceeds to step S84. In step S84, the filler generating unit 67 generates a filler for the header of each channel which filler is adjusted in data amount so that a data amount of the header and the key and the length of the audio data is an integral multiple of an ECC block. The process proceeds to step S85. In step S85, the audio file generating unit 44-43 outputs the header of each channel. Then the audio file generating process is ended. In step S85, the key and the length of the audio data are outputted together with the header of each channel.

Thus, the header is generated after the body and the footer. Therefore the header, which includes data that is not determined until the body is set, such as audio data reproduction time, a time code (TC) or the like, can be generated by one process.

In addition, when the audio file is recorded onto a recording medium such as the optical disk 7 or the like, it is possible to record the header following the body and the footer reliably.

Figure 17:
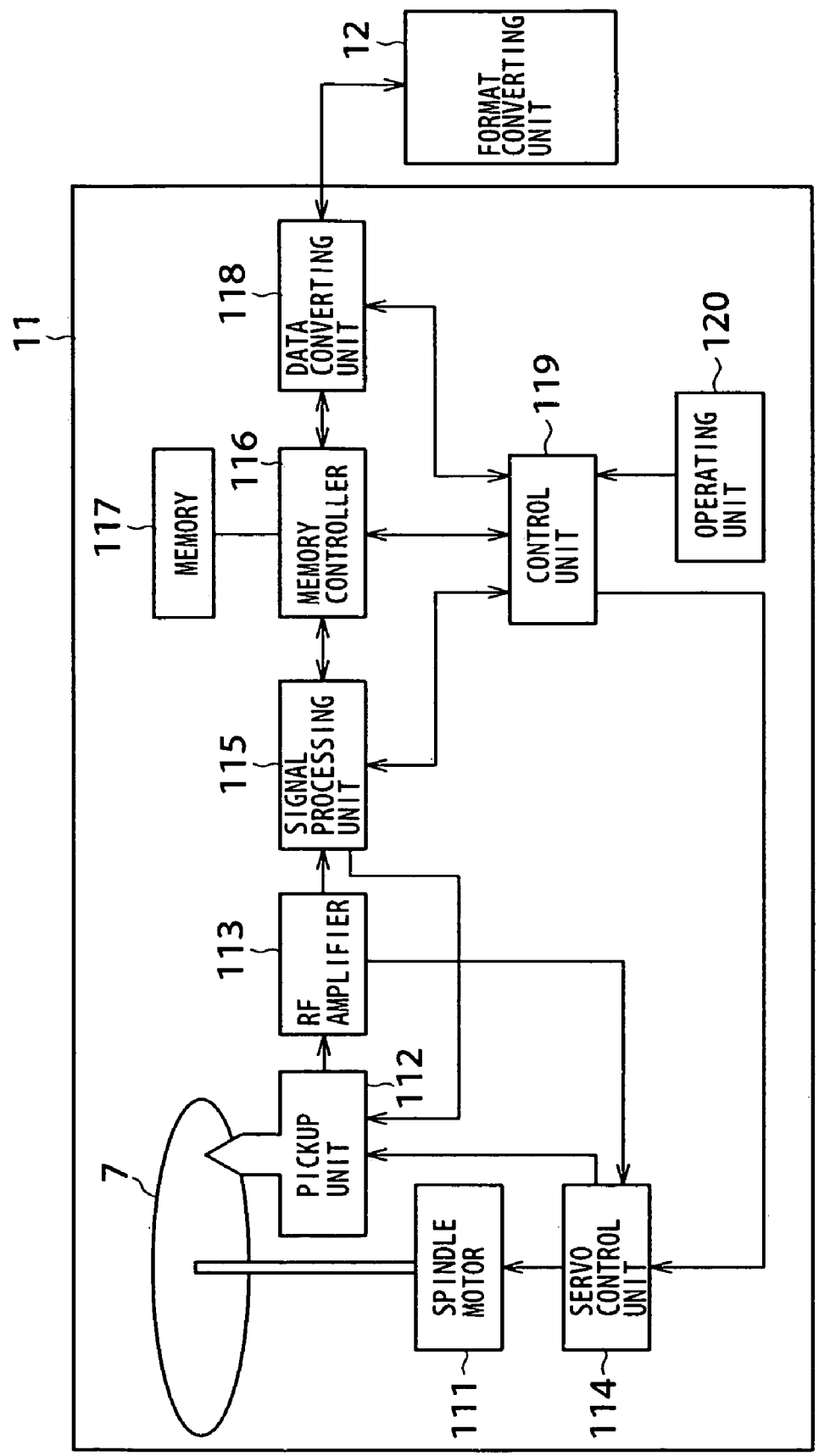
FIG. 17 is a block diagram showing an example of configuration of a disk drive device.

FIG. 17 shows an example of configuration of one embodiment of the disk drive device 11.

A spindle motor 111 rotation-drives the optical disc 7 at CLV (Constant Linear Velocity) or CAV (Constant Angular Velocity) on the basis of a spindle motor driving signal from a servo control unit 114.

A pickup unit 112 controls power of laser light on the basis of a recording signal supplied from a signal processing unit 115, and thereby records the recording signal onto the optical disk 7. The pickup unit 112 also irradiates the optical disk 7 with condensed laser light, and subjects light reflected from the optical disk 7 to photoelectric conversion. The pickup unit 112 thereby generates a current signal. The pickup unit 112 then supplies the current signal to an RF (Radio Frequency) amplifier 113. Incidentally, an irradiation position of the laser light is controlled to a predetermined position by a servo signal supplied from the servo control unit 114 to the pickup unit 112.

The RF amplifier 113 generates a focus error signal and a tracking error signal as well as a reproduced signal on the basis of the current signal from the pickup unit 112. The RF amplifier 113 then supplies the tracking error signal and the focus error signal to the servo control unit 114, and supplies the reproduced signal to the signal processing unit 115.

The servo control unit 114 controls focus servo operation and tracking servo operation. Specifically, the servo control unit 114 generates a focus servo signal and a tracking servo signal on the basis of the focus error signal and the tracking error signal, respectively, from the RF amplifier 113, and then supplies the focus servo signal and the tracking servo signal to an actuator (not shown) of the pickup unit 112. The servo control unit 114 also controls spindle servo operation by generating a spindle motor driving signal for driving the spindle motor 111 and rotating the optical disk 7 at a predetermined rotational speed.

Further, the servo control unit 114 performs sled control to move the pickup unit 112 in a direction of a radius of the optical disk 7 and thereby change the irradiation position of the laser light. Incidentally, a signal reading position of the optical disk 7 is set by a control unit 119, and the position of the pickup unit 112 is controlled so as to read a signal from the set reading position.

The signal processing unit 115 modulates recoding data inputted from a memory controller 116, thereby generates a recording signal, and then supplies the recording signal to the pickup unit 112. The signal processing unit 115 also demodulates the reproduced signal from the RF amplifier 113, thereby generates reproduced data, and then supplies the reproduced data to the memory controller 116.

The memory controller 116 stores the recording data from a data converting unit 118 in a memory 117 as required, as described later, and reads the recording data and supplies the recording data to the signal processing unit 115. The memory controller 116 also stores the reproduced data from the signal processing unit 115 in the memory 117 as required, and reads the reproduced data and supplies the reproduced data to the data converting unit 118.

The data converting unit 118 generates a file of low resolution data, which is data resulting from reduction of a data amount of data included in a file in the AV independent format, from the file in the AV independent format supplied from the format converting unit 12. The data converting unit 118 supplies the low resolution data file together with the file in the AV independent format to the memory controller 116.

The data converting unit 118 also supplies the reproduced data supplied from the memory controller 116 to the format converting unit 12.

The control unit 119 controls the servo control unit 114, the signal processing unit 115, the memory controller 116, and the data converting unit 118 on the basis of an operating signal from an operating unit 120 or the like to perform recording and reproduction processing.

The operating unit 120 is operated by a user, for example, and supplies an operating signal corresponding to the operation to the control unit 119.

In the thus included disk drive device 11, when a command to record data is entered by a user operating the operating unit 120, the data supplied from the format converting unit 12 is supplied to the optical disk 7 via the data converting unit 118, the memory controller 116, the signal processing unit 115, and the pickup unit 112, and recorded onto the optical disk 7.

When a command to reproduce data is entered by a user operating the operating unit 120, data is read and reproduced from the optical disk 7 via the pickup unit 112, the RF amplifier 113, the signal processing unit 115, the memory controller 116, and the data converting unit 118, and supplied to the format converting unit 12.

Figure 18:
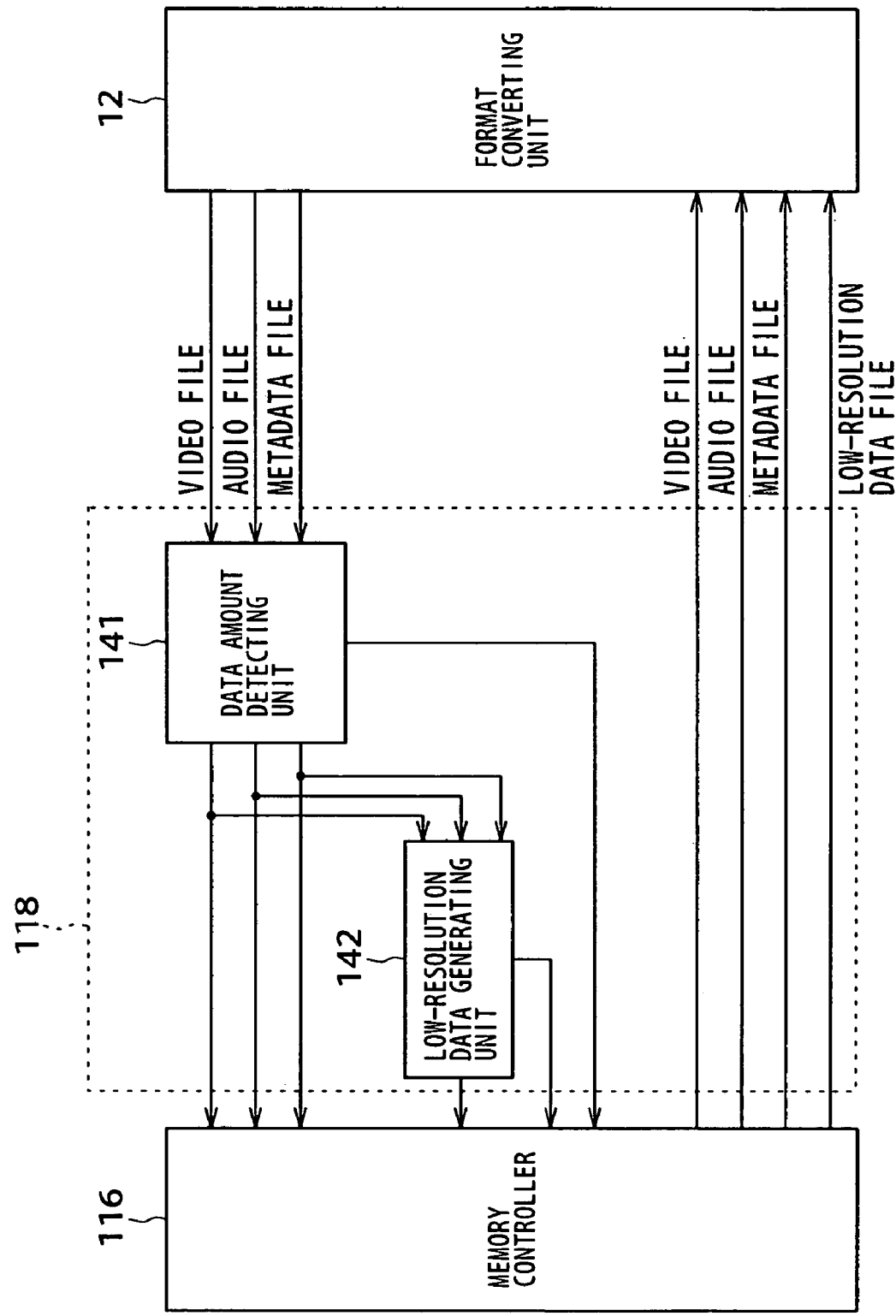
FIG. 18 is a block diagram showing an example of configuration of a data converting unit.

FIG. 18 shows an example of configuration of the data converting unit 118 in FIG. 17.

At the time of recording of data onto the optical disk 7, a file in the AV independent format including a video file, an audio file, and a metadata file to be recorded is supplied from the format converting unit 12 to a data amount detecting unit 141.

The data amount detecting unit 141 supplies each of the video file, the audio file, and the metadata file supplied from the format converting unit 12 to the memory controller 116 as it is. The data amount detecting unit 141 also detects data amounts of the video file and the audio file, and supplies the data amounts to the memory controller 116. Specifically, the data amount detecting unit 141 detects data amounts for a predetermined reproduction time, for example, of the video file and the audio file supplied from the format converting unit 12, and supplies the data amounts to the memory controller 116.

A low-resolution data generating unit 142 generates a data series of low resolution data resulting from reduction of the data amount of data supplied thereto, and supplies the data series of low resolution data to the memory controller 116. In this case, the low-resolution data generating unit 142 outputs low resolution data in a file format. Also, the low-resolution data generating unit 142 detects a data amount for a predetermined reproduction time, for example, of the low resolution file, and supplies the data amount to the memory controller 116.

The low resolution data in the file format will hereinafter be referred to also as a low resolution data file.

Then, the video file and the audio file supplied to the memory controller 116 are supplied to the optical disk 7 to be recorded onto the optical disk 7 as described above.

The data series of the video file and the audio file supplied from the format converting unit 12 and the data series of the low resolution data outputted by the low-resolution data generating unit 142 are video and audio data series of identical contents. However, the video file and the audio file supplied from the format converting unit 12 are, in a manner of speaking, essentially to be supplied to users. Thus, the video file and the audio file supplied from the format converting unit 12 will hereinafter be referred to as main line data as required.

As described above, the low resolution data is video and audio data of the same contents as the main line data, but has a smaller data amount. Hence, when reproduction for a certain reproduction time is to be performed, the low resolution data can be read from the optical disk 7 in a shorter time than the main line data.

Incidentally, about 25 Mbps (Mega bit per second), for example, can be adopted as a data rate of the main line data.

In this case, about 3 Mbps, for example, can be adopted as a data rate of the low resolution data. In this case, further supposing that about 2 Mbps, for example, is adopted as a data rate of metadata, a data rate of the data as a whole to be recorded onto the optical disk 7 is about 30 (=25+3+2) Mbps. Therefore a product well within a practical range, which has a recording rate of 35 Mbps, for example, can be used as the optical disk 7 (the disk drive device 11 that drives the optical disk 7).

As described above, the data converting unit 118 in FIG. 17 supplies not only the data series of main line data (the video file and the audio file) but also the data series of metadata and low resolution data to the memory controller 116. Then, the main line data, the metadata, and the low resolution data supplied to the memory controller 116 are supplied to the optical disk 7 and recorded onto the optical disk 7.

At the time of reproduction of data from the optical disk 7, on the other hand, a video file, an audio file, a metadata file, and a low resolution data file are read from the optical disk 7 and then supplied to the format converting unit 12.

Figure 19:
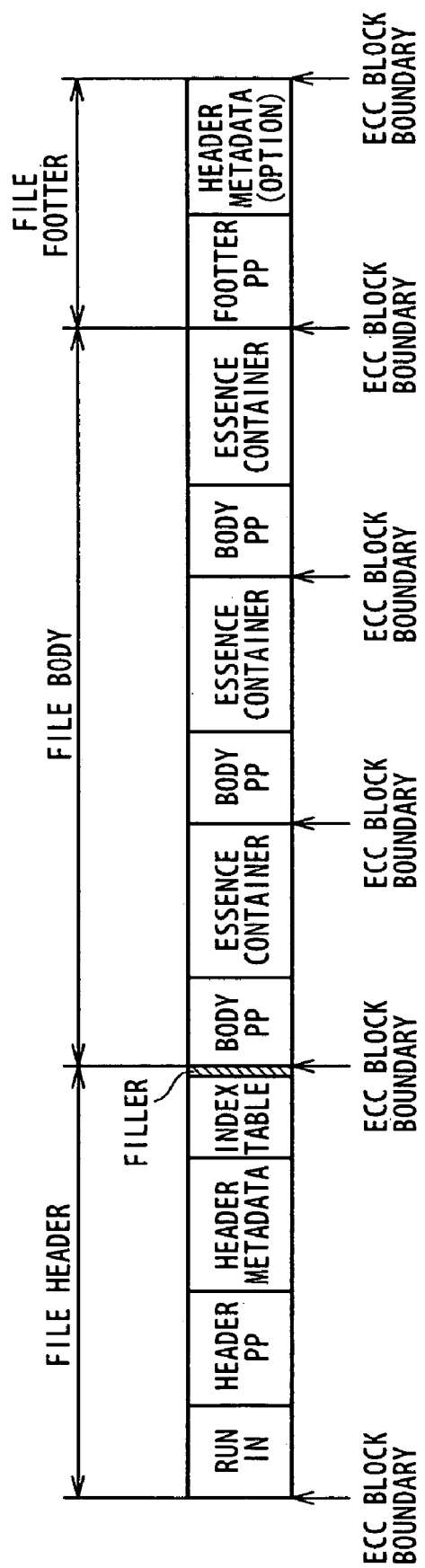
FIG. 19 is a diagram of assistance in explaining a structure of a low resolution data file.

A structure of a low resolution data file will next be described with reference to FIGS. 19 to 24. As shown in FIG. 19, a run in (Run In), a header partition pack (Header Partition Pack), header metadata (Header Metadata), an index table (Index Table), and a filler are disposed in a header of the low resolution data file. In a body of the low resolution data file, essence containers (Essence Containers) are disposed in a state of being divided from each other by body partition packs (Body Partition Packs).

Disposed in a footer of the low resolution data file are a footer partition pack Footer Partition Pack) and header metadata (Header Metadata). The header metadata in the footer is an option.

The header partition pack, the header metadata, the index table, and the footer partition pack in the low resolution data file are the same as in a file in the standard AV multiplex format, and therefore description thereof will be omitted.

Size of the header of the low resolution data file is an integral multiple of the ECC block length of the optical disk 7. One pair of a body partition pack and an essence container disposed in the body of the low resolution data file is an integral multiple of the ECC block length of the optical disk 7. Size of the footer of the low resolution data file is an integral multiple of the ECC block length of the optical disk 7.

Figure 20:
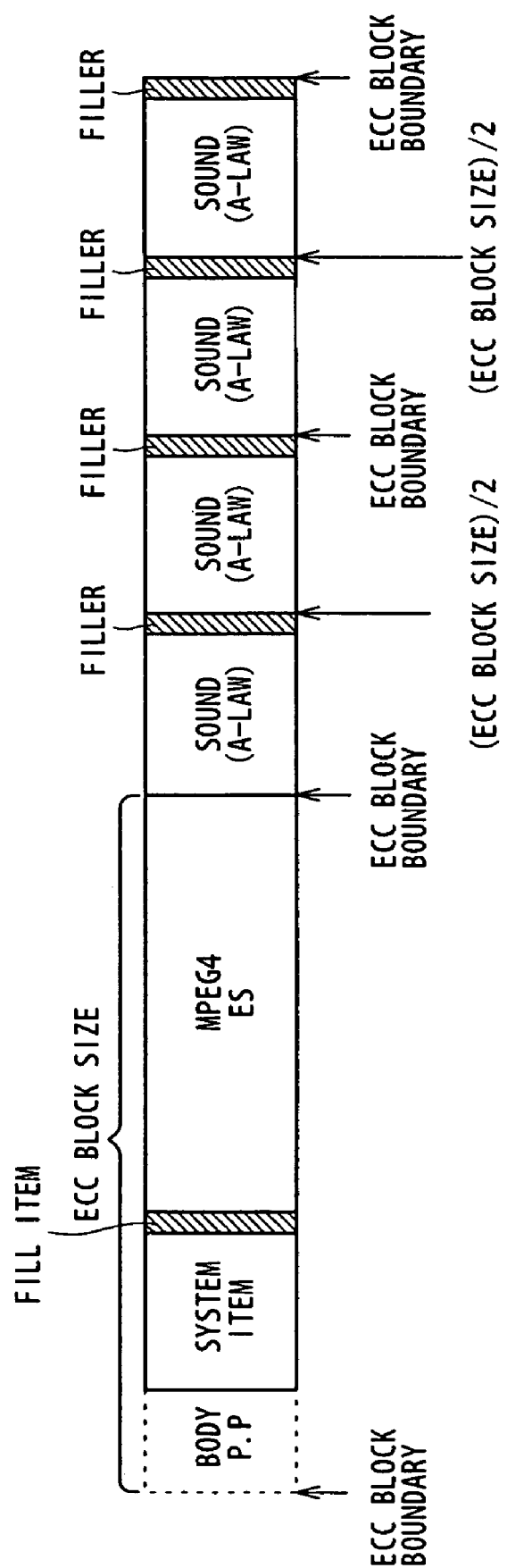
FIG. 20 is a diagram of assistance in explaining the structure of the low resolution data file.

FIG. 20 is a diagram showing a structure of a body partition pack and an essence container disposed in the body of the low resolution data file. The essence container contains a system item, a picture essence (video data) of an MPEG4 elementary stream system, and a sound essence (sound data). A fill item is disposed between the system item and the picture essence. The body partition pack, the system item, the fill item, and the picture essence have an integral multiple of the ECC block length of the optical disk 7.

The sound essence is divided into four pieces, which each have a filler added thereto. A data amount of one pair of a divided sound essence and a filler added to the divided sound essence is ½ of the ECC block length of the optical disk 7. That is, a data amount of two pairs of divided sound essences and fillers is equal to the ECC block length of the optical disk 7. Hence, a total data amount of sound essences and fillers added to the sound essences in one essence container is twice the ECC block length of the optical disk 7.

Figure 21:
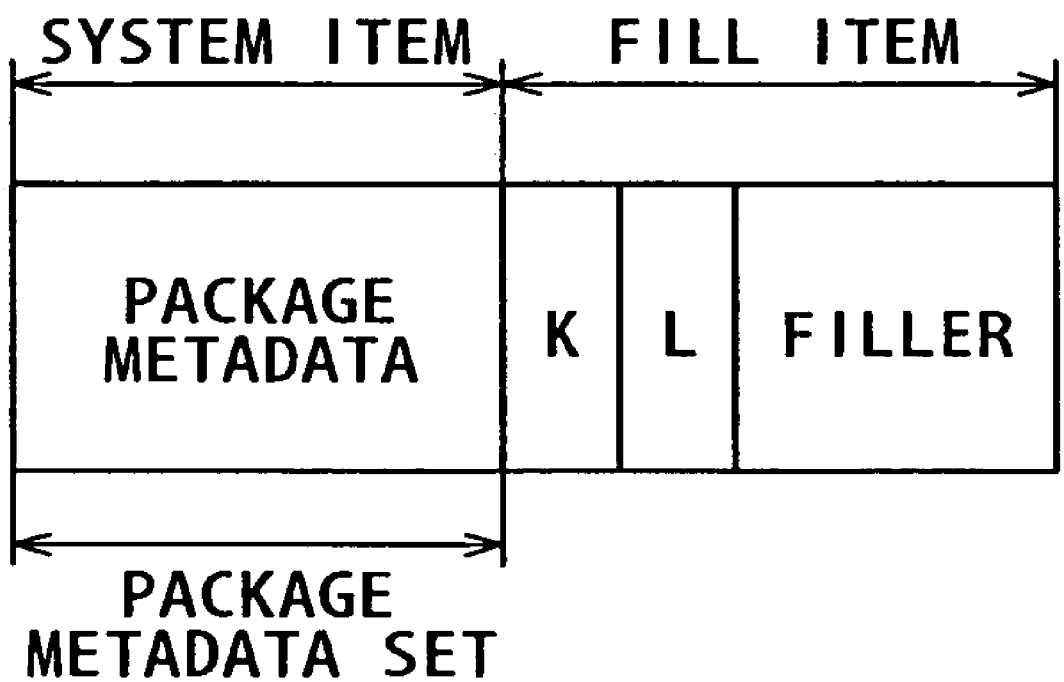
FIG. 21 is a diagram of assistance in explaining a structure of a system item.

FIG. 21 is a diagram showing a structure of the system item and the fill item of the header. The system item contains package metadata (Package Metadata). The fill item includes a filler having a KLV structure.

FIG. 22 is a diagram showing a structure of the picture essence. The picture essence is video data of the MPEG4 elementary stream system which data has a KLV structure. Specifically, in the case of video data with a total number of scanning lines/frame rate of 525/60 (59.94), in the case of video data of progressive scan images with a frame rate of 24 (23.97), or in the case of video data of progressive scan images with a frame rate of 60 (59.94), six GOVs (Groups of VideoObjectPlane) are disposed in the picture essence of one edit unit. On the other hand, in the case of video data with a total number of scanning lines/frame rate of 625/50, five GOVs are disposed in the picture essence of one edit unit. An intra-frame coded I-VOP (Intra Video Object Plane) is disposed at a start of one GOV, and following the I-VOP, a predetermined number of inter-frame forward-direction predictive coded P-VOPs (Predicted Video Object Planes) are disposed.

FIG. 23 is a diagram of assistance in explaining data amounts of the picture essence having the KLV structure. In the case of video data with a total number of scanning lines/frame rate of 525/60 (59.94), a data amount of a value is 384000 bytes (octets), that is, a data amount of one GOV is 6400 bytes. In this case, 10 frame images are contained in one GOV.

In the case of video data of progressive scan images with a frame rate of 24 (23.97), a data amount of a value is 384000 bytes, that is, a data amount of one GOV is 6400 bytes. In this case, eight frame images are contained in one GOV.

In the case of video data of progressive scan images with a frame rate of 60 (59.94), a data amount of a value is 384000 bytes, that is, a data amount of one GOV is 6400 bytes. In this case, 20 frame images are contained in one GOV.

In the case of video data with a total number of scanning lines/frame rate of 625/50, a data amount of a value is 384000 bytes, that is, a data amount of one GOV is 76800 bytes. In this case, 10 frame images are contained in one GOV.

Figure 24:
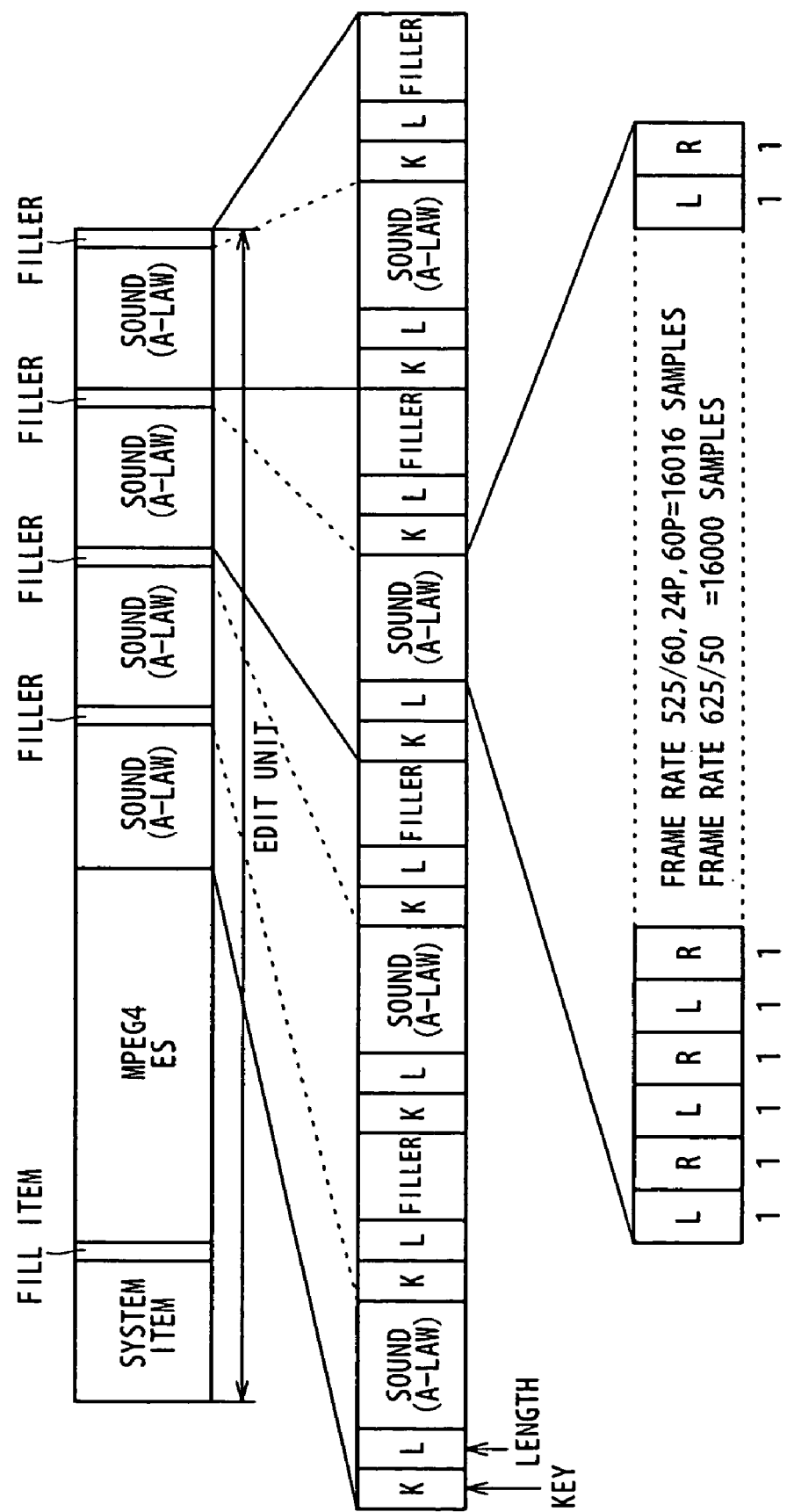
FIG. 24 is a diagram showing a structure of a sound essence.

FIG. 24 is a diagram showing a structure of the sound essence. The sound essence of the low resolution data file is two-channel data of a system based on an ITU-T (International Telecommunication Union, Telecommunication Standardization Sector) G.711 standard. The sound essence is divided into four pieces, which each have a KLV structure. Each of the divided pieces of data in the KLV structure has a filler in a KLV structure added thereto.

Samples of two channels are disposed alternately in a value. In the case of a sound essence for a picture essence with a total number of scanning lines/frame rate of 525/60 (59.94), in the case of a sound essence for a picture essence of progressive scan images with a frame rate of 24 (23.97), or in the case of a sound essence for a picture essence of progressive scan images with a frame rate of 60 (59.94), 16016 samples are disposed in one sound essence of four divided sound essences. On the other hand, in the case of a sound essence for a picture essence with a total number of scanning lines/frame rate of 625/50, 16000 samples are disposed in one sound essence of four divided sound essences.

Figure 25:
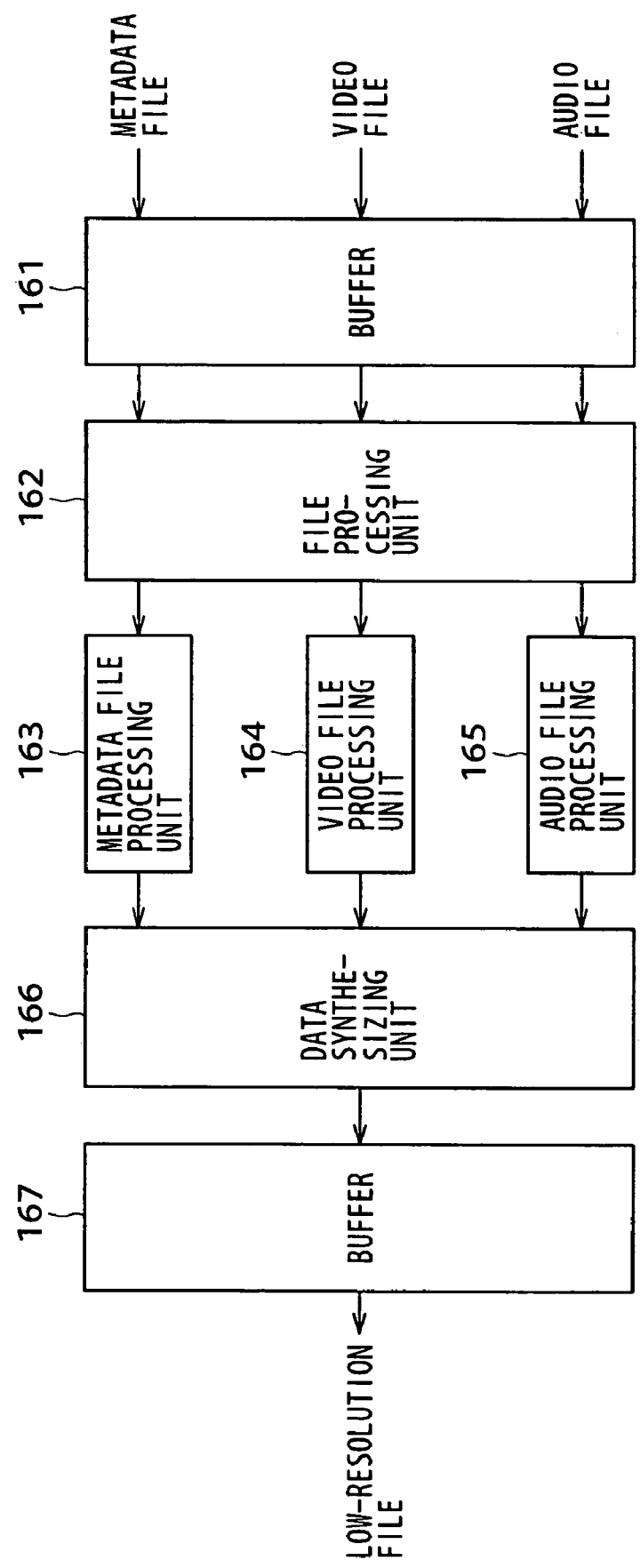
FIG. 25 is a block diagram showing a configuration of a low resolution data generating unit.

FIG. 25 is a block diagram showing a configuration of the low-resolution data generating unit 142.

A buffer 161 temporarily stores files in the AV independent format (a master file, a file unit metadata file, a frame unit metadata file, an auxiliary file, a video file, and an audio file of each of eight channels) supplied from the format converting unit 12.

A file processing unit 162 recognizes file names of the file unit metadata file, the frame unit metadata file, the auxiliary file, the video file, and the audio file of each of the eight channels by referring to the master file stored in the buffer

161. On the basis of the file names, the file processing unit 162 obtains the file unit metadata file, the frame unit metadata file, the auxiliary file, the video file; and the audio file of each of the eight channels from the format converting unit 12 via the buffer 161. Further, the file processing unit 162 supplies the obtained file unit metadata file and the frame unit metadata file to a metadata file processing unit 163, supplies the video file to a video file processing unit 164, and supplies the audio file of each of the eight channels to an audio file processing unit 165.

The metadata file processing unit 163 extracts file unit metadata from the file unit metadata file supplied from the file processing unit 162. The metadata file processing unit 163 also extracts system items having frame unit metadata disposed therein from the frame unit metadata file, and then supplies the system items to a data synthesizing unit 166.

The video file processing unit 164 extracts picture items from the video file supplied from the file processing unit 162, generates picture essences for a low resolution data file from the extracted picture items, and then supplies the picture essences to the data synthesizing unit 166.

The audio file processing unit 165 extracts audio data of each channel from the audio file of each of the eight channels supplied from the file processing unit 162, and generates low-bit-rate audio data from the extracted audio data. Further, the audio file processing unit 165 constructs sound essences obtained by multiplexing and disposing the audio data of each channel, and then supplies the sound essences to the data synthesizing unit 166.

The data synthesizing unit 166 constructs a low resolution data file using the file unit metadata and the system items supplied from the metadata file processing unit 163, the picture essences supplied from the video file processing unit 164, and the sound essences supplied from the audio file processing unit 165. The data synthesizing unit 166 then supplies the low resolution data file to a buffer 167.

The buffer 167 temporarily stores the low resolution data file supplied from the data synthesizing unit 166, and then supplies the low resolution data file to the memory controller 116.

FIG. 26 is a block diagram of assistance in explaining a configuration of the video file processing unit 164. A disintegrating unit 181 disintegrates the video file supplied from the file processing unit 162 into picture items. The disintegrating unit 181 supplies the disintegrated picture items to a data converting unit 182. The data converting unit 182 converts the disintegrated picture items into video data of the MPEG4 system. The data converting unit 182 then supplies the video data to a KLV encoder 183. The KLV encoder 183 KLV-encodes the picture essences supplied from the data converting unit 182 into a KLV structure. The KLV encoder 183 then supplies the picture essences in the KLV structure to the data synthesizing unit 166.

FIG. 27 is a block diagram of assistance in explaining a configuration of the audio file processing unit 165. A KLV decoder 201 disintegrates a KLV structure of a body in the audio file of each channel supplied from the file processing unit 162. The KLV decoder 201 supplies thereby obtained audio data in the WAVE format of each channel to a data converting unit 202.

The data converting unit 202 converts the audio data in the WAVE format of each channel supplied from the KLV decoder 201 into two-channel audio data in the ITU-T G.711 format. The data converting unit 202 then supplies the two-channel audio data to a channel multiplexing unit 203. The channel multiplexing unit 203 multiplexes the two-channel audio data supplied from the data converting unit 202 in sample units. The channel multiplexing unit 203 supplies multiplexed audio data obtained as a result of the multiplexing to a KLV encoder 204. The KLV encoder 204 divides the audio data supplied from the channel multiplexing unit 203 into four pieces of audio data, KLV-codes each of the divided pieces of audio data into a KLV structure, and then supplies each piece of audio data in the KLV structure to a filler generating unit 205.

The filler generating unit 205 generates a filler for each piece of audio data in the KLV structure. The filler generating unit 205 adds the filler to the audio data. The filler generating unit 205 then supplies the audio data having the filler added thereto to a KLV encoder 206. The KLV encoder 206 KLV-codes the filler added to the audio data into a KLV structure. The KLV encoder 206 then outputs a sound essence to which the filler in the KLV structure is added.

Figure 28:
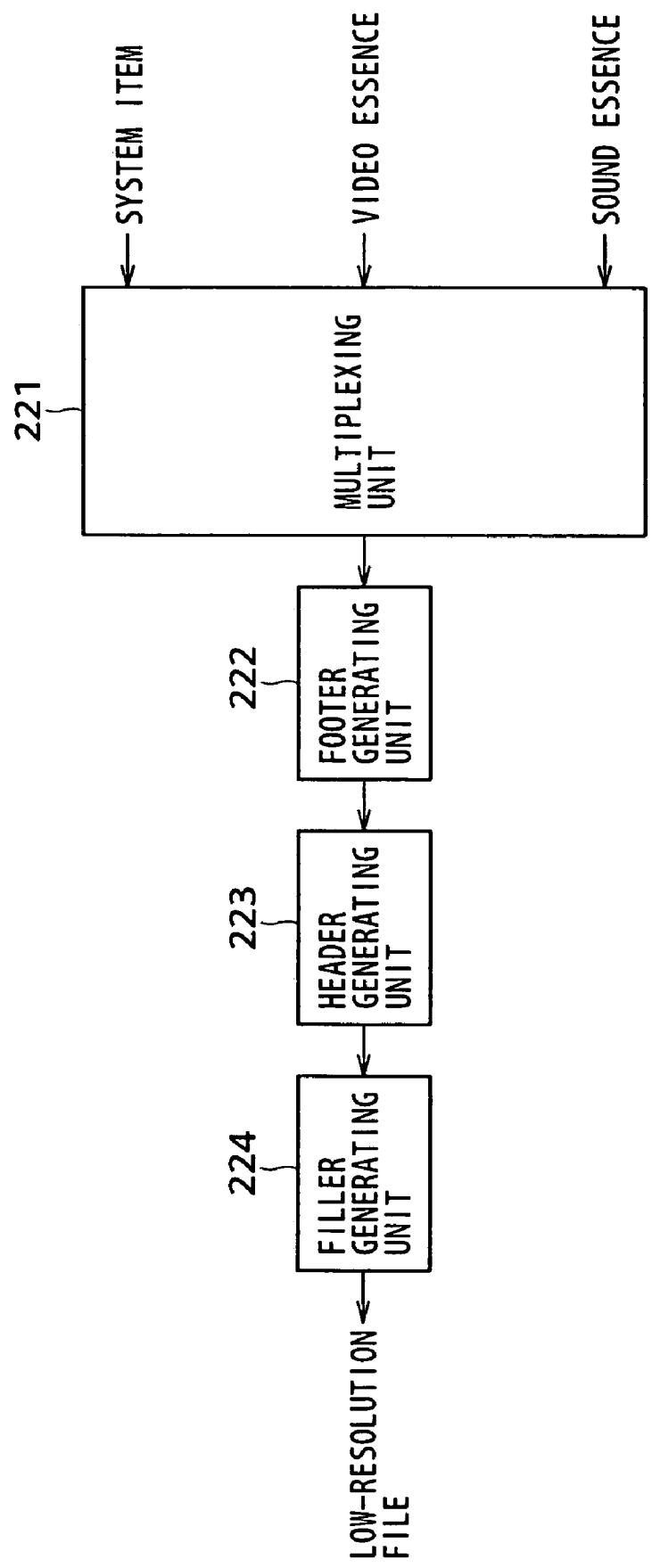
FIG. 28 is a block diagram showing a configuration of a data synthesizing unit.

FIG. 28 is a block diagram showing a configuration of the data synthesizing unit 166. A multiplexing unit 221 multiplexes the system items supplied from the metadata file processing unit 163, the video essences supplied from the video file processing unit 164, and the sound essences supplied from the audio file processing unit 165. The multiplexing unit 221 adds a body partition to generate a body. The multiplexing unit 221 supplies the generated body to a footer generating unit 222. The footer generating unit 222 generates a footer, adds the footer to the body, and then supplies the body and the footer to a header generating unit 223.

The header generating unit 223 generates a header, adds the header to the body and the footer, and then supplies the body, the footer, and the header to a filler generating unit 224. The filler generating unit 224 generates a filler to be added to the header, adds the generated filler to the header, and then outputs a low-resolution file having the filler added thereto.

Figure 29:
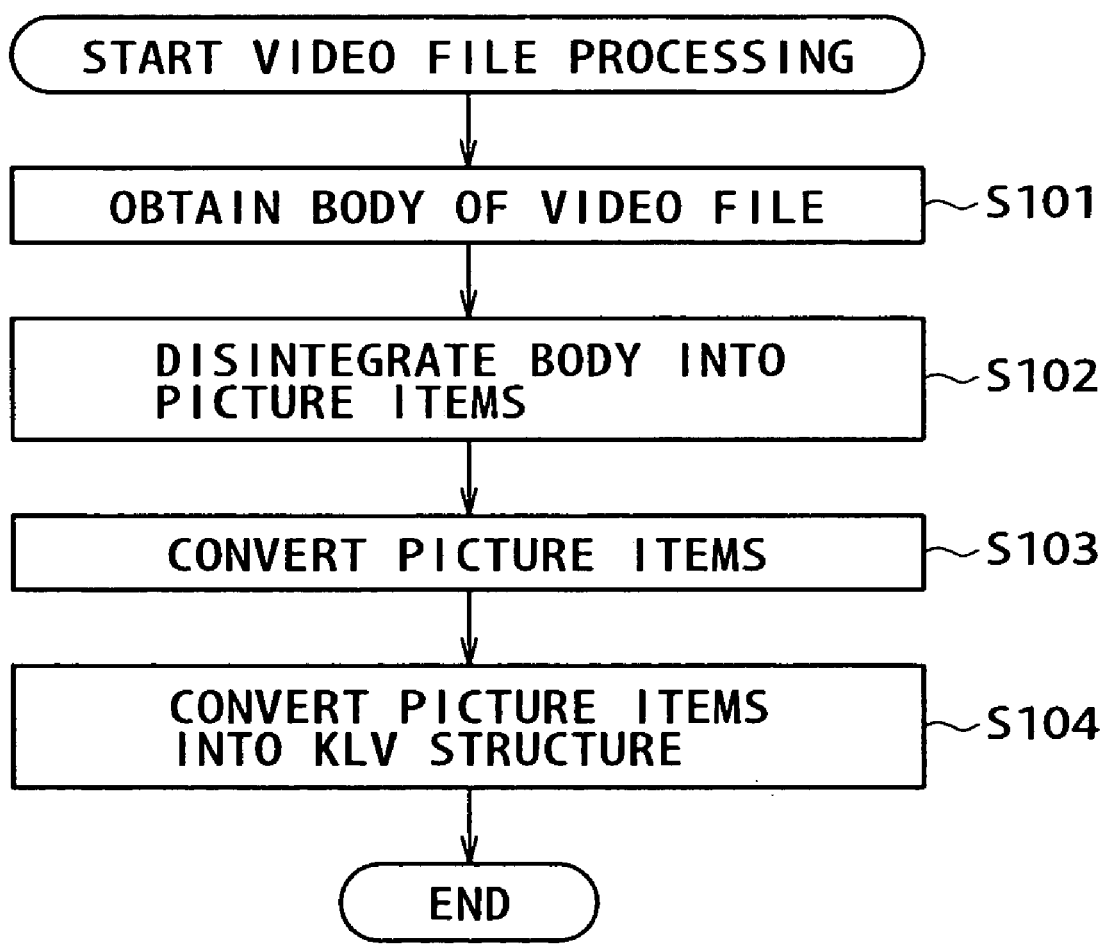
FIG. 29 is a flowchart of assistance in explaining video file processing.

FIG. 29 is a flowchart of assistance in explaining video file processing. In step S101, the file processing unit 162 obtains a body of a video file from the format converting unit 12 via the buffer 161. The process proceeds to step S102. In step S102, the disintegrating unit 181 disintegrates the video file supplied from the file processing unit 162 into picture items. The process proceeds to step S103. In step S103, the data converting unit 182 converts the disintegrated picture items into video data of the MPEG4 system. The process proceeds to step S104. In step S104, the KLV encoder 183 KLV-encodes the picture items supplied from the data converting unit 182 into a KLV structure to thereby form picture essences. Then the video file processing is ended.

Figure 30:
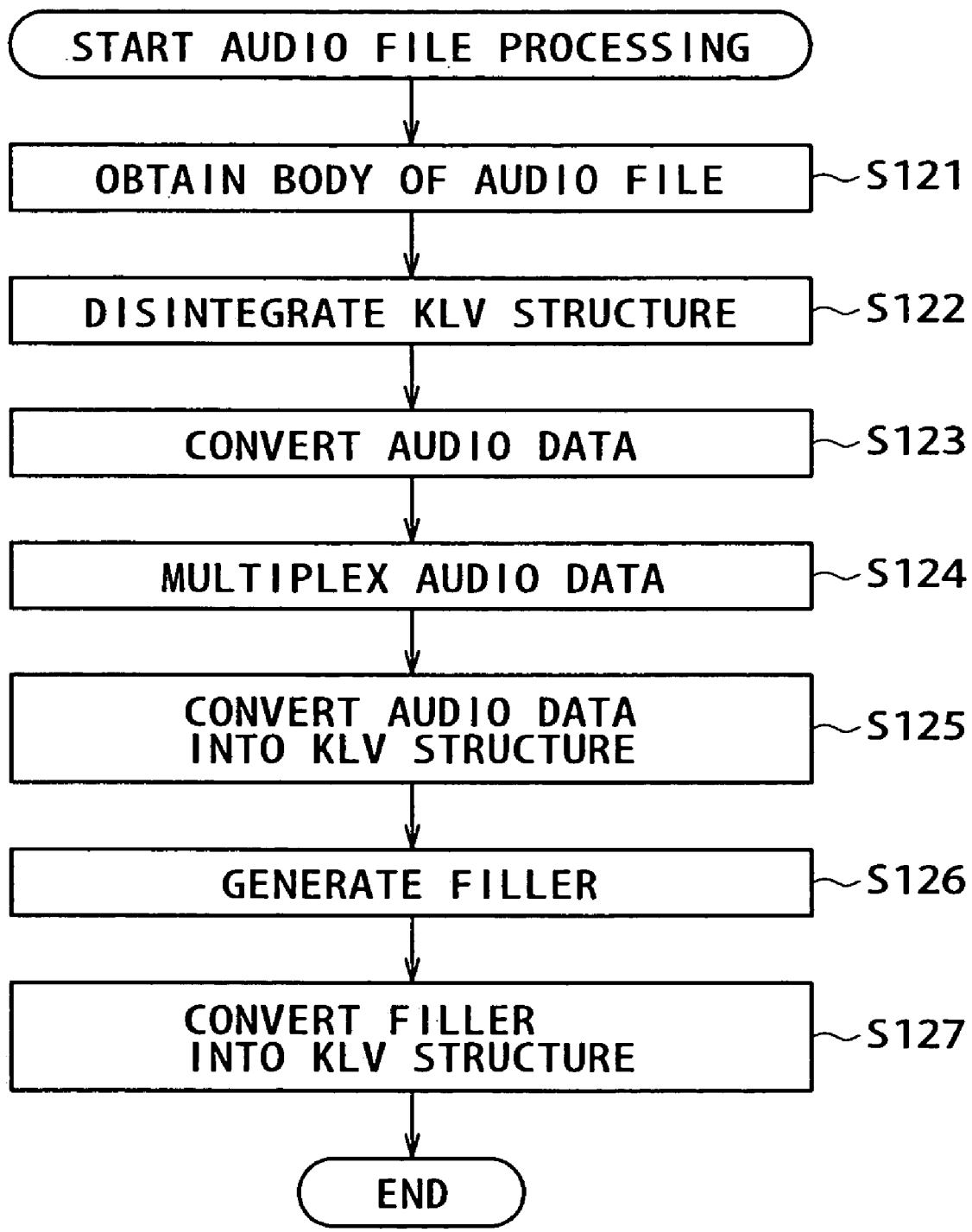
FIG. 30 is a flowchart of assistance in explaining audio file processing.

FIG. 30 is a flowchart of assistance in explaining audio file processing. In step S121, the file processing unit 162 obtains a body of an audio file from the format converting unit 12 via the buffer 161. The process proceeds to step S122. In step S122, the KLV decoder 201 disintegrates a KLV structure of the body in the audio file of each channel supplied from the file processing unit 162. The process proceeds to step S123.

In step S123, the data converting unit 202 converts the audio data in the WAVE format of each channel supplied from the KLV decoder 201 into two-channel audio data in the ITU-T G.711 format. The process proceeds to step S124. In step S124, the channel multiplexing unit 203 multiplexes the two-channel audio data supplied from the data converting unit 202 in sample units. The process proceeds to step S125. In step S125, the KLV encoder 204 divides the audio data supplied from the channel multiplexing unit 203 into four pieces of audio data, and KLV-codes each of the divided pieces of audio data into a KLV structure. The process proceeds to step S126.

In step S126, the filler generating unit 205 generates a filler for each piece of audio data in the KLV structure. The filler generating unit 205 adds the filler to the audio data. The process proceeds to step S127. In step S127, the KLV encoder 206 KLV-codes the filler added to the audio data into a KLV structure to thereby form a sound essence. Then the audio file processing is ended.

Figure 31:
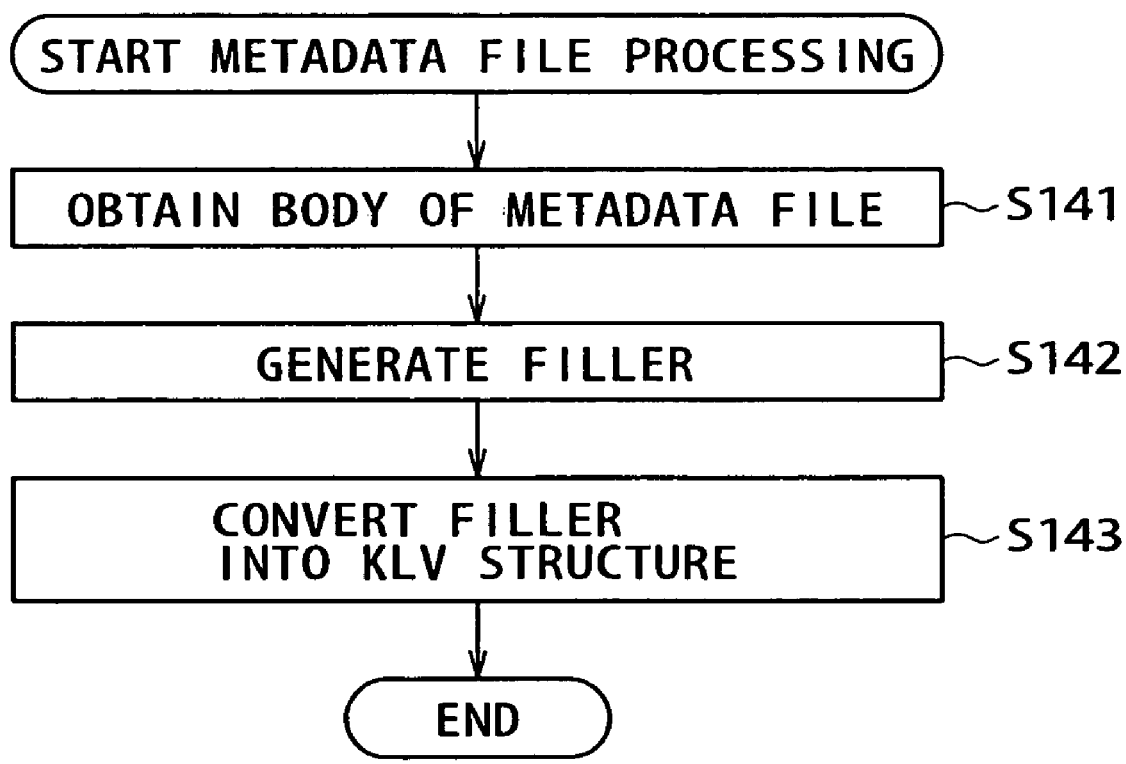
FIG. 31 is a flowchart of assistance in explaining metadata file processing.

FIG. 31 is a flowchart of assistance in explaining metadata file processing. In step S141, the file processing unit 162 obtains a body of a metadata file from the format converting unit 12 via the buffer 161, and converts the body of the metadata file into system items. The process proceeds to step S142. In step S142, the metadata file processing unit 163 generates a filler. The process proceeds to step S143. In step S143, the metadata file processing unit 163 KLV-codes the filler added to a system item into a KLV structure to thereby form a fill item. The metadata file processing unit 163 outputs the system item having the fill item added thereto. Then the metadata file processing is ended.

Figure 32:
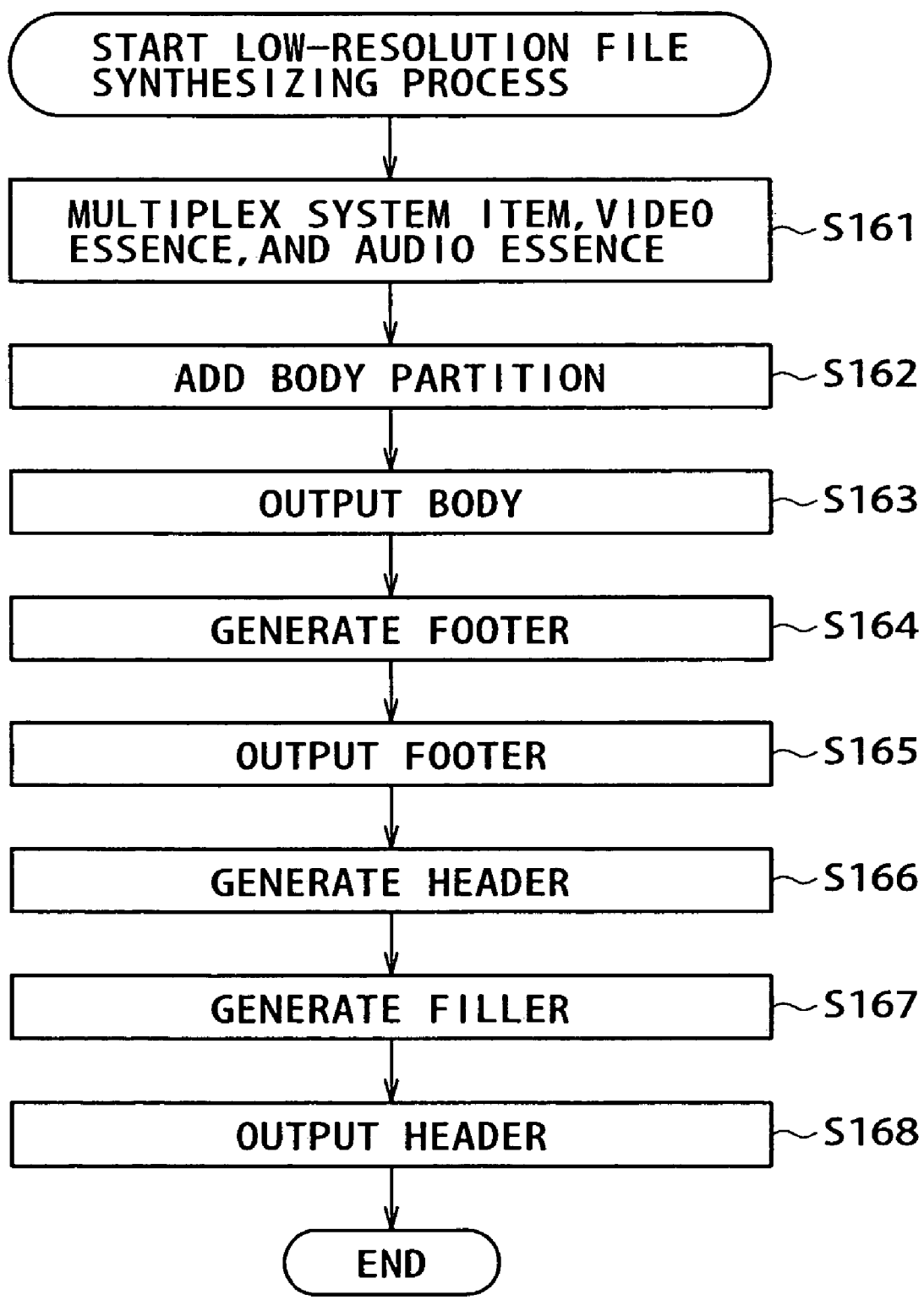
FIG. 32 is a flowchart of assistance in explaining low resolution file synthesizing processing.

FIG. 32 is a flowchart of assistance in explaining low resolution data file synthesizing processing. In step S161, the multiplexing unit 221 multiplexes system items supplied from the metadata file processing unit 163, video essences supplied from the video file processing unit 164, and sound essences supplied from the audio file processing unit 165. The multiplexing unit 221 thereby generates essence containers. The process proceeds to step S162. In step S162, the multiplexing unit 221 adds a body partition to the essence containers to generate a body. The process proceeds to step S163.

In step S163, the data synthesizing unit 166 outputs the body. The process proceeds to step S164. In step S164, the footer generating unit 222 generates a footer. The process proceeds to step S165. In step S165, the data synthesizing unit 166 outputs the footer. The process proceeds to step S166.

In step S166, the header generating unit 223 generates a header. The process proceeds to step S167. In step S167, the filler generating unit 224 generates a filler to be added to the header. The process proceeds to step S168. In step S168, the data synthesizing unit 166 outputs the header having the filler added thereto. Then the low resolution data file synthesizing processing is ended.

A recording process performed by the control unit 119 will next be described with reference to a flowchart of FIG. 33.

When an operating signal as a command to start the recording process is supplied from the operating unit 120 to the control unit 119 by operating the operating unit 120, the control unit 119 starts the recording process.

Specifically, in step S231, the control unit 119 first sets an audio annual ring size $T_{sa}$ and a video annual ring size $T_{sv}$ as well as a low-resolution annual ring size $T_{sl}$ and a meta annual ring size $T_{sm}$.

The audio annual ring size $T_{sa}$ is a variable for determining a data amount of an audio file to be disposed and recorded en bloc on the optical disk 7. The audio annual ring size $T_{sa}$ is represented by a reproduction time of the audio file, for example. Similarly, the video annual ring size $T_{sv}$ is a variable for determining a data amount of a video file to be disposed and recorded en bloc on the optical disk 7. The video annual ring size $T_{sv}$ is represented by a reproduction time of the video file, for example.

Incidentally, the audio annual ring size $T_{sa}$ and the video annual ring size $T_{sv}$ are not represented by data amount itself such as the number of bits or the number of bytes, for example, but are represented by reproduction time indirectly, so to speak, for the following reasons.

As will be described later, the recording process of FIG. 33 periodically disposes and records, on the optical disk 7; audio annual ring data as unities of audio files each having a data amount based on the audio annual ring size $T_{sa}$ extracted from an audio file series and video annual ring data as unities of video files each having a data amount based on the video annual ring size $T_{sv}$ extracted from a video file series.

Considering video and audio reproduction when the audio annual ring data and the video annual ring data are periodically disposed and recorded on the optical disk 7, the reproduction can be performed only after a video file and an audio file accompanying the video file are read out. From a viewpoint of the reproduction, audio annual ring data for a certain reproduction time period and video annual ring data for the reproduction time period should be recorded at positions close to each other, for example positions adjacent to each other on the optical disk 7.

However, a comparison between data amounts of an audio file and a video file for the same reproduction time generally indicates that the data amounts differ from each other greatly. That is, a data amount of an audio file for a certain reproduction time is considerably smaller than a data amount of a video file for the reproduction time. Further, data rates of the audio file and the video file are variable, and not fixed in some cases.

Thus, when the audio annual ring size $T_{sa}$ and the video annual ring size $T_{sv}$ are represented by data amounts, and audio annual ring data and video annual ring data in the respective data amounts are sequentially extracted from an audio file series and a video file series, respectively, audio annual ring data for reproduction time periods from gradually advanced (later) reproduction times with respect to video annual ring data for the reproduction time periods is obtained. It is consequently difficult to dispose an audio file and a video file to be reproduced for the same reproduction time period at positions close to each other on the optical disk 7.

On the other hand, when the audio annual ring size $T_{sa}$ and the video annual ring size $T_{sv}$ are represented by a reproduction time, and audio annual ring data and video annual ring data in respective data amounts for the reproduction time are sequentially extracted from an audio file series and a video file series, respectively, audio annual ring data and video annual ring data for similar reproduction time periods can be obtained as a set. It is consequently possible to dispose an audio file and a video file to be reproduced for the same reproduction time period at positions close to each other.

It is desirable to set the audio annual ring size $T_{sa}$ to a value such that as compared with reading audio annual ring data in a data amount for a reproduction time represented by the audio annual ring size $T_{sa}$ from the optical disk 7, performing a seek and skipping the read is faster. The same is true for the video annual ring size $T_{sv}$. From experiences of a present inventor, such a video annual ring size $T_{sv}$ is for example 1.5 seconds to 2 seconds.

In order to form audio annual ring data and video annual ring data for similar reproduction time periods, it suffices to set the audio annual ring size $T_{sa}$ and the video annual ring size $T_{sv}$ to an identical value. In this case, from the above-mentioned viewpoint of the reproduction, it is desirable that the audio annual ring data and the video annual ring data for the similar reproduction time periods be disposed alternately on the optical disk 7.

Further, it is possible to set the audio annual ring size $T_{sa}$ and the video annual ring size $T_{sv}$ to different values. Considering that generally a data rate of an audio file is considerably lower than a data rate of a video file, the audio annual ring size $T_{sa}$ can be set to twice the video annual ring size $T_{sv}$, for example. In this case, for one piece of audio annual ring data, there are two pieces of video annual ring data for a reproduction time period similar to the reproduction time period of the piece of audio annual ring data. Again, it is desirable from the above-mentioned viewpoint of the reproduction that the one piece of audio annual ring data and the two pieces of video annual ring data corresponding to the one piece of audio annual ring data be disposed at positions close to each other on the optical disk 7. Specifically, it is desirable that the one piece of audio annual ring data and the two pieces of video annual ring data corresponding to the one piece of audio annual ring data be periodically disposed in order of the audio annual ring data, one of the two corresponding pieces of video annual ring data, and the other of the two corresponding pieces of video annual ring data, or in order of one of the two pieces of video annual ring data, the audio annual ring data, and the other of the two pieces of video annual ring data, for example.

Incidentally, values of the audio annual ring size $T_{sa}$ and the video annual ring size $T_{sv}$ set in step S231 may be a predetermined fixed value or a variable value. When the values of the audio annual ring size $T_{sa}$ and the video annual ring size $T_{sv}$ are a variable value, the variable value can be inputted by operating the operating unit 120, for example.

The low-resolution annual ring size $T_{sl}$ is a variable for determining a data amount of low resolution data to be disposed and recorded en bloc on the optical disk 7. As with the audio annual ring size $T_{sa}$ and the video annual ring size $T_{sv}$ described above, the low-resolution annual ring size $T_{sl}$ is for example represented by a reproduction time of a video file (or an audio file) as an original for the low resolution data. Similarly, the meta annual ring size $T_{sm}$ is a variable for determining a data amount of metadata to be disposed and recorded en bloc on the optical disk 7. As with the audio annual ring size $T_{sa}$ and the video annual ring size $T_{sv}$ described above, the meta annual ring size $T_{sm}$ is represented by a reproduction time of a video file (or an audio file) whose various information (for example a date and time of image pickup) is described by the metadata.

Incidentally, the low-resolution annual ring size $T_{sl}$ and the meta annual ring size $T_{sm}$ are not represented by data amount itself such as the number of bits or the number of bytes, for example, but are represented by reproduction time indirectly, so to speak, for the same reasons as in the case of the audio annual ring size $T_{sa}$ and the video annual ring size $T_{sv}$ described above.

As will be described later, the recording process of FIG. 33 periodically disposes and records, on the optical disk 7, not only audio annual ring data as unities of audio files each having a data amount based on the audio annual ring size $T_{sa}$ extracted from an audio file series and video annual ring data as unities of video files each having a data amount based on the video annual ring size $T_{sv}$ extracted from a video file series but also low-resolution annual ring data as unities of low resolution data each having a data amount based on the low-resolution annual ring size $T_{sl}$ extracted from a data series of low resolution data and meta annual ring data as unities of metadata each having a data amount based on the meta annual ring size $T_{sm}$ extracted from a data series of metadata.

When the audio annual ring data, the video annual ring data, the low-resolution annual ring data, and the meta annual ring data are periodically disposed and recorded on the optical disk 7, since the low-resolution annual ring data is obtained by reducing data amounts of the audio annual ring data and the video annual ring data, audio annual ring data and video annual ring data for a certain reproduction time period and low-resolution annual ring data obtained by reducing data amounts of the audio annual ring data and the video annual ring data for the reproduction time period should be recorded at positions close to each other on the optical disk 7. Further, since the meta annual ring data represents information on the audio annual ring data and the video annual ring data, audio annual ring data and video annual ring data for a certain reproduction time period and meta annual ring data representing information on the audio annual ring data and the video annual ring data for the reproduction time period should also be recorded at positions close to each other on the optical disk 7.

However, a comparison between data rates of low resolution data and metadata and data rates of an audio file and a video file for the same reproduction time indicates that the data rates of the low resolution data and the metadata are lower than the data rates of the audio file and the video file.

Thus, as in the case where the audio annual ring size $T_{sa}$ and the video annual ring size $T_{sv}$ described above are represented by data amounts, when the low-resolution annual ring size $T_{sl}$ and the meta annual ring size $T_{sm}$ are represented by data amounts, it is difficult to dispose an audio file, a video file, low resolution data, and metadata to be reproduced for similar reproduction time periods at positions close to each other on the optical disk 7.

Figure 33:
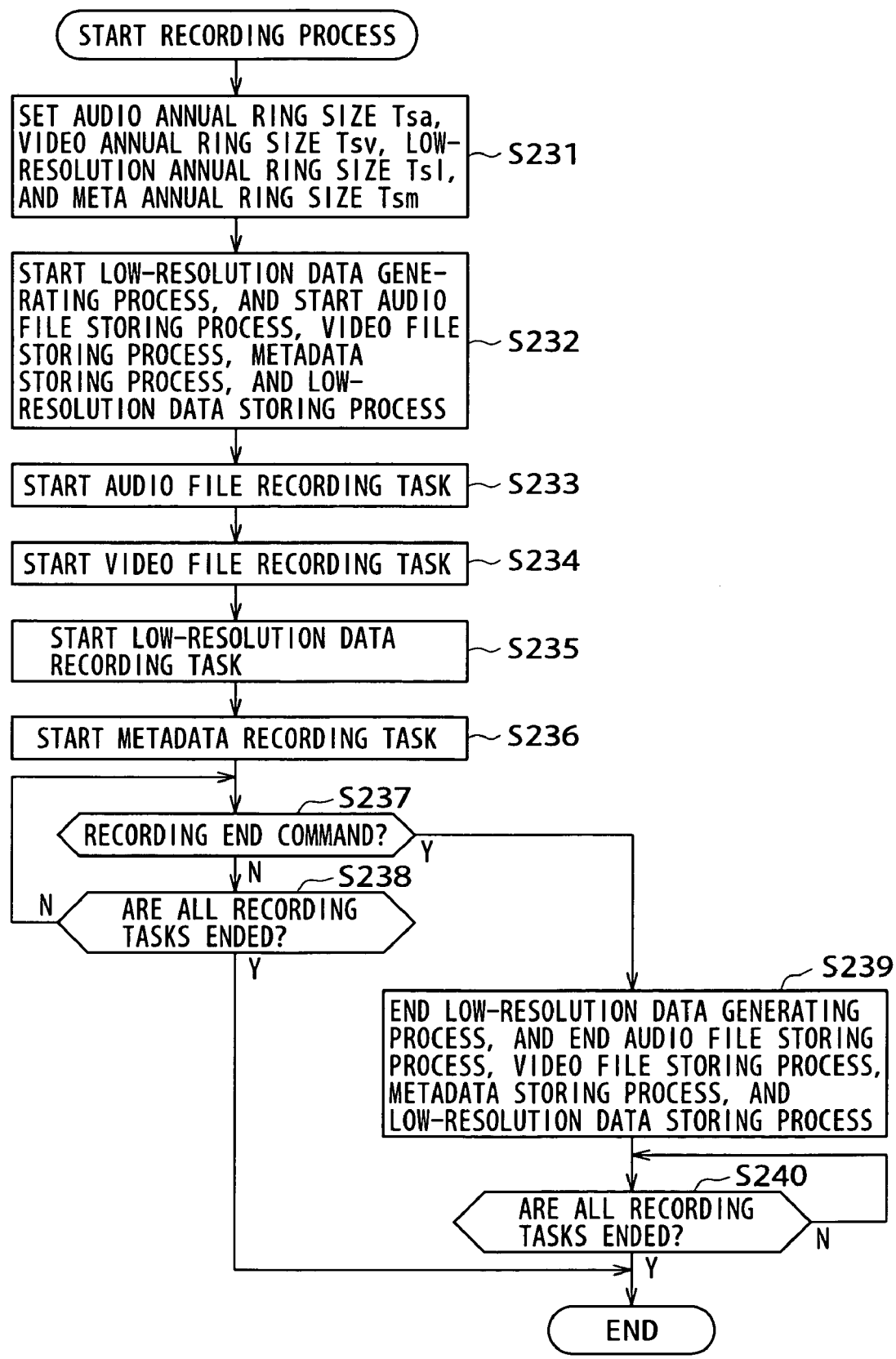
FIG. 33 is a flowchart of assistance in explaining a recording process by a control unit.

Accordingly, in an embodiment of FIG. 33, as with the audio annual ring size $T_{sa}$ and the video annual ring size $T_{sv}$, the low-resolution annual ring size $T_{sl}$ and the meta annual ring size $T_{sm}$ are represented by a reproduction time. It is thereby possible to dispose an audio file, a video file, low resolution data, and metadata to be reproduced for similar reproduction time periods at positions close to each other on the optical disk 7.

Incidentally, values of the audio annual ring size $T_{sa}$, the video annual ring size $T_{sv}$, the low-resolution annual ring size $T_{sl}$, and the meta annual ring size $T_{sm}$ set in step S231 may be a predetermined fixed value or a variable value. When the values of the audio annual ring size $T_{sa}$, the video annual ring size $T_{sv}$, the low-resolution annual ring size $T_{sl}$, and the meta annual ring size $T_{sm}$ are a variable value, the variable value can be inputted by operating the operating unit 120, for example.

After the process in step S231, the process proceeds to step S232, where the control unit 119 starts a low resolution data generating process for generating a low resolution data series from an audio file and a video file supplied from the format converting unit 12 to the disk drive device 11, and also controls the memory controller 116 to start an audio file storing process and a video file storing process for supplying the audio file and the video file obtained by the data converting unit 118 to the memory 117 to store the audio file and the video file in the memory 117. Also, in step S232, the control unit 119 controls the memory controller 116 to start a metadata storing process and a low resolution data storing process for supplying metadata and low resolution data obtained by the data converting unit 118 to the memory 117 to store the metadata and the low resolution data in the memory 117.

Then, the process sequentially proceeds to step S233 and step S234. In step S233, the control unit 119 starts an audio file recording task as a control task of recording the audio file onto the optical disk 7. In step S234, the control unit 119 starts a video file recording task as a control task of recording the video file onto the optical disk 7. The process proceeds to step S235. In step S235, the control unit 119 starts a low resolution data recording task as a control task of recording the low resolution data onto the optical disk 7. The process proceeds to step S236. In step S236, the control unit 119 starts a metadata recording task as a control task of recording the metadata onto the optical disk 7. The process proceeds to step S237. Incidentally, the audio file recording task in step S233, the video file recording task in step S234, the low resolution data recording task in step S235, and the metadata recording task in step S236 will be described later in detail.

The control unit 119 determines in step S237 whether an operating signal to end data recording is supplied from the operating unit 120. When the control unit 119 determines that no operating signal to end data recording is supplied from the operating unit 120, the process proceeds to step S238, where the control unit 119 determines whether all the recording tasks are completed. When the control unit 119 determines in step S238 that all the recording tasks are not completed, the process returns to step S237 to repeat the same process from step S237 on down.

When the control unit 119 determines in step S238 that all the recording tasks are completed, that is, when all of the audio file recording task started in step S233, the video file recording task started in step S234, the low resolution data recording task started in step S235, and the metadata recording task started in step S236 are completed, the recording process is ended.

On the other hand, when the control unit 119 determines in step S237 that an operating signal to end data recording is supplied from the operating unit 120, that is, when a user operates the operating unit 120 to end the data recording, the process proceeds to step S239, where the control unit 119 ends the low resolution data generating process and the audio file storing process, the video file storing process, the metadata storing process, and the low resolution data storing process started in step S232. The process proceeds to step S240.

In step S240, as in step S238, whether all the recording tasks are completed is determined. When it is determined in step S240 that all the recording tasks are not completed, the process returns to step S240, and a waiting time is provided until all the recording tasks are completed.

When the control unit 119 determines in step S240 that all the recording tasks are completed, that is, when all of the audio file recording task started in step S233, the video file recording task started in step S234, the low resolution data recording task started in step S235, and the metadata recording task started in step S236 are completed, the recording process is ended.

The audio file recording task started in step S233 in FIG. 33 will next be described with reference to a flowchart of FIG. 34.

When the audio file recording task is started, the control unit 119 in first step S251 initializes a variable $N_a$ to be incremented by one in a process of step S257 to be performed later to one, for example. The process proceeds to step S252.

In step S252, as in step S12 in FIG. 5, the control unit 119 determines whether $T_{sa} \times N_a$ is $T_{sv} \times N_v$ or less, and determines whether $T_{sa} \times N_a$ is $T_{sl} \times N_l$ or less and $T_{sm} \times N_m$ or less.

$T_{sa}$ is audio annual ring size, which represents a reproduction time of an audio file. As described later, the variable $N_a$ is incremented by one each time an audio file (audio annual ring data) in a data amount based on the audio annual ring size $T_{sa}$ is recorded on the optical disk 7. Similarly, $T_{sv}$ is video annual ring size. As described later, the variable $N_v$ is incremented by one each time a video file (video annual ring data) in a data amount based on the video annual ring size $T_{sv}$ is recorded on the optical disk 7 in the video file recording task. Hence, $T_{sa} \times N_a$ corresponds to a last reproduction time of audio annual ring data to be recorded onto the optical disk 7 from now on in a case where the audio file is recorded in units of the audio annual ring size $T_{sa}$. $T_{sv} \times N_v$ corresponds to a last reproduction time of video annual ring data to be recorded onto the optical disk 7 from now on in a case where the video file is recorded in units of the video annual ring size $T_{sv}$.

$T_{sl}$ is low-resolution annual ring size. As described later, the variable $N_l$ is incremented by one each time low resolution data (low-resolution annual ring data) in a data amount based on the low-resolution annual ring size $T_{sl}$ is recorded on the optical disk 7 in the low resolution data recording task. Further, $T_{sm}$ is meta annual ring size. As described later, the variable $N_m$ is incremented by one each time metadata (meta annual ring data) in a data amount based on the meta annual ring size $T_{sm}$ is recorded on the optical disk 7 in the metadata recording task. Hence, $T_{sl} \times N_l$ corresponds to a last reproduction time of low-resolution annual ring data to be recorded onto the optical disk 7 from now on in a case where the low resolution data is recorded in units of the low-resolution annual ring size $T_s$. $T_{sm} \times N_m$ corresponds to a last reproduction time of meta annual ring data to be recorded onto the optical disk 7 from now on in a case where the metadata is recorded in units of the meta annual ring size $T_{sm}$.

Meanwhile, suppose that audio annual ring data, video annual ring data, low-resolution annual ring data, and meta annual ring data for similar reproduction time periods are periodically disposed to be recorded at positions close to each other on the optical disk 7. Further, of the audio annual ring data, the video annual ring data, the low-resolution annual ring data, and the meta annual ring data, data having an earlier reproduction time is disposed at an earlier position on the optical disk 7 (a preceding position in order of reading and writing of data on the optical disk 7). Further, as to the audio annual ring data, the video annual ring data, the low-resolution annual ring data, and the meta annual ring data for similar reproduction time periods, the audio annual ring data, the video annual ring data, the low-resolution annual ring data, and the meta annual ring data are disposed in that order, for example, at earlier positions on the optical disk 7.

In this case, audio annual ring data of interest, that is, the audio annual ring data to be recorded from now on is audio annual ring data for a latest reproduction time period (closest to the reproduction time $T_{sa} \times N_a$) before the reproduction time $T_{sa} \times N_a$. This audio annual ring data of interest needs to be recorded immediately before video annual ring data, low-resolution annual ring data, and meta annual ring data for the latest reproduction time period before the reproduction time $T_{sa} \times N_a$ are recorded, that is, immediately after video annual ring data, low-resolution annual ring data, and meta annual ring data for the second latest reproduction time period before the reproduction time $T_{sa} \times N_a$ are recorded.

The video annual ring data to be recorded from now on is video annual ring data for a latest reproduction time period before $T_{sv} \times N_v$. The low-resolution annual ring data to be recorded from now on is low-resolution annual ring data for a latest reproduction time period before $T_{sl} \times N_l$. The metadata annual ring data to be recorded from now on is metadata annual ring data for a latest reproduction time period before $T_{sm} \times N_m$. Since of pieces of annual ring data for similar reproduction time periods, audio annual ring data is disposed at an earlier position on the optical disk 7 as described above, the audio annual ring data of interest needs to be recorded in timing such that the reproduction time $T_{sa} \times N_a$ of the audio annual ring data is the reproduction time $T_{sv} \times N_v$ of the video annual ring data or less, the reproduction time $T_{sl} \times N_l$ of the low-resolution annual ring data or less, and the reproduction time $T_{sm} \times N_m$ of the meta annual ring data or less.

Accordingly, in step S252, the control unit 119 determines whether the reproduction time $T_{sa} \times N_a$ of the audio annual ring data is the reproduction time $T_{sv} \times N_v$ of the video annual ring data or less, the reproduction time $T_{sl} \times N_l$ of the low-resolution annual ring data or less, and the reproduction time $T_{sm} \times N_m$ of the meta annual ring data or less, as described above. Thereby whether present timing is timing to record the audio annual ring data of interest is determined.

When the control unit 119 determines in step S252 that the reproduction time $T_{sa} \times N_a$ of the audio annual ring data is more (later) than one of the reproduction time $T_{sv} \times N_v$ of the video annual ring data, the reproduction time $T_{si} \times N_l$ of the low-resolution annual ring data, and the reproduction time $T_{sm} \times N_m$ of the meta annual ring data, that is, when the present timing is not the timing to record the audio annual ring data of interest, the process returns to step S252 to repeat the same process from step S252 on down.

When the control unit 119 determines in step S252 that the reproduction time $T_{sa} \times N_a$ of the audio annual ring data is equal to or less than all of the reproduction time $T_{sv} \times N_v$ of the video annual ring data, the reproduction time $T_{si} \times N_l$ of the low-resolution annual ring data, and the reproduction time $T_{sm} \times N_m$ of the meta annual ring data, that is, when the present timing is the timing to record the audio annual ring data of interest, the process proceeds to step S253, where the control unit 119 determines whether the audio file is being supplied from the data converting unit 118 to the memory 117 via the memory controller 116. When the control unit 119 determines that the audio file is being supplied from the data converting unit 118 to the memory 117 via the memory controller 116, the process proceeds to step S254.

In step S254, the control unit 119 determines whether an audio file of the audio file necessary for reproduction for the audio annual ring size $T_{sa} \times N_a$ is stored in the memory 117 in the aggregate. When the control unit 119 determines that the audio file for that reproduction is not yet stored in the memory 117, the process returns to step S252 to repeat the process from step S252 on down. When the control unit 119 determines in step S254 that the audio file having an amount corresponding to the reproduction time $T_{sa} \times N_a$ is stored in the memory 117, the process proceeds to step S255.

Incidentally, when the data amount detecting unit 141 of the data converting unit 118 has detected the audio file necessary for reproduction for the reproduction time $T_{sa} \times N_a$ in the aggregate, the data amount detecting unit 141 notifies it to the memory controller 116. On the basis of the notification, the memory controller 116 determines whether the audio file necessary for reproduction for the reproduction time $T_{sa} \times N_a$ is stored in the memory 117 in the aggregate. The memory controller 116 then notifies a result of the determination to the control unit 119. Thus, the control unit 119 makes the determination in step S254 on the basis of the result of the determination from the memory controller 116.

Figure 35:
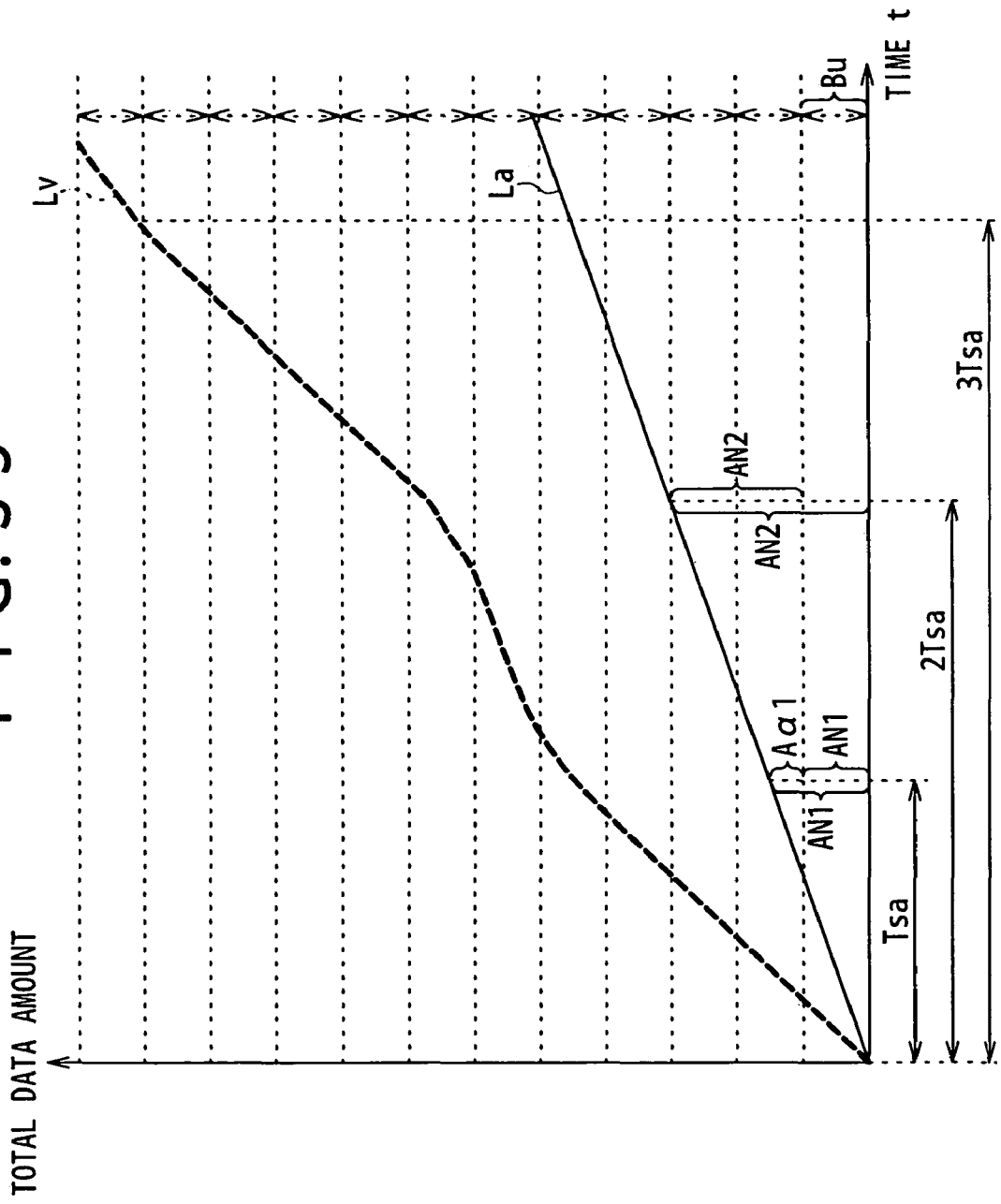
FIG. 35 is a diagram showing changes in an aggregate data amount La of audio data and an aggregate data amount Lv of video data.

FIG. 35 shows a relation between an aggregate amount of data (aggregate data amount) La of the audio file stored in the memory 117 and time (reproduction time). Small arrows indicating a vertical direction (arrows indicating intervals between dotted lines in a horizontal direction) on a right side in FIG. 35 denote an ECC block data amount Bu. A dotted line Lv in FIG. 35 represents an aggregate amount of data (aggregate data amount) Lv of the video file stored in the memory 117, the data amount being indicated by a solid line in FIG. 38 to be described later. In FIG. 35, the aggregate data amount La of the audio file forms a straight line, and therefore a data rate of the audio file is fixed. However, the data rate of the audio file can be a variable data rate.

In FIG. 35, when $N_a=1$, for example, a data amount of the audio file necessary for reproduction for the time $T_{sa} \times N_a (=1)$ is AN1'. Thus, in step S254 when $N_a=1$, it is determined that the audio file having the amount corresponding to the reproduction time $T_{sa} \times N_a$ is stored in the memory 117 when the audio file having an aggregate data amount of AN1' is stored in the memory 117. The process proceeds to step S255.

In step S255, the control unit 119 controls the memory controller 116 to extract for example an audio file having a data amount that is an integral multiple of (n times) the data amount Bu of one ECC block as a unit of reading and writing of the optical disk 7 and which is a maximum amount of data readable from the memory 117 from the audio file stored in the memory 117 by reading temporally preceding input data first. The process proceeds to step S256. Incidentally, the audio annual ring data read from the memory 117 as the audio file having the data amount that is an integral multiple of the ECC block data amount and which is a maximum amount of data readable from the memory 117 is the latest audio annual ring data before the reproduction time $T_{sa} \times N_a$ as described above.

When the time in FIG. 35 described above is $1 \times T_{sa}$, at least the audio file having the data amount AN1' is stored in the memory 117. The data amount AN1' is larger than the data amount of one ECC block but smaller than a data amount of two ECC blocks. Therefore, in step S255, an audio file having an amount of AN1, which is the data amount Bu of one ECC block, is read and thereby extracted as the audio annual ring data of interest from the memory 117.

Incidentally, an audio file not read in step S255, that is, an audio file having a data amount $A\alpha1$ smaller than the data amount Bu of one ECC block at the time of $1 \times T_{sa}$ in FIG. 35 remains as it is in the memory 117.

Returning to FIG. 34, in step S256, the control unit 119 supplies the signal processing unit 115 with the audio annual ring data of interest having the data amount that is an integral multiple of the data amount of an ECC block which data is obtained in step S255 from the memory controller 116, and thereby performs recording control such that the audio annual ring data of interest having the data amount that is an integral multiple of the data amount of an ECC block is recorded in ECC blocks corresponding in number to the integral multiple.

At the time of $1 \times T_{sa}$ in FIG. 35, the audio file having the data amount Bu of one ECC block is supplied as the audio annual ring data of interest from the memory controller 116 to the signal processing unit 115. Then, the audio annual ring data of interest having the data amount Bu of one ECC block is supplied to the pickup unit 112. The audio annual ring data of interest is then recorded in an ECC block #1, which is one ECC block of the optical disk 7, such that boundaries of the audio annual ring data coincide with boundaries of the ECC block #1 of the optical disk 7 as shown in FIG. 36.

Incidentally, suppose for simplicity of description that there is a sufficiently large, physically continuous space area on the optical disk 7. Supposing that data is read and written on the optical disk 7 in a direction from an inner circumference to an outer circumference, for example, data is recorded continuously from an inner circumference side to an outer circumference side of the space area in order of the data supplied from the memory controller 116 to the signal processing unit 115.

After the recording control is performed to record the audio annual ring data of interest as described above in step S256, the process proceeds to step S257, where the control unit 119 increments the variable $N_a$ by one. The process returns to step S252 to repeat the process from step S252 on down.

On the other hand, when the control unit 119 determines in step S253 that the audio file is not being supplied to the memory 117, that is, when supply of the audio file from the data converting unit 118 to the memory controller 116 is stopped, the process proceeds to step S258, where the control unit 119 controls the memory controller 116 to read all of the audio file now remaining in the memory 117, supplies the audio annual ring data from the memory controller 116 to the signal processing unit 115, and thereby performs recording control such that the audio annual ring data having the data amount that is an integral multiple of the data amount of an ECC block is recorded in ECC blocks corresponding in number to the integral multiple.

As described above, the audio file has a data amount that is an integral multiple of the data amount of an ECC block. Thus, in step S258, the audio annual ring data having the data amount that is an integral multiple of the data amount of an ECC block is recorded in ECC blocks corresponding in number to the integral multiple.

The process thereafter proceeds to step S259, where the control unit 119 sets a value corresponding to infinity (a very large value) to the variable $N_a$. Then the audio file recording task is ended.

Figure 34:
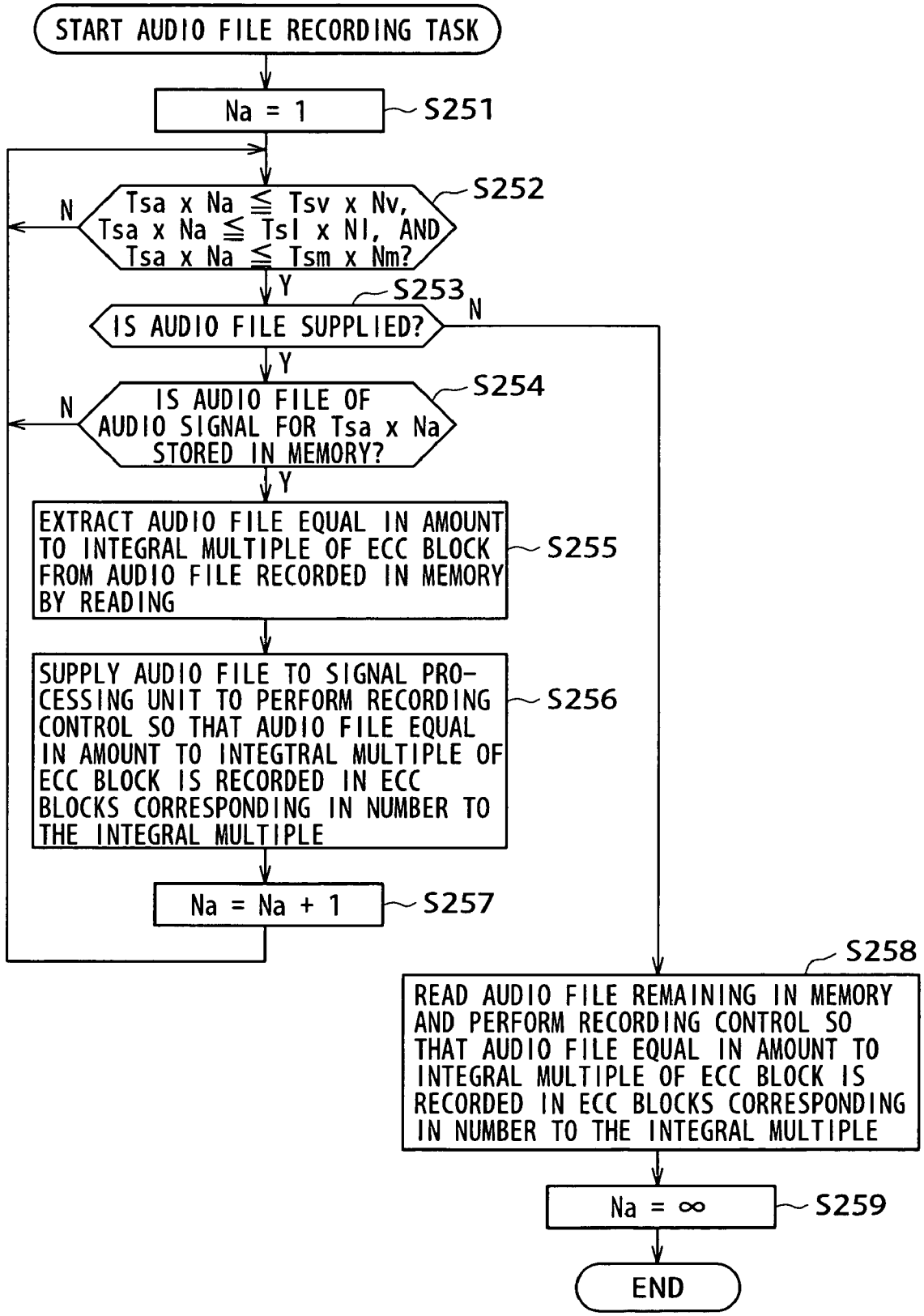
FIG. 34 is a flowchart of assistance in explaining an audio data recording task.

Thus, in the audio file recording task of FIG. 34, audio annual ring data having a data amount that is an integral multiple of the data amount of an ECC block, for example, as a unit of reading and writing of the optical disk 7 is periodically recorded in ECC blocks corresponding in number to the integral multiple such that boundaries of the audio annual ring data coincide with ECC block boundaries of the optical disk 7.

The video file recording task started in step S234 in FIG. 33 will next be described with reference to a flowchart of FIG. 37.

When the video file recording task is started, the control unit 119 in first step S261 initializes a variable $N_v$ to be incremented by one in a process of step S267 to be performed later to one, for example. The process proceeds to step S262.

In step S262, the control unit 119 determines whether $T_{sv} \times N_v$ is less than $T_{sa} \times N_a$, and determines whether $T_{sv} \times N_v$ is $T_{si} \times N_l$ or less and $T_{sm} \times N_m$ or less.

$T_{sa} \times N_a$ corresponds to a last reproduction time of audio annual ring data to be recorded onto the optical disk 7 from now on in a case where an audio file is recorded in units of the audio annual ring size $T_{sa}$. $T_{sv} \times N_v$ corresponds to a last reproduction time of video annual ring data to be recorded onto the optical disk 7 from now on in a case where a video file is recorded in units of the video annual ring size $T_{sv}$.

As described above, suppose now that audio annual ring data and video annual ring data for similar reproduction time periods are periodically disposed to be recorded at positions close to each other on the optical disk 7. Further, suppose that of the audio annual ring data and the video annual ring data for similar reproduction time periods, the audio annual ring data is disposed at an earlier position, and the video annual ring data is disposed following the audio annual ring data. Supposing that the video annual ring data to be recorded from now on is referred to as video annual ring data of interest, the video annual ring data of interest is video annual ring data for a latest reproduction time period (closest to the reproduction time $T_{sv} \times N_v$) before the reproduction time $T_{sv} \times N_v$. This video annual ring data of interest needs to be recorded immediately after the audio annual ring data for the latest reproduction time period before the reproduction time $T_{sa} \times N_a$ is recorded. Therefore the video annual ring data of interest needs to be recorded in timing such that the reproduction time $T_{sv} \times N_v$ of the video annual ring data is less than the reproduction time $T_{sa} \times N_a$ of the audio annual ring data.

Accordingly, in step S262, the control unit 119 determines whether the reproduction time $T_{sv} \times N_v$ of the video annual ring data is less than the reproduction time $T_{sa} \times N_a$ of the audio annual ring data, as described above. Thereby whether present timing is timing to record the video annual ring data of interest is determined.

Further, as in step S252 in FIG. 34, $T_{sv} \times N_v$ being $T_{sv} \times N_l$ or less is a condition for recording the video annual ring data of interest as the video annual ring data to be recorded from now on, that is, the video annual ring data for the latest reproduction time period (closest to the reproduction time $T_{sv} \times N_v$) before the reproduction time $T_{sv} \times N_v$ immediately before low-resolution annual ring data for the latest reproduction time period before the reproduction time $T_{sv} \times N_v$, that is, immediately after low-resolution annual ring data for the second latest reproduction time period before the reproduction time $T_{sv} \times N_v$ is recorded.

Further, as in step S252 in FIG. 34, $T_{sv} \times N_v$ being $T_{sm} \times N_m$ or less is a condition for recording the video annual ring data of interest as the video annual ring data to be recorded from now on, that is, the video annual ring data for the latest reproduction time period before the reproduction time $T_{sv} \times N_v$ immediately before meta annual ring data for the latest reproduction time period before the reproduction time $T_{sv} \times N_v$, that is, immediately after meta annual ring data for the second latest reproduction time period before the reproduction time $T_{sv} \times N_v$ is recorded.

When the control unit 119 determines in step S262 that the reproduction time $T_{sv} \times N_v$ of the video annual ring data is not less than the reproduction time $T_{sa} \times N_a$ of the audio annual ring data, is not the reproduction time $T_{si} \times N_l$ of the low-resolution annual ring data or less, or is not the reproduction time $T_{sm} \times N_m$ of the meta annual ring data or less, that is, when the present timing is not the timing to record the video annual ring data of interest, the process returns to step S262 to repeat the same process from step S262 on down.

When the control unit 119 determines in step S262 that the reproduction time $T_{sv} \times N_v$ of the video annual ring data is less than the reproduction time $T_{sa} \times N_a$ of the audio annual ring data, is the reproduction time $T_{si} \times N_l$ of the low-resolution annual ring data or less, and is the reproduction time $T_{sm} \times N_m$ of the meta annual ring data or less, that is, when the present timing is the timing to record the video annual ring data of interest, the process proceeds to step S263, where the control unit 119 determines whether the video file is being supplied from the data converting unit 118 to the memory 117 via the memory controller 116. When the control unit 119 determines that the video file is being supplied from the data converting unit 118 to the memory 117 via the memory controller 116, the process proceeds to step S264.

In step S264, the control unit 119 determines whether a video file of the video file necessary for reproduction for the video annual ring size $T_{sv} \times N_v$ is stored in the memory 117 in the aggregate. When the control unit 119 determines that the video file for that reproduction is not yet stored in the memory 117, the process returns to step S262 to repeat the process from step S262 on down. When the control unit 119 determines in step S264 that the video file having an amount corresponding to the reproduction time $T_{sv} \times N_v$ is stored in the memory 117, the process proceeds to step S265.

Incidentally, when the data amount detecting unit 141 of the data converting unit 118 has detected the video file necessary for reproduction for the reproduction time $T_{sv} \times N_v$ in the aggregate, the data amount detecting unit 141 notifies it to the memory controller 116. On the basis of the notification, the memory controller 116 determines whether the video file necessary for reproduction for the reproduction time $T_{sv} \times N_v$ is stored in the memory 117 in the aggregate. The memory controller 116 then notifies a result of the determination to the control unit 119. Thus, the control unit 119 makes the determination in step S264 on the basis of the result of the determination from the memory controller 116.

Figure 38:
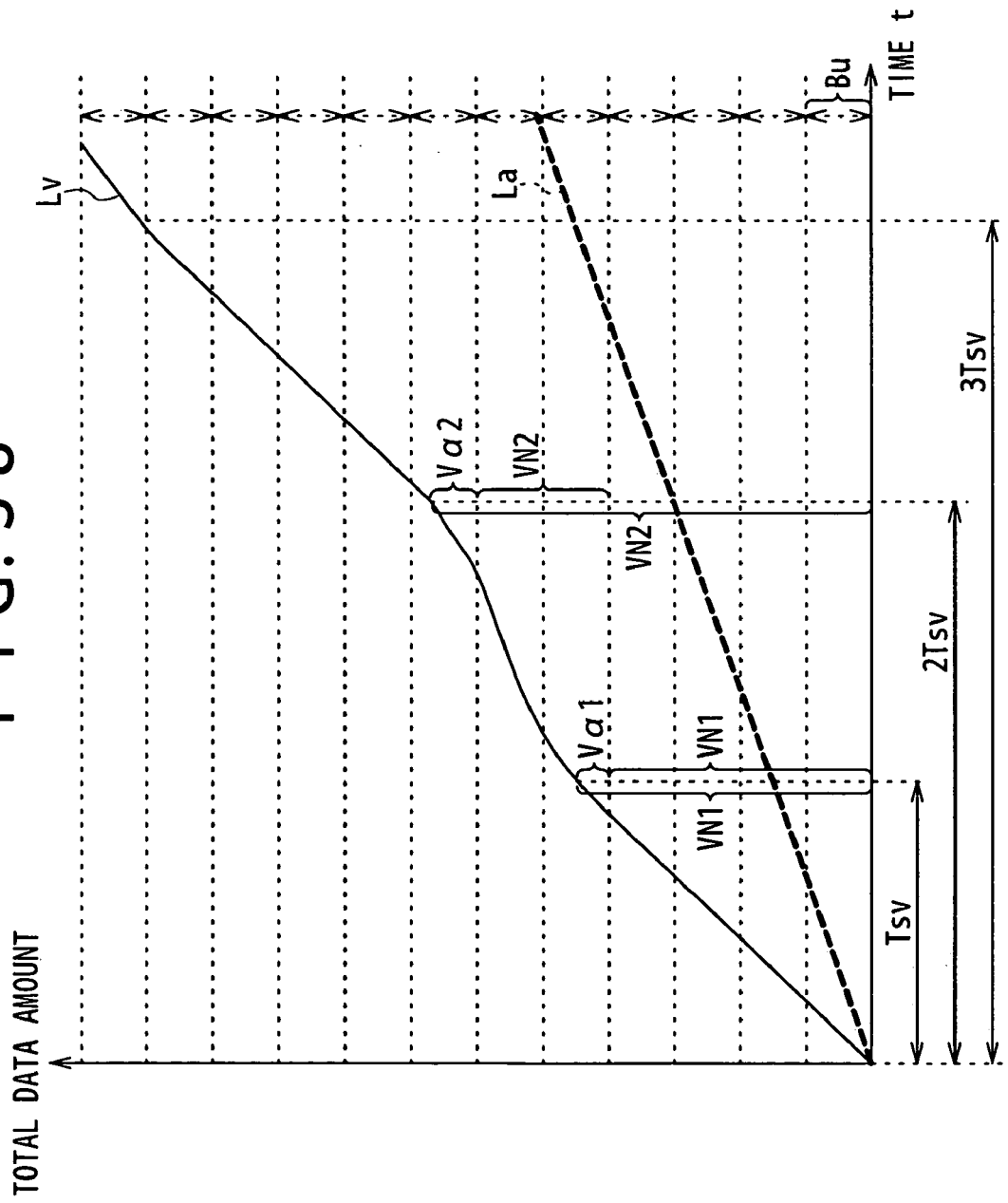
FIG. 38 is a diagram showing changes in an aggregate data amount La of audio data and an aggregate data amount Lv of video data.

FIG. 38 shows a relation between an aggregate amount of data (aggregate data amount) La Lv of the video file stored in the memory 117 and time (reproduction time). As in FIG. 35, small arrows indicating a vertical direction (arrows indicating intervals between dotted lines in a horizontal direction) on a right side in FIG. 38 denote an ECC block data amount Bu. A dotted line La in FIG. 38 represents an aggregate amount of data (aggregate data amount) La of the audio file stored in the memory 117, the data amount being indicated by the solid line in FIG. 35 described above.

In FIG. 38, when $N_v=1$, for example, a data amount of the video file necessary for reproduction for the time $T_{sv} \times N_v$ (=1) is VN1'. Thus, in step S264 when $N_v=1$, it is determined that the video file having the amount corresponding to the reproduction time $T_{sv} \times N_v$ is stored in the memory 117 when the video file having an aggregate data amount of VN1' is stored in the memory 117. The process proceeds to step S265.

In step S265, the control unit 119 controls the memory controller 116 to extract a video file having a data amount that is an integral multiple of (n times) the data amount Bu of one ECC block, for example, as a unit of reading and writing of the optical disk 7 and which is a maximum amount of data readable from the memory 117 from the video file stored in the memory 117 by first reading temporally preceding input data. The process proceeds to step S266. Incidentally, the video annual ring data read from the memory 117 as the video file having the data amount that is an integral multiple of the ECC block data amount and which is a maximum amount of data readable from the memory 117 is the latest video annual ring data before the reproduction time $T_{sv} \times N_v$ as described above.

When the time in FIG. 38 described above is $1 \times T_{sv}$, at least the video file having the data amount VN1' is stored in the memory 117. The data amount VN1' is larger than a data amount of four ECC blocks but smaller than a data amount of five ECC blocks. Therefore, in step S265, a video file having an amount of VN1, which is the data amount Bu of four ECC blocks, is read and thereby extracted as video annual ring data of interest from the memory 117.

Figure 40:
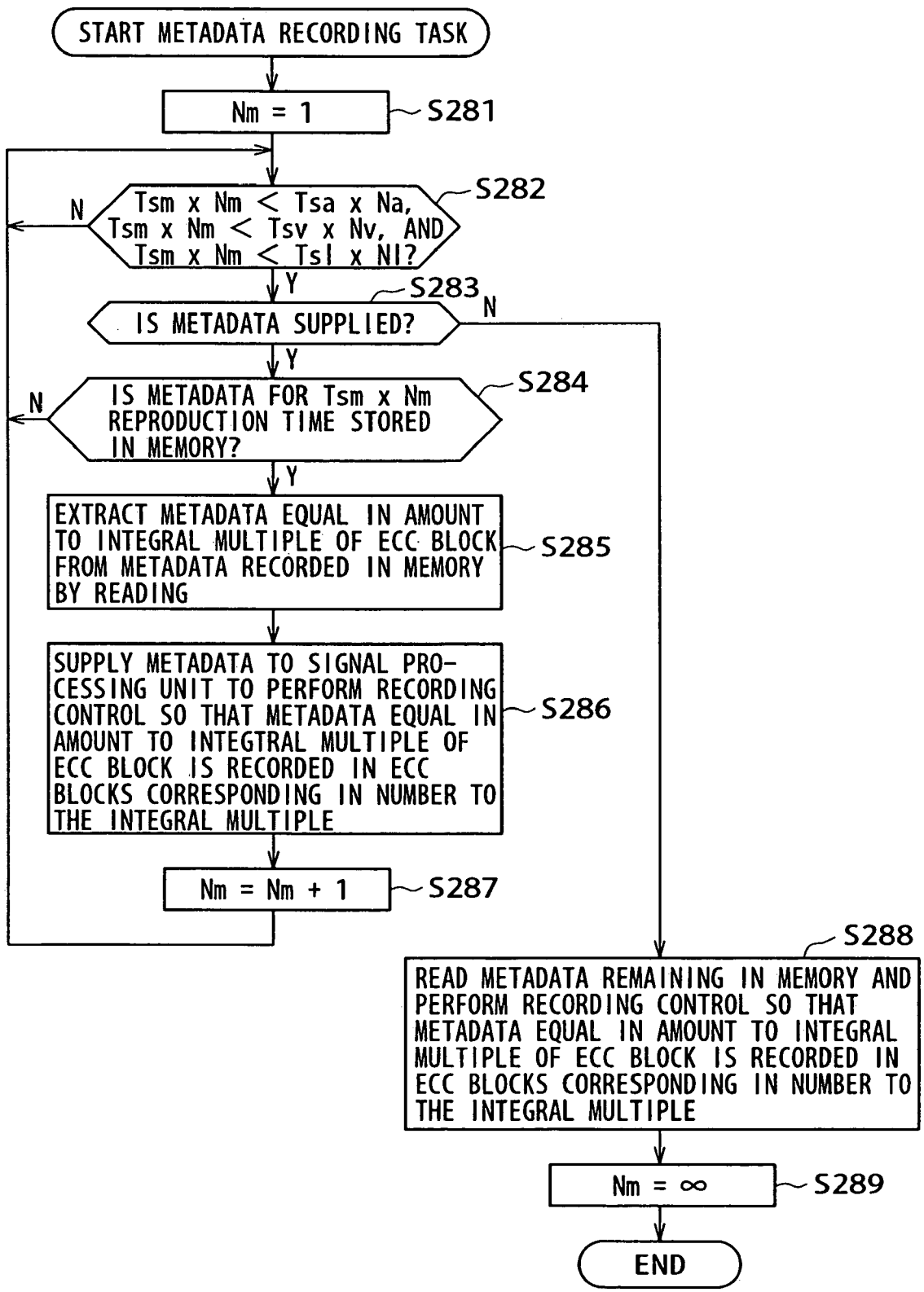
FIG. 40 is a flowchart of assistance in explaining a metadata recording task.

Incidentally, a video file not read in step S265, that is, a video file having a data amount Vα1 smaller than the data amount Bu of one ECC block at the time of $1 \times T_{sv}$ in FIG. 40 remains as it is in the memory 117.

Returning to FIG. 37, in step S266, the control unit 119 supplies the signal processing unit 115 with the video annual ring data of interest having the data amount that is an integral multiple of the data amount of an ECC block which data is obtained in step S265 from the memory controller 116, and thereby performs recording control such that the video annual ring data of interest having the data amount that is an integral multiple of the data amount of an ECC block is recorded in ECC blocks corresponding in number to the integral multiple.

At the time of $1 \times T_{sv}$ in FIG. 38, the video file having the data amount Bu of four ECC blocks is supplied as the video annual ring data of interest from the memory controller 116 to the signal processing unit 115. Then, the video annual ring data of interest in the data amount Bu of four ECC blocks is supplied to the pickup unit 112. The video annual ring data of interest is then recorded in ECC blocks #2, #3, #4, and #5, which are four ECC blocks of the optical disk 7, such that boundaries of the video annual ring data coincide with boundaries of the ECC blocks #2 to #5 (a boundary on a front side of the ECC block #2 and a boundary on an end side of the ECC block #5) of the optical disk 7 as shown in FIG. 36 described above.

Figure 37:
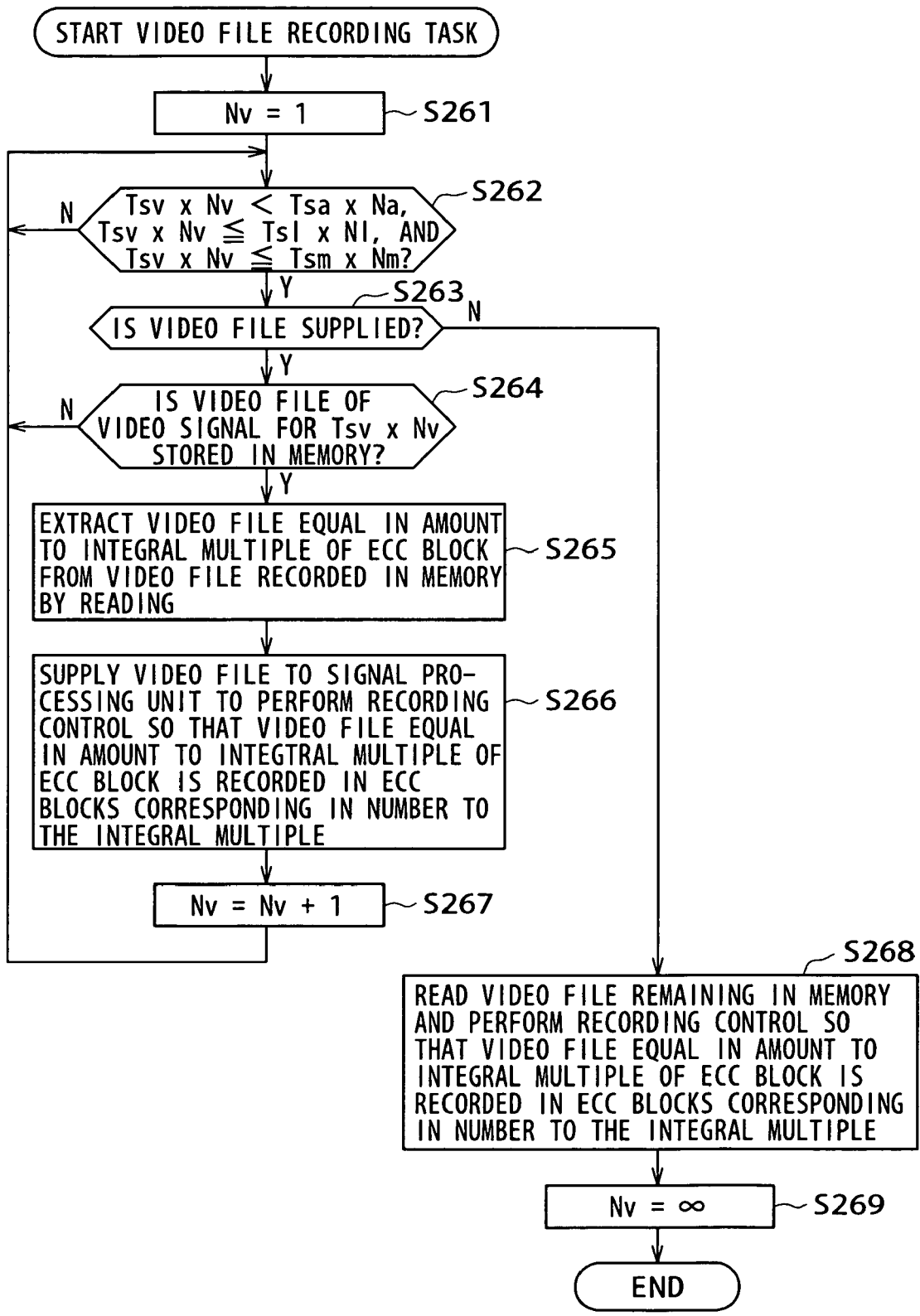
FIG. 37 is a flowchart of assistance in explaining a video data recording task.

Specifically, supposing for simplicity of description that the audio annual ring size $T_{sa}$ and the video annual ring size $T_{sv}$ are equal to each other, the latest audio annual ring data before the reproduction time $T_{sa} \times N_a$ is recorded in the ECC block #1 as shown in FIG. 36 when $N_v=N_a=1$ after the audio file recording task of FIG. 34 and the video file recording task of FIG. 37 are started. The audio annual ring data is recorded in the ECC block #1, whereby the variable $N_a$ is incremented by one to become $N_a=2$ in step S257 in the audio file recording task of FIG. 34. At this time, the variable $N_v$ still remains one. Therefore the reproduction time $T_{sv} \times N_v$ becomes less than the reproduction time $T_{sa} \times N_a$. Consequently, the latest video annual ring data before the reproduction time $T_{sv} \times N_v$ is recorded in the ECC blocks #2 to #5 in step S266 in the video file recording task of FIG. 37.

That is, as described above, data is recorded continuously from an inner circumference side to an outer circumference side of a space area on the optical disk 7 in order of the data supplied from the memory controller 116 to the signal processing unit 115. Hence, the video annual ring data for four ECC blocks as the latest video annual ring data before the reproduction time $T_{sv} \times N_v$ is started at the ECC block #2 immediately after the ECC block #1 where the audio annual ring data has been recorded immediately before, and thereby recorded in the ECC blocks #2 to #5 as shown in FIG. 36.

Thus, the audio annual ring data and the video annual ring data obtained when $N_v=N_a=1$, that is, the latest audio annual ring data before the reproduction time $T_{sa} \times N_a$ and the latest video annual ring data before the reproduction time $T_{sv} \times N_v$ equal to the reproduction time $T_{sa} \times N_a$, that is, the audio annual ring data and the video annual ring data for similar reproduction time periods are disposed and recorded at positions adjacent to each other on the optical disk 7.

After the recording control is performed to record the video annual ring data of interest as described above in step S266, the process proceeds to step S267, where the control unit 119 increments the variable $N_v$ by one. The process returns to step S262 to repeat the process from step S262 on down.

On the other hand, when the control unit 119 determines in step S263 that the video file is not being supplied to the memory 117, that is, when supply of the video file from the data converting unit 118 to the memory controller 116 is stopped, the process proceeds to step S268, where the control unit 119 controls the memory controller 116 to read all of the video file now remaining in the memory 117, supplies the video file from the memory controller 116 to the signal processing unit 115, and thereby performs recording control such that the video annual ring data having a data amount that is an integral multiple of the data amount of an ECC block is recorded in ECC blocks corresponding in number to the integral multiple.

The video file has a data amount that is an integral multiple of the data amount of an ECC block. Thus, in step S268, the video annual ring data having the data amount that is an integral multiple of the data amount of an ECC block is recorded in ECC blocks corresponding in number to the integral multiple.

The process thereafter proceeds to step S269, where the control unit 119 sets a value corresponding to infinity to the variable $N_v$. Then the video file recording task is ended.

Thus, in the video file recording task of FIG. 37, as in the audio file recording task of FIG. 34, video annual ring data having a data amount that is an integral multiple of the data amount of an ECC block, for example, as a unit of reading and writing of the optical disk 7 is periodically recorded in ECC blocks corresponding in number to the integral multiple such that boundaries of the video annual ring data coincide with ECC block boundaries of the optical disk 7.

The low resolution data recording task started in step S235 in FIG. 33 for recording low resolution data as a low resolution data file will next be described with reference to a flowchart of FIG. 39.

When the low resolution data recording task is started, the control unit 119 in first step S271 initializes a variable $N_l$ to be incremented by one in a process of step S277 to be described later to one, for example. The process proceeds to step S272.

In step S272, the control unit 119 determines whether $T_{si} \times N_l$ is less than $T_{sa} \times N_a$, and determines whether $T_{si} \times N_l$ is less than $T_{sv} \times N_v$ and is $T_{sm} \times N_m$ or less.

As described in step S262 in FIG. 37, $T_{si} \times N_l$ being less than $T_{sa} \times N_a$ is a condition for recording low-resolution annual ring data of interest as low-resolution annual ring data to be recorded from now on immediately after audio annual ring data for the latest reproduction time period before the reproduction time $T_{si} \times N_l$ is recorded. Again, as described in step S262 in FIG. 37, $T_{si} \times N_l$ being less than $T_{sv} \times N_v$ is a condition for recording the low-resolution annual ring data of interest as the low-resolution annual ring data to be recorded from now on immediately after video annual ring data for the latest reproduction time period before the reproduction time $T_{si} \times N_l$ is recorded.

Further, as in step S252 in FIG. 34, $T_{si} \times N_l$ being $T_{sm} \times N_m$ or less is a condition for recording the low-resolution annual ring data of interest as the low-resolution annual ring data to be recorded from now on, that is, the low-resolution annual ring data for the latest reproduction time period (closest to the reproduction time $T_{si} \times N_l$) before the reproduction time $T_{si} \times N_l$ immediately before meta annual ring data for the latest reproduction time period before the reproduction time $T_{si} \times N_l$, that is, immediately after meta annual ring data for the second latest reproduction time period before the reproduction time $T_{si} \times N_l$ is recorded.

When the control unit 119 determines in step S272 that the reproduction time $T_{si} \times N_l$ of the low-resolution annual ring data is not less than the reproduction time $T_{sa} \times N_a$ of the audio annual ring data, is not less than the reproduction time $T_{sv} \times N_v$ of the video annual ring data, or is not the reproduction time $T_{sm} \times N_m$ of the meta annual ring data or less, that is, when the present timing is not the timing to record the low-resolution annual ring data of interest, the process returns to step S272 to repeat the same process from step S272 on down.

When the control unit 119 determines in step S272 that the reproduction time $T_{si} \times N_l$ of the low-resolution annual ring data is less than the reproduction time $T_{sa} \times N_a$ of the audio annual ring data, is less than the reproduction time $T_{sv} \times N_v$ of the video annual ring data, and is the reproduction time $T_{sm} \times N_m$ of the meta annual ring data or less, that is, when the present timing is the timing to record the low-resolution annual ring data of interest, the process proceeds to step S273, where the control unit 119 determines whether low resolution data is being supplied from the data converting unit 118 to the memory 117 via the memory controller 116. When the control unit 119 determines that the low resolution data is being supplied from the data converting unit 118 to the memory 117 via the memory controller 116, the process proceeds to step S274.

In step S274, the control unit 119 determines whether low resolution data necessary for reproduction for the low-resolution annual ring size $T_{si} \times N_l$ is stored in the memory 117 in the aggregate. When the control unit 119 determines that the low resolution data for that reproduction is not yet stored in the memory 117, the process returns to step S272 to repeat the same process from step S272 on down. When the control unit 119 determines in step S274 that the low resolution data having an amount corresponding to the reproduction time $T_{si} \times N_l$ is stored in the memory 117, the process proceeds to step S275.

Incidentally, when the data amount detecting unit 141 of the data converting unit 118 has detected a video file and an audio file necessary for reproduction for the reproduction time $T_{si} \times N_l$ in the aggregate, the data amount detecting unit 141 notifies it to the memory controller 116. On the basis of the notification, the memory controller 116 determines whether the low resolution data necessary for reproduction for the reproduction time $T_{si} \times N_l$ is stored in the memory 117 in the aggregate. The memory controller 116 then notifies a result of the determination to the control unit 119. Then, the control unit 119 performs the determination process in step S274 on the basis of the result of the determination from the memory controller 116. Incidentally, while in the present embodiment, data resulting from compression coding of a video file and the like obtained by reducing a data amount of a video file and the like is used as the low resolution data, other data such as a video file and the like obtained by reducing a data amount of a video file and the like can be used as it is as the low resolution data.

In step S275, the control unit 119 controls the memory controller 116 to extract low resolution data having a data amount that is an integral multiple of (n times) the data amount Bu of one ECC block, for example, as a unit of reading and writing of the optical disk 7 and which is a maximum amount of data readable from the memory 117 from the low resolution data stored in the memory 117 by first reading temporally preceding input data. The process proceeds to step S276.

Incidentally, the low-resolution annual ring data read from the memory 117 as the low resolution data having the data amount that is an integral multiple of the ECC block data amount and which is a maximum amount of data readable from the memory 117 is the latest low-resolution annual ring data before the reproduction time $T_{si} \times N_l$ as described above.

Also, low resolution data not read in step S275 remains as it is in the memory 117.

In step S276, the control unit 119 supplies the signal processing unit 115 with the low-resolution annual ring data of interest having the data amount that is an integral multiple of the data amount of an ECC block which data is obtained in step S275 from the memory controller 116, and thereby performs recording control such that the low-resolution annual ring data of interest having the data amount that is an integral multiple of the data amount of an ECC block is recorded in ECC blocks corresponding in number to the integral multiple. Thereby, the low-resolution annual ring data having the data amount that is an integral multiple of the data amount of an ECC block is recorded in the ECC blocks corresponding in number to the integral multiple such that boundaries of the low-resolution annual ring data coincide with ECC block boundaries of the optical disk 7.

Thereafter, the process proceeds to step S277, where the control unit 119 increments the variable $N_l$ by one. The process returns to step S272 to repeat the same process from step S272 on down.

On the other hand, when the control unit 119 determines in step S273 that the low resolution data is not being supplied to the memory 117, that is, when supply of the low resolution data from the data converting unit 118 to the memory controller 116 is stopped, the process proceeds to step S278, where the control unit 119 controls the memory controller 116 to read all of the low resolution data now remaining in the memory 117, supplies the low resolution data from the memory controller 116 to the signal processing unit 115, and thereby performs recording control such that the low-resolution annual ring data having a data amount that is an integral multiple of the data amount of an ECC block is recorded in ECC blocks corresponding in number to the integral multiple.

The low resolution data file has a data amount that is an integral multiple of the data amount of an ECC block. Thus, in step S278, the low-resolution annual ring data having the data amount that is an integral multiple of the data amount of an ECC block is recorded in ECC blocks corresponding in number to the integral multiple.

The process thereafter proceeds to step S279, where the control unit 119 sets a value corresponding to infinity to the variable $N_l$. Then the low resolution data recording task is ended.

The metadata recording task started in step S236 in FIG. 33 will next be described with reference to a flowchart of FIG. 40.

When the metadata recording task is started, the control unit 119 in first step S281 initializes a variable $N_m$ to be incremented by one in a process of step S287 to be described later to one, for example. The process proceeds to step S282.

In step S282, the control unit 119 determines whether $T_{sm} \times N_m$ is less than $T_{sa} \times N_a$, and determines whether $T_{sm} \times N_m$ is less than $T_{sv} \times N_v$, and is less than $T_{si} \times N_l$.

As described in step S262 in FIG. 37, $T_{sm} \times N_m$ being less than $T_{sa} \times N_a$ is a condition for recording meta annual ring data of interest as meta annual ring data to be recorded from now on immediately after audio annual ring data for the latest reproduction time period before the reproduction time $T_{sm} \times N_m$ is recorded. Again, as described in step S262 in FIG. 37, $T_{sm} \times N_m$ being less than $T_{sv} \times N_v$ is a condition for recording the meta annual ring data of interest as the meta annual ring data to be recorded from now on immediately after video annual ring data for the latest reproduction time period before the reproduction time $T_{sm} \times N_m$ is recorded. Similarly, $T_{sm} \times N_m$ being less than $T_{si} \times N_l$ is a condition for recording the meta annual ring data of interest as the meta annual ring data to be recorded from now on immediately after low-resolution annual ring data for the latest reproduction time period before the reproduction time $T_{sm} \times N_m$ is recorded.

When the control unit 119 determines in step S282 that the reproduction time $T_{sm} \times N_m$ of the meta annual ring data is not less than the reproduction time $T_{sa} \times N_a$ of the audio annual ring data, is not less than the reproduction time $T_{sv} \times N_v$ of the video annual ring data, or is not less than the reproduction time $T_{si} \times N_l$ of the low-resolution annual ring data, that is, when the present timing is not the timing to record the meta annual ring data of interest, the process returns to step S282 to repeat the same process from step S282 on down.

When the control unit 119 determines in step S282 that the reproduction time $T_{sm} \times N_m$ of the meta annual ring data is less than the reproduction time $T_{sa} \times N_a$ of the audio annual ring data, is less than the reproduction time $T_{sv} \times N_v$ of the video annual ring data, and is less than the reproduction time $T_{si} \times N_l$ of the low-resolution annual ring data, that is, when the present timing is the timing to record the meta annual ring data of interest, the process proceeds to step S283, where the control unit 119 determines whether metadata is being supplied from the data converting unit 118 to the memory 117 via the memory controller 116. When the control unit 119 determines that the metadata is being supplied from the data converting unit 118 to the memory 117 via the memory controller 116, the process proceeds to step S284.

In step S284, the control unit 119 determines whether metadata necessary for reproduction for the meta annual ring size $T_{sm} \times N_m$ is stored in the memory 117 in the aggregate. When the control unit 119 determines that the metadata for that reproduction is not yet stored in the memory 117, the process returns to step S282 to repeat the same process from step S282 on down. When the control unit 119 determines in step S284 that the metadata having an amount corresponding to the reproduction time $T_{sm} \times N_m$ is stored in the memory 117, the process proceeds to step S285.

Incidentally, when the data amount detecting unit 141 of the data converting unit 118 has detected a video file and an audio file necessary for reproduction for the reproduction time $T_{sm} \times N_m$ in the aggregate, the data amount detecting unit 141 notifies it to the memory controller 116. On the basis of the notification, the memory controller 116 determines whether the metadata necessary for reproduction for the reproduction time $T_{sm} \times N_m$ is stored in the memory 117 in the aggregate. The memory controller 116 then notifies a result of the determination to the control unit 119. Then, the control unit 119 performs the determination process in step S284 on the basis of the result of the determination from the memory controller 116.

In step S285, the control unit 119 controls the memory controller 116 to extract metadata having a data amount that is an integral multiple of (n times) the data amount Bu of one ECC block, for example, as a unit of reading and writing of the optical disk 7 and which is a maximum amount of data readable from the memory 117 from the metadata stored in the memory 117 by first reading temporally preceding input data. The process proceeds to step S286.

Incidentally, the meta annual ring data read from the memory 117 as the metadata having the data amount that is an integral multiple of the ECC block data amount and which is a maximum amount of data readable from the memory 117 is the latest meta annual ring data before the reproduction time $T_{sm} \times N_m$ as described above.

Also, metadata not read in step S285 remains as it is in the memory 117.

In step S286, the control unit 119 supplies the signal processing unit 115 with the meta annual ring data of interest having the data amount that is an integral multiple of the data amount of an ECC block which data is obtained in step S285 from the memory controller 116, and thereby performs recording control such that the meta annual ring data of interest having the data amount that is an integral multiple of the data amount of an ECC block is recorded in ECC blocks corresponding in number to the integral multiple. Thereby, the meta annual ring data having the data amount that is an integral multiple of the data amount of an ECC block is periodically recorded in the ECC blocks corresponding in number to the integral multiple such that boundaries of the meta annual ring data coincide with ECC block boundaries of the optical disk 7.

Thereafter, the process proceeds to step S287, where the control unit 119 increments the variable $N_m$ by one. The process returns to step S282 to repeat the same process from step S282 on down.

On the other hand, when the control unit 119 determines in step S283 that the metadata is not being supplied to the memory 117, that is, when supply of the metadata from the data converting unit 118 to the memory controller 116 is stopped, the process proceeds to step S288, where the control unit 119 controls the memory controller 116 to read all of the metadata now remaining in the memory 117, supplies the metadata from the memory controller 116 to the signal processing unit 115, and thereby performs recording control such that the meta annual ring data having a data amount that is an integral multiple of the data amount of an ECC block is recorded in ECC blocks corresponding in number to the integral multiple.

The process thereafter proceeds to step S289, where the control unit 119 sets a value corresponding to infinity to the variable $N_m$. Then the metadata recording task is ended.

The processes of the audio file recording task, the video file recording task, the low resolution data recording task, and the metadata recording task are thus performed, so that the audio file, the video file, the metadata, and the low resolution data are recorded on the optical disk 7. Thus, when the audio annual ring size $T_{sa}$ and the video annual ring size $T_{sv}$ are an identical time, for example, audio annual ring data as audio file units and video annual ring data as video file units for similar reproduction time periods are sequentially recorded so as to be disposed at positions adjacent to each other on the optical disk 7. Further, low-resolution annual ring data as units of low resolution data and meta annual ring data as units of metadata for similar reproduction time periods are sequentially recorded so as to be disposed at positions adjacent to the audio annual ring data and the video annual ring data on the optical disk 7.

A video file, an audio file and the like are recorded in such a manner as to form annual rings of a tree on the optical disk 7. Therefore one unit of the audio file and the video file recorded on the optical disk 7 is referred to as audio "annual ring" data or video "annual ring" data. The same is true for the low-resolution annual ring data and the meta annual ring data. A unit of data in a data series recorded on the optical disk 7 so as to form annual rings of a tree will hereinafter be referred to as annual ring data as appropriate.

The width of annual rings formed on the optical disk 7 (the number of tracks over which a certain piece of audio annual ring data and video annual ring data is recorded) is determined by the audio annual ring size $T_{sa}$ and the video annual ring size $T_{sv}$. Incidentally, the audio annual ring size $T_{sa}$ and the video annual ring size $T_{sv}$ can be changed according to a radial position on the optical disk 7 on which the audio annual ring data and the video annual ring data are recorded. Depending on the audio annual ring size $T_{sa}$ and the video annual ring size $T_{sv}$, one piece of audio annual ring data and one piece of video annual ring data are recorded on less than one round of a track.

As described above, audio annual ring data and video annual ring data for similar reproduction time periods are recorded at positions close to each other on the optical disk 7. It is therefore possible to quickly read and reproduce the audio file and the video file at an identical reproduction time from the optical disk 7.

Further, the audio file and the video file are converted into annual ring data in a data amount of a plurality of ECC blocks, and are then recorded in the plurality of ECC blocks such that boundaries of the annual ring data coincide with boundaries of the ECC blocks. It is therefore possible to read only the audio file or the video file from the optical disk 7, and consequently edit only the audio file or the video file quickly.

Since a data amount of each of a header, a body, and a footer of the video file is an integral multiple of the data amount of an ECC block, each of the header, the body, and the footer is recorded in ECC blocks separately from the others. That is, recording of two of the header, the body, and the footer in one ECC block does not occur.

Thus, when one of the header, the body, and the footer is written or read, a process of reading or writing of a minimum number of ECC blocks is performed. It is therefore possible to perform the reading or writing process more efficiently. As a result, the number of clusters where data is rewritten in the file writing process is minimized. When there is a physical limitation (a limitation due to physical properties) on the number of rewrites of the optical disk 7, this provides an advantage of a longer life of the optical disk 7 in terms of the number of data rewrites.

Figure 39:
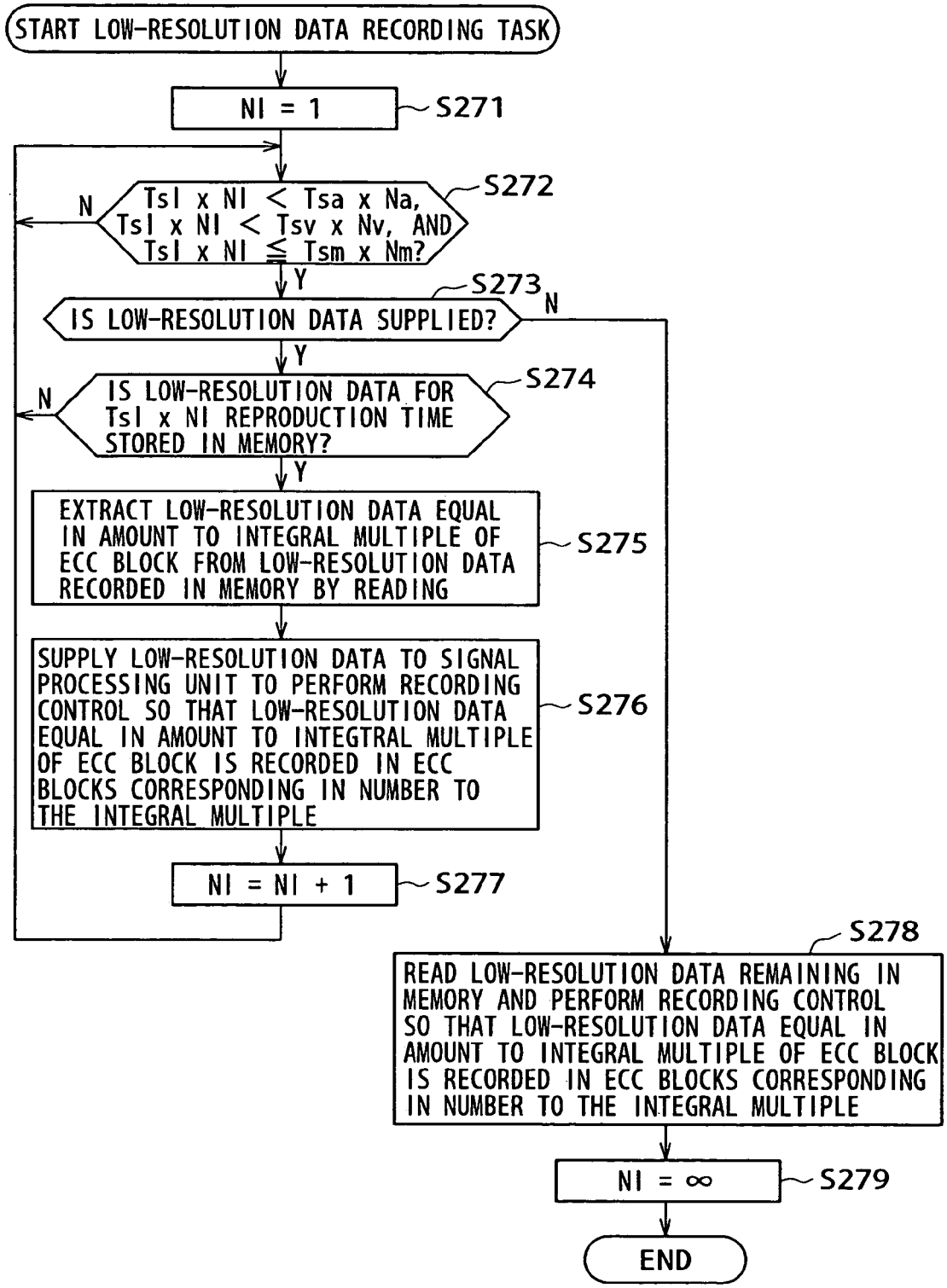
FIG. 39 is a flowchart of assistance in explaining a low resolution data recording task.

As a result of the determination process in each of step S252 in the audio file recording task of FIG. 34, step S262 in the video file recording task of FIG. 37, step S272 in the low-resolution file recording task of FIG. 39, and step S282 in the metadata recording task of FIG. 40, audio annual ring data, video annual ring data, low-resolution annual ring data, and meta annual ring data for similar reproduction time periods are periodically recorded on the optical disk 7 in priority order of the audio annual ring data, the video annual ring data, the low-resolution annual ring data, and the meta annual ring data.

However, the priority order when the audio annual ring data, the video annual ring data, the low-resolution annual ring data, and the meta annual ring data are recorded on the optical disk 7 is not limited to the above-described priority order of the audio annual ring data, the video annual ring data, the low-resolution annual ring data, and the meta annual ring data.

For example, the priority order when the audio annual ring data, the video annual ring data, the low-resolution annual ring data, and the meta annual ring data are recorded on the optical disk 7 can be order of the meta annual ring data, the audio annual ring data, the video annual ring data, and the low-resolution annual ring data.

The memory controller 116 extracts audio annual ring data, video annual ring data, low-resolution annual ring data, and meta annual ring data by reading data from the memory 117 as described above. The process of forming (extracting) the audio annual ring data, the video annual ring data, the low-resolution annual ring data, and the meta annual ring data will be described further with reference to FIGS. 41 to 45.

Figure 41:
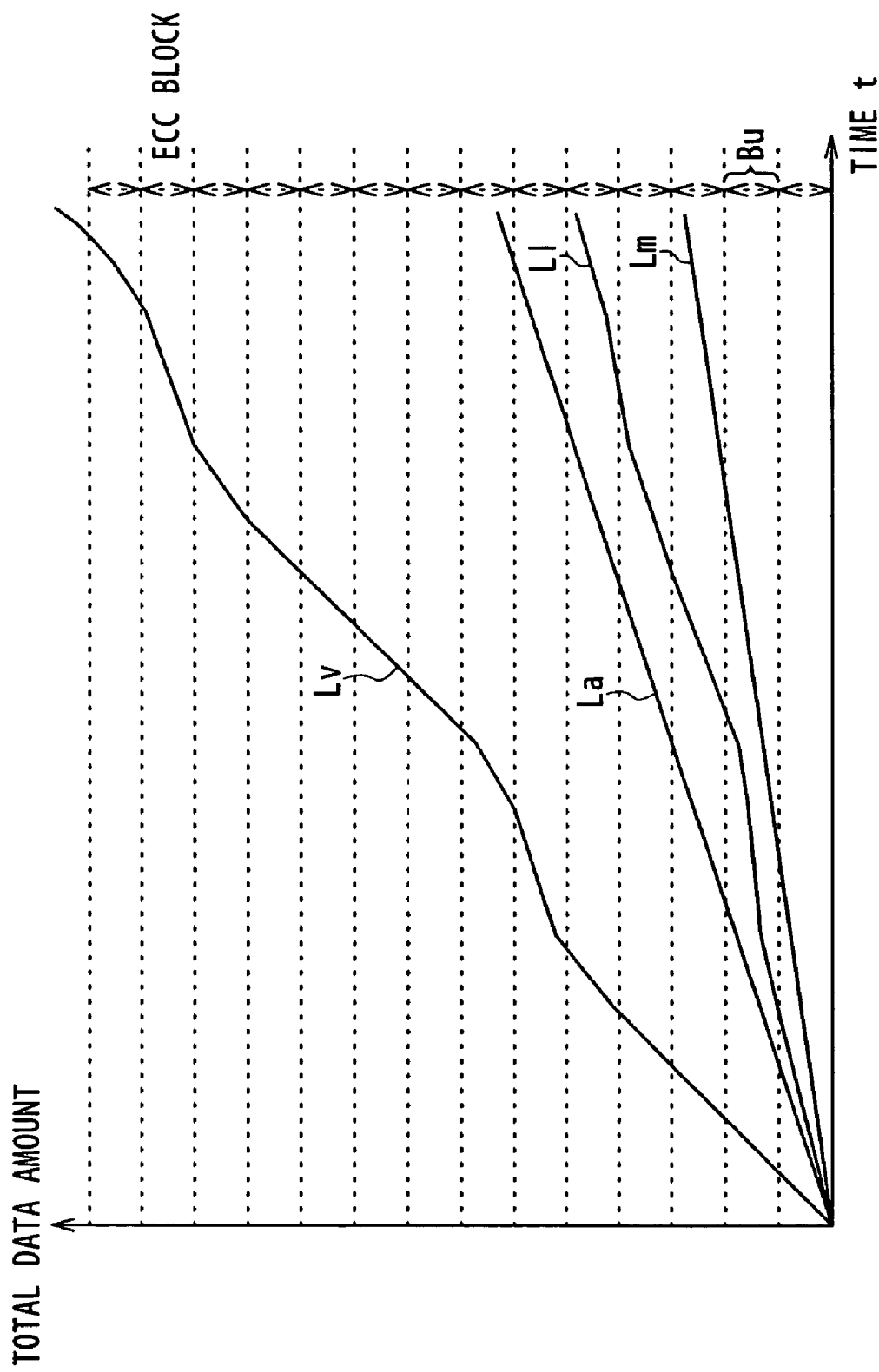
FIG. 41 is a diagram showing aggregate data amounts of data stored in a memory.

FIG. 41 shows a relation between time (reproduction time) t and each of an aggregate amount of data (aggregate data amount) La of an audio file, an aggregate data amount Lv of a video file, an aggregate data amount Ll of low resolution data, and an aggregate data amount Lm of metadata stored in the memory 117. Incidentally, small arrows indicating a vertical direction (arrows indicating intervals between dotted lines in a horizontal direction) on a right side in FIG. 41 denote an ECC block data amount Bu (the same is true for FIGS. 42 to 45 to be described later).

As described above, when an audio file necessary for reproduction for the reproduction time $T_{sa} \times N_a$ is stored in the memory 117, the memory controller 116 reads an audio file having a maximum amount of data readable from the memory 117 which amount is an integral multiple of the data amount of an ECC block, and thereby extracts as audio annual ring data the audio file having the maximum amount of data readable from the memory 117 which amount is an integral multiple of the data amount of an ECC block. Also, when a video file necessary for reproduction for the reproduction time $T_{sv} \times N_v$ is stored in the memory 117, the memory controller 116 reads a video file having a maximum amount of data readable from the memory 117 which amount is an integral multiple of the data amount of an ECC block, and thereby extracts as video annual ring data the video file having the maximum amount of data readable from the memory 117 which amount is an integral multiple of the data amount of an ECC block. Further, when low resolution data necessary for reproduction for the reproduction time $T_{sl} \times N_l$ is stored in the memory 117, the memory controller 116 reads low resolution data having a maximum amount of data readable from the memory 117 which amount is an integral multiple of the data amount of an ECC block, and thereby extracts as low-resolution annual ring data the low resolution data having the maximum amount of data readable from the memory 117 which amount is an integral multiple of the data amount of an ECC block. Further, when metadata necessary for reproduction for the reproduction time $T_{sm} \times N_m$ is stored in the memory 117, the memory controller 116 reads metadata having a maximum amount of data readable from the memory 117 which amount is an integral multiple of the data amount of an ECC block, and thereby extracts as meta annual ring data the metadata having the maximum amount of data readable from the memory 117 which amount is an integral multiple of the data amount of an ECC block.

Figure 42:
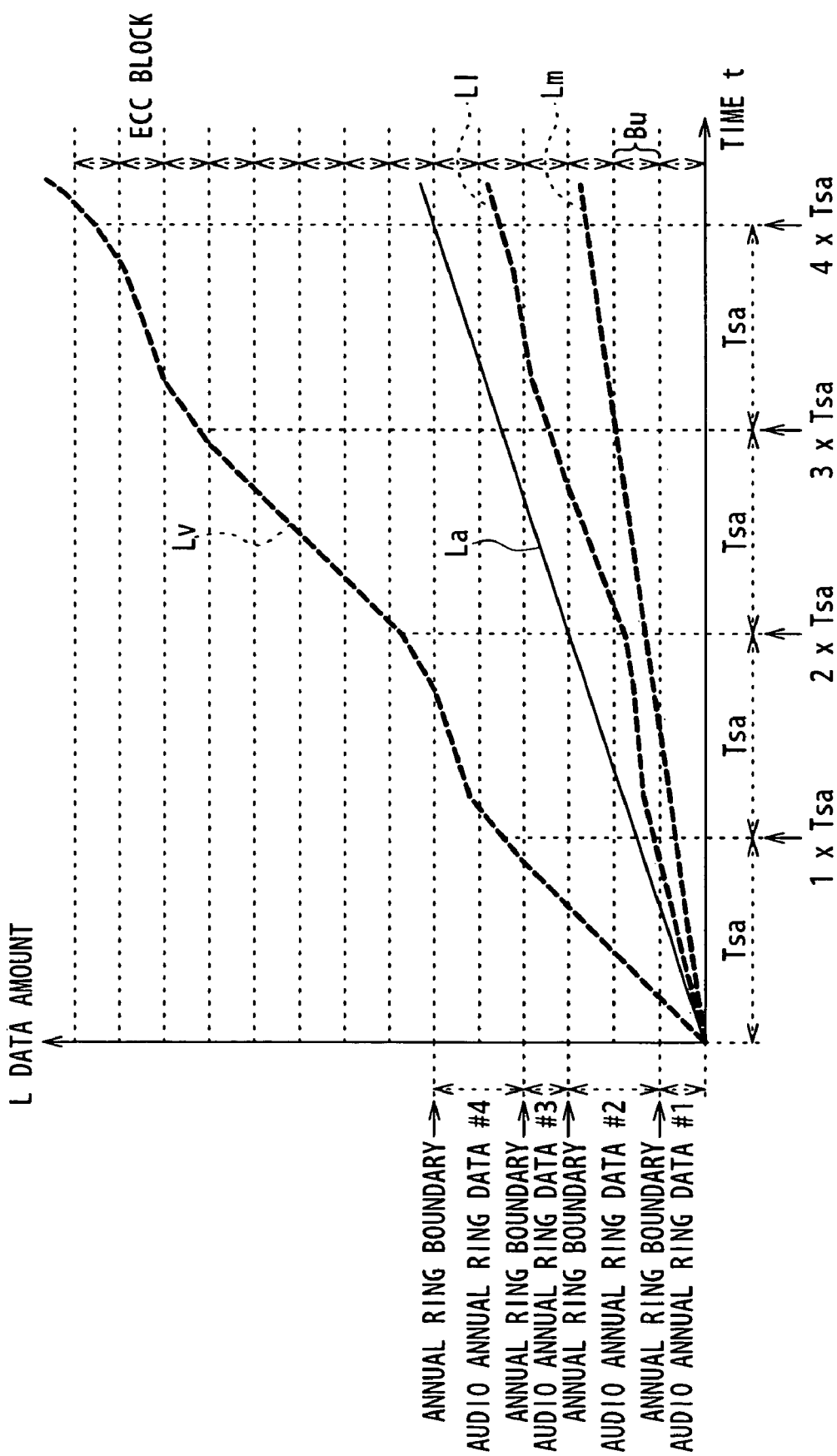
FIG. 42 is a diagram showing an aggregate data amount of data stored in the memory.

Thus, when the aggregate data amount La of the audio file stored in the memory 117 is changed as shown in FIG. 41, the memory controller 116 reads an audio file having a maximum amount of data readable from the memory 117 which amount is an integral multiple of the data amount of an ECC block in timing in which the time t is i (i=1, 2, . . . )$\times T_{sa}$, which is an integral multiple of the audio annual ring size $T_{sa}$, and thereby extracts as audio annual ring data the audio file having the maximum amount of data readable from the memory 117 which amount is an integral multiple of the data amount of an ECC block, as shown in FIG. 42.

In an embodiment of FIG. 42, in timing in which the time t is $T_{sa}$, $2 \times T_{sa}$, $3 \times T_{sa}$, and $4 \times T_{sa}$, audio files for one ECC block, two ECC blocks, one ECC block, and two ECC blocks are extracted as audio annual ring data #1, #2, #3, and #4, respectively.

Incidentally, a remainder as data remaining in the memory 117 as a result of the extraction of the audio annual ring data #1, #2, #3, and #4 in timing in which the time t is $T_{sa}$, $2 \times T_{sa}$, $3 \times T_{sa}$, and $4 \times T_{sa}$ is included in a next annual ring.

Figure 43:
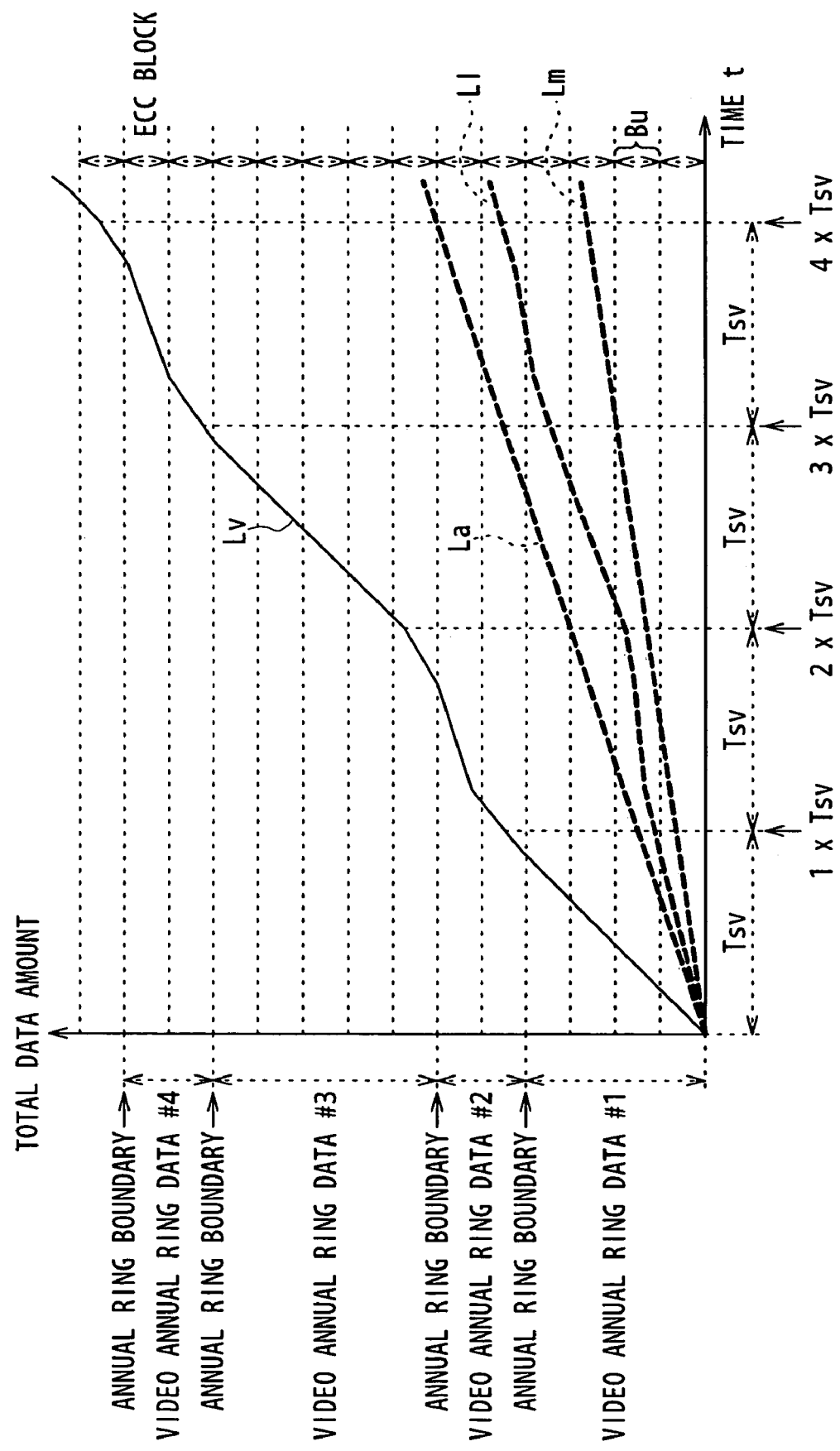
FIG. 43 is a diagram showing an aggregate data amount of data stored in the memory.

When the aggregate data amount Lv of the video file stored in the memory 117 is changed as shown in FIG. 41, the memory controller 116 reads a video file having a maximum amount of data readable from the memory 117 which amount is an integral multiple of the data amount of an ECC block in timing in which the time t is i$\times T_{sv}$, which is an integral multiple of the video annual ring size $T_{sv}$, and thereby extracts as video annual ring data the video file having the maximum amount of data readable from the memory 117 which amount is an integral multiple of the data amount of an ECC block, as shown in FIG. 43.

In an embodiment of FIG. 43, in timing in which the time t is $T_{sv}$, $2 \times T_{sv}$, $3 \times T_{sv}$, and $4 \times T_{sv}$, video files for four ECC blocks, two ECC blocks, five ECC blocks, and two ECC blocks are extracted as video annual ring data #1, #2, #3, and #4, respectively.

Incidentally, a remainder as data remaining in the memory 117 as a result of the extraction of the video annual ring data #1, #2, #3, and #4 in timing in which the time t is $T_{sv}$, $2 \times T_{sv}$, $3 \times T_{sv}$, and $4 \times T_{sv}$ is included in a next annual ring.

Figure 44:
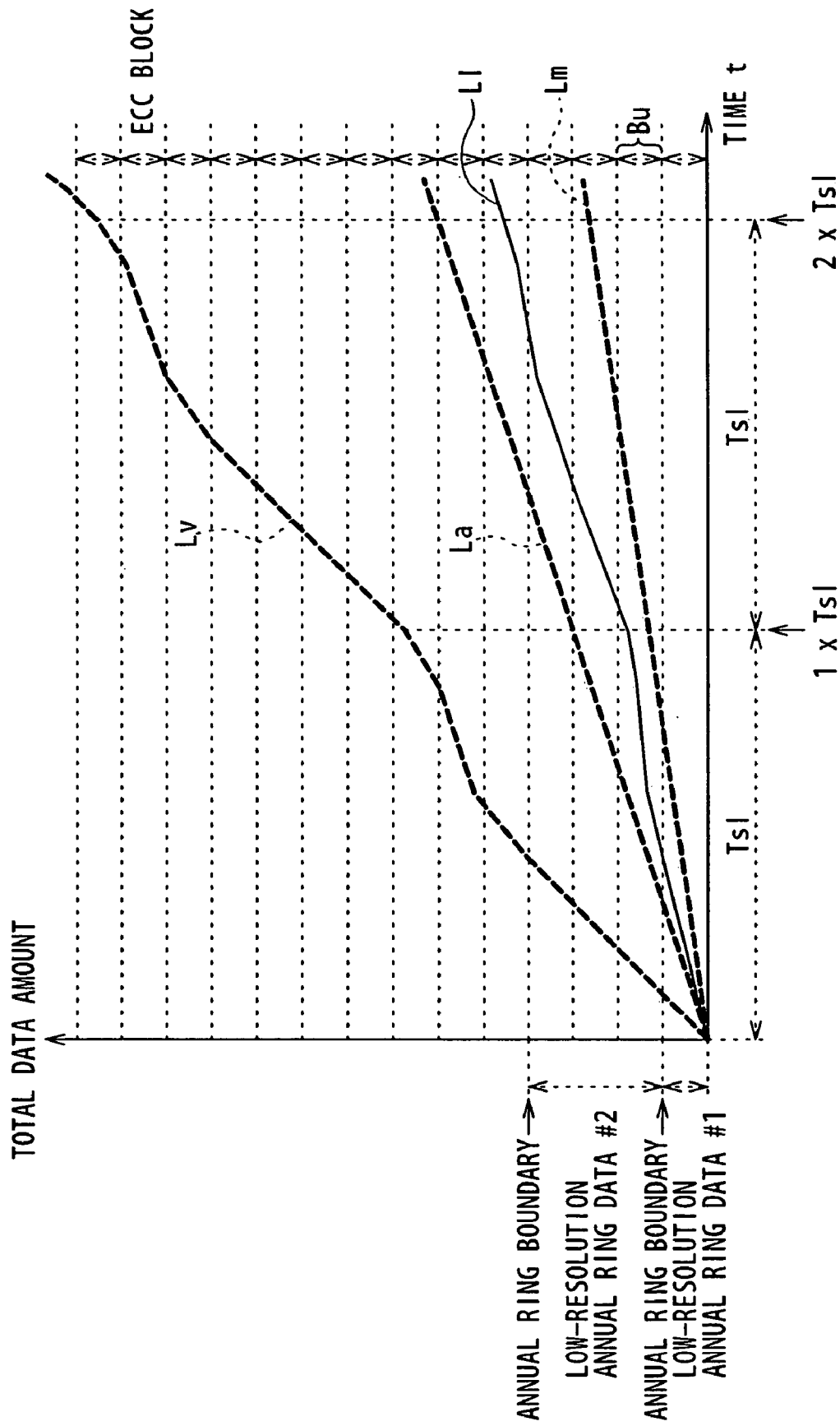
FIG. 44 is a diagram showing an aggregate data amount of data stored in the memory.

Further, when the aggregate data amount Ll of the low resolution data stored in the memory 117 is changed as shown in FIG. 41, the memory controller 116 reads low resolution data having a maximum amount of data readable from the memory 117 which amount is an integral multiple of the data amount of an ECC block in timing in which the time t is i$\times T_{sl}$, which is an integral multiple of the low-resolution annual ring size $T_{sl}$, and thereby extracts as low-resolution annual ring data the low resolution data having the maximum amount of data readable from the memory 117 which amount is an integral multiple of the data amount of an ECC block, as shown in FIG. 44.

In an embodiment of FIG. 44, in timing in which the time t is $T_{sl}$ and $2 \times T_{sl}$, low resolution data for one ECC block and low resolution data for three ECC blocks are extracted as low-resolution annual ring data #1 and #2, respectively.

Incidentally, a remainder as data remaining in the memory 117 as a result of the extraction of the low-resolution annual ring data #1 and #2 in timing in which the time t is $T_{sl}$ and $2 \times T_{sl}$ is included in a next annual ring.

Figure 45:
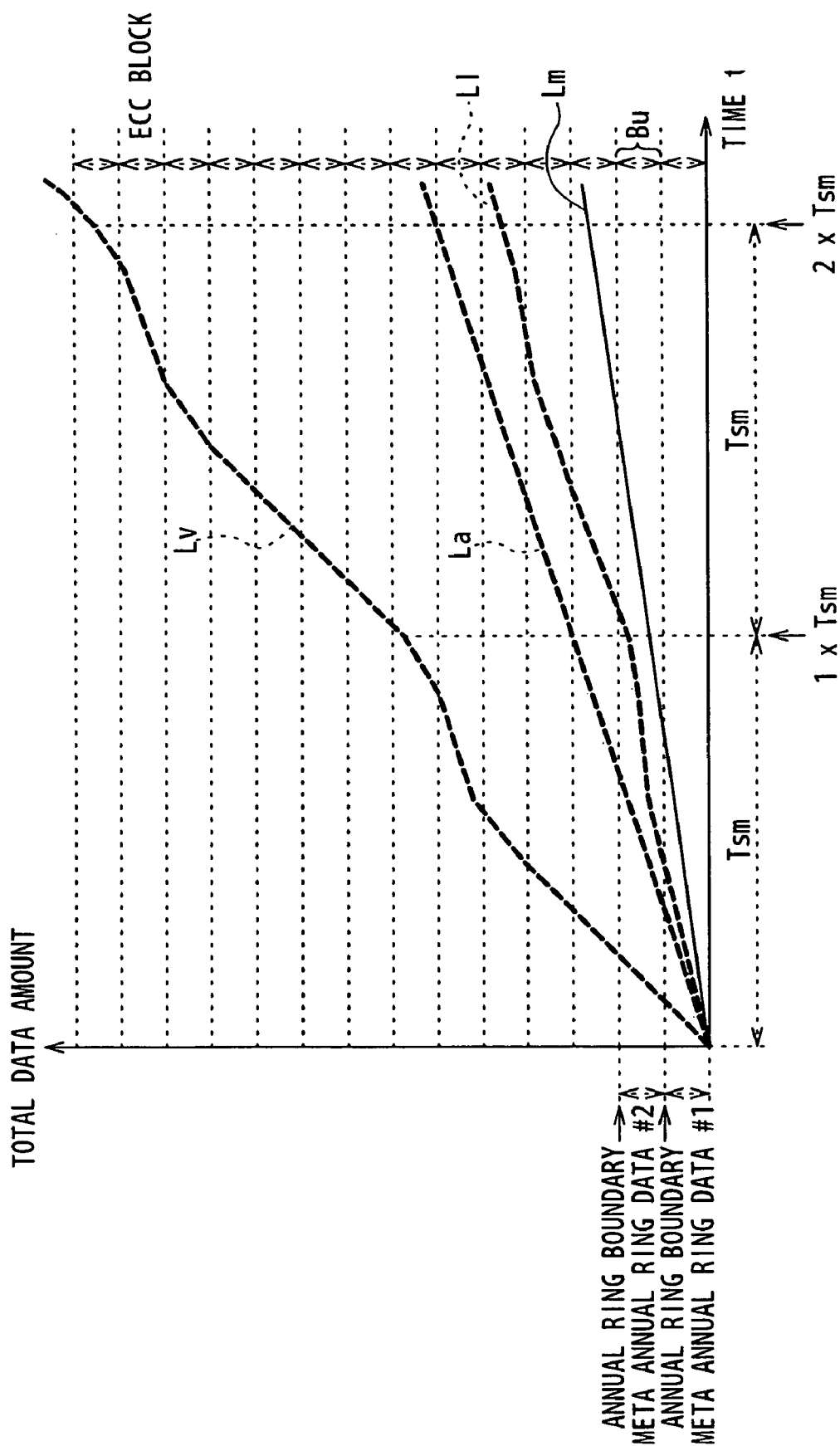
FIG. 45 is a diagram showing an aggregate data amount of data stored in the memory.

Further, when the aggregate data amount Lm of the metadata stored in the memory 117 is changed as shown in FIG. 41, the memory controller 116 reads metadata having a maximum amount of data readable from the memory 117 which amount is an integral multiple of the data amount of an ECC block in timing in which the time t is i$\times T_{sm}$, which is an integral multiple of the meta annual ring size $T_{sm}$, and thereby extracts as meta annual ring data the metadata having the maximum amount of data readable from the memory 117 which amount is an integral multiple of the data amount of an ECC block, as shown in FIG. 45.

In an embodiment of FIG. 45, in timing in which the time t is $T_{sm}$ and $2 \times T_{sm}$, metadata for one ECC block and metadata for one ECC block are extracted as meta annual ring data #1 and #2, respectively.

Incidentally, a remainder as data remaining in the memory 117 as a result of the extraction of the meta annual ring data #1 and #2 in timing in which the time t is $T_{sm}$ and $2 \times T_{sm}$ is included in a next annual ring.

Figure 46:
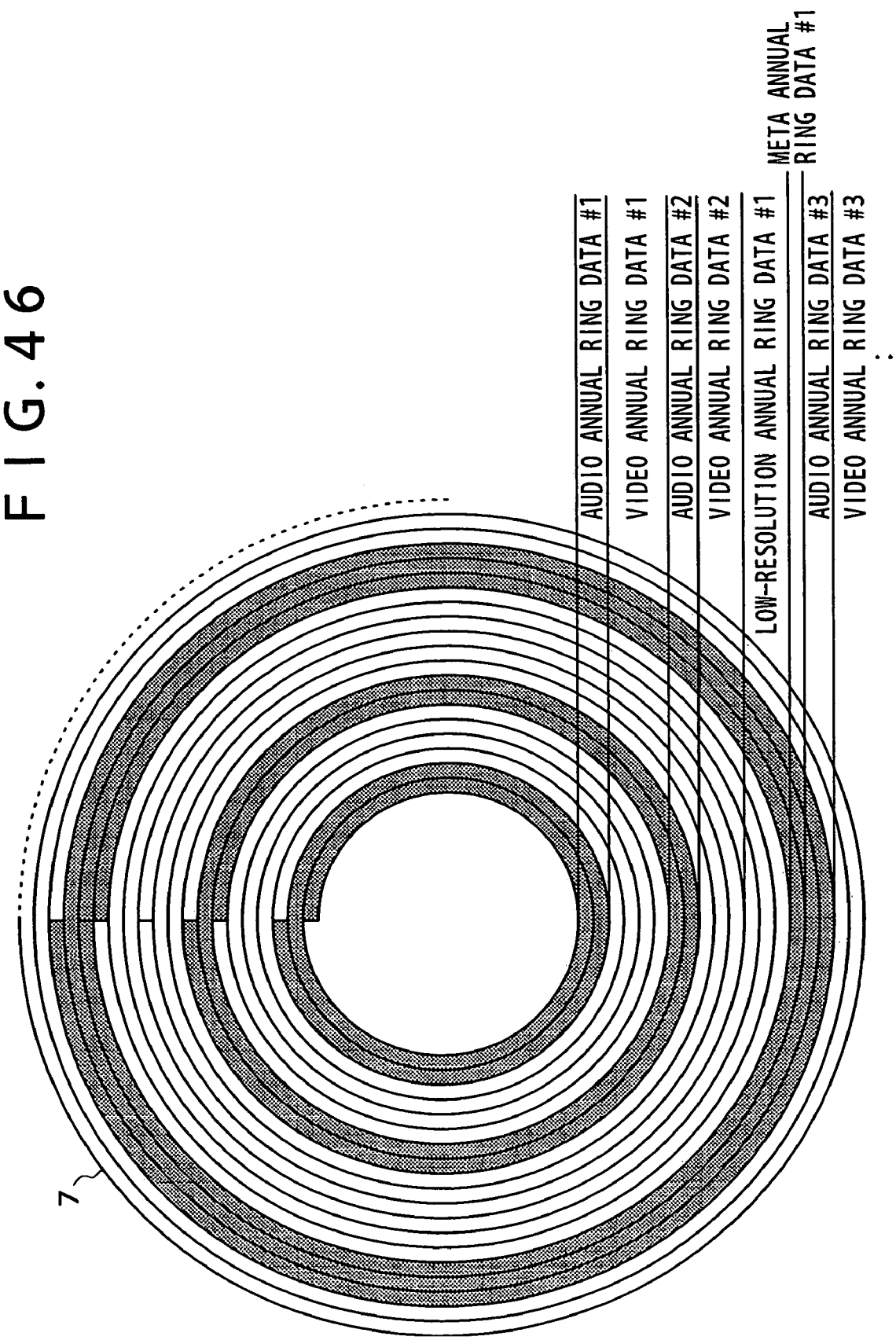
FIG. 46 is a diagram showing a recorded state of data on the optical disk.

Supposing that the audio annual ring size $T_{sa}$ shown in FIG. 42, the video annual ring size $T_{sv}$ shown in FIG. 43, the low-resolution annual ring size $T_{sl}$ shown in FIG. 44, and the meta annual ring size $T_{sm}$ shown in FIG. 45 have relations such that the video annual ring size $T_{sv}$ is equal to the audio annual ring size $T_{sa}$, and such that the low-resolution annual ring size $T_{sl}$ and the meta annual ring size $T_{sm}$ are equal to twice the audio annual ring size $T_{sa}$ ($2 \times T_{sa} = 2 \times T_{sv} = T_{sl} = T_{sm}$), for example, the audio file recording task of FIG. 34, the video file recording task of FIG. 37, the low resolution data recording task of FIG. 39, and the metadata recording task of FIG. 40 periodically record the audio annual ring data #1 to #4 in FIG. 42, the video annual ring data #1 to #4 in FIG. 43, the low-resolution annual ring data #1 and #2 in FIG. 44, and the meta annual ring data #1 and #2 in FIG. 45 on the optical disk 7 as shown in FIG. 46.

That is, as described above, audio annual ring data, video annual ring data, low-resolution annual ring data, and meta annual ring data for similar reproduction time periods are disposed at earlier positions on the optical disk 7 in priority order of the audio annual ring data, the video annual ring data, the low-resolution annual ring data, and the meta annual ring data, as described above.

Considering the audio annual ring data having the highest priority as a reference, for example, video annual ring data of the same video annual ring size $T_{sv}$ as the audio annual ring size $T_{sa}$ is recorded on the optical disk 7 in the same cycle as the audio annual ring data. That is, when audio annual ring data for a certain reproduction time period is recorded, video annual ring data for a similar reproduction time period to that reproduction time period is recorded following the audio annual ring data.

Low-resolution annual ring data of the low-resolution annual ring size $T_{sl}$ twice the audio annual ring size $T_{sa}$ is recorded on the optical disk 7 in a cycle twice that of the audio annual ring data. That is, for low-resolution annual ring data for a certain reproduction time period, there is audio annual ring data for two reproduction time periods such as are obtained by halving the reproduction time period of the low-resolution annual ring data, and the low-resolution annual ring data is recorded after the audio annual ring data for the two reproduction time periods is recorded.

Further, meta annual ring data of the meta annual ring size $T_{sm}$ twice the audio annual ring size $T_{sa}$ is also recorded on the optical disk 7 in a cycle twice that of the audio annual ring data. That is, for meta annual ring data for a certain reproduction time period, there is audio annual ring data for two reproduction time periods such as are obtained by halving the reproduction time period of the meta annual ring data, and the meta annual ring data is recorded after the audio annual ring data for the two reproduction time periods is recorded.

Thus, as shown in FIG. 46, the audio annual ring data #1 to #4 in FIG. 42, the video annual ring data #1 to #4 in FIG. 43, the low-resolution annual ring data #1 and #2 in FIG. 44, and the meta annual ring data #1 and #2 in FIG. 45 are recorded from an inner circumference side to an outer circumference side of the optical disk 7 in order of the audio annual ring data #1, the video annual ring data #1, the audio annual ring data #2, the video annual ring data #2, the low-resolution annual ring data #1, the meta annual ring data #1, the audio annual ring data #3, the video annual ring data #3, the audio annual ring data #4, the video annual ring data #4, the low-resolution annual ring data #2, the meta annual ring data #2, . . . .

It is to be noted that while in the embodiments of FIGS. 41 to 46, the video annual ring size $T_{sv}$ is equal to the audio annual ring size $T_{sa}$, and the low-resolution annual ring size $T_{sl}$ and the meta annual ring size $T_{sm}$ are twice the audio annual ring size $T_{sa}$, relations between the audio annual ring size $T_{sa}$, the video annual ring size $T_{sv}$, the low-resolution annual ring size $T_{sl}$, and the meta annual ring size $T_{sm}$ are not limited to this. Specifically, the audio annual ring size $T_{sa}$, the video annual ring size $T_{sv}$, the low-resolution annual ring size $T_{sl}$, and the meta annual ring size $T_{sm}$ can all be an identical time, or can each be a different time, for example.

Also, the audio annual ring size $T_{sa}$, the video annual ring size $T_{sv}$, the low-resolution annual ring size $T_{sl}$, and the meta annual ring size $T_{sm}$ can be set according to an application or a purpose of use of the optical disk 7, for example.

Specifically, the low-resolution annual ring size $T_{sl}$ and the meta annual ring size $T_{sm}$ can be larger than the audio annual ring size $T_{sa}$ and the video annual ring size $T_{sv}$, for example.

When the low-resolution annual ring size $T_{sl}$ is larger than the audio annual ring size $T_{sa}$ and the video annual ring size $T_{sv}$ (when the low-resolution annual ring size $T_{sl}$ is 10 seconds while the audio annual ring size $T_{sa}$ and the video annual ring size $T_{sv}$ are two seconds, for example), it is possible to improve for example a speed of shuttle reproduction using low resolution data and a rate of transfer of low resolution data to an external apparatus such a computer or the like.

That is, since low resolution data is smaller in data amount than main line data, low resolution data can be read from the optical disk 7 in a shorter time. Further, because of a light processing load, low resolution data can be used for variable-speed reproduction such as shuttle reproduction or the like. When the low-resolution annual ring size $T_{sl}$ is large, frequency of seeks occurring when only low resolution data is read from the optical disk 7 can be decreased. It is therefore possible to read only low resolution data from the optical disk 7 in a shorter time, and when shuttle reproduction using the low resolution data is performed, it is possible to improve a speed of the shuttle reproduction. Further, when the low resolution data is transferred to a computer or the like for processing, it is possible to improve a rate of the transfer (shorten a time required for the transfer).

When the meta annual ring size $T_{sm}$ is larger than the audio annual ring size $T_{sa}$ and the video annual ring size $T_{sv}$ (when the meta annual ring size $T_{sm}$ is 20 seconds while the audio annual ring size $T_{sa}$ and the video annual ring size $T_{sv}$ are two seconds, for example), as in the case of the large low-resolution annual ring size $T_{sl}$, it is possible to read only metadata from the optical disk 7 in a short time. Thus, using a time code or the like included in the metadata, for example, a specific frame in a video file as main line data can be retrieved quickly.

Thus, when shuttle reproduction or transfer to the outside of low resolution data is required to be performed at high speed, the low-resolution annual ring size $T_{sl}$ is increased. When quick retrieval of a frame is required, the meta annual ring size $T_{sm}$ is increased. Thereby a highly convenient optical disk 7 meeting the requirements can be provided.

As described above, by increasing the low-resolution annual ring size $T_{sl}$ or the meta annual ring size $T_{sm}$, it is possible to reduce a time required to read (and a time required to write) a specific data series such as only low resolution data or metadata.

Hence, when the audio annual ring size $T_{sa}$ or the video annual ring size $T_{sv}$ is large, it is also possible to reduce a time required to read (and write) only an audio file or a video file as main line data. As a result, when performing a so-called AV (Audio Visual) split edit, which edits only an audio file or video file, it is possible to increase speed of the edit process.

In order to start video and audio reproduction, however, it is necessary to wait until both a video file and an audio file accompanying the video file at each reproduction time are obtained. When the audio annual ring size $T_{sa}$ and the video annual ring size $T_{sv}$ are large, since it is necessary to read one of an audio file of the large audio annual ring size $T_{sa}$ and a video file of the large video annual ring size $T_{sv}$ and thereafter read the other file, a time required to obtain both the video file and the audio file accompanying the video file at a certain reproduction time is increased, thus resulting in a longer delay time between a reproduction command and a start of actual reproduction. In addition, to reproduce simultaneously the video file and the audio file accompanying the video file at the certain reproduction time, one to be read first of the audio file of the large audio annual ring size $T_{sa}$ and the video file of the large video annual ring size $T_{sv}$ needs to be stored in the memory 117 at least until readout of the other file to be read thereafter is started. Thus, the large audio annual ring size $T_{sa}$ and the large video annual ring size $T_{sv}$ increase a delay time before reproduction is started, and require a large capacity of the memory 117.

It is therefore desirable to determine the audio annual ring size $T_{sa}$ and the video annual ring size $T_{sv}$ in consideration of the delay time before the start of reproduction and a value allowed as the capacity of the memory 117.

Incidentally, low resolution data and metadata are sufficiently smaller in data amount than an audio file and a video file. Hence, an increase in capacity required of the memory 117 when the low-resolution annual ring size $T_{sl}$ and the meta annual ring size $T_{sm}$ are large presents less of a problem as compared with the case where the audio annual ring size $T_{sa}$ and the video annual ring size $T_{sv}$ are large.

The priority order at the time of recording on the optical disk 7 can be order of meta annual ring data, audio annual ring data, video annual ring data, and low-resolution annual ring data. In this case, as shown in FIG. 47, for example, the meta annual ring data #1 and #2, the audio annual ring data #1 and #2, the video annual ring data #1 and #2, and the low-resolution annual ring data #1 and #2 are recorded from the inner circumference side to the outer circumference side of the optical disk 7 in order of the meta annual ring data #1, the audio annual ring data #1, the video annual ring data #1, the low-resolution annual ring data #1, the meta annual ring data #2, the audio annual ring data #2, the video annual ring data #2, the low-resolution annual ring data #2, . . . .

Figure 48:
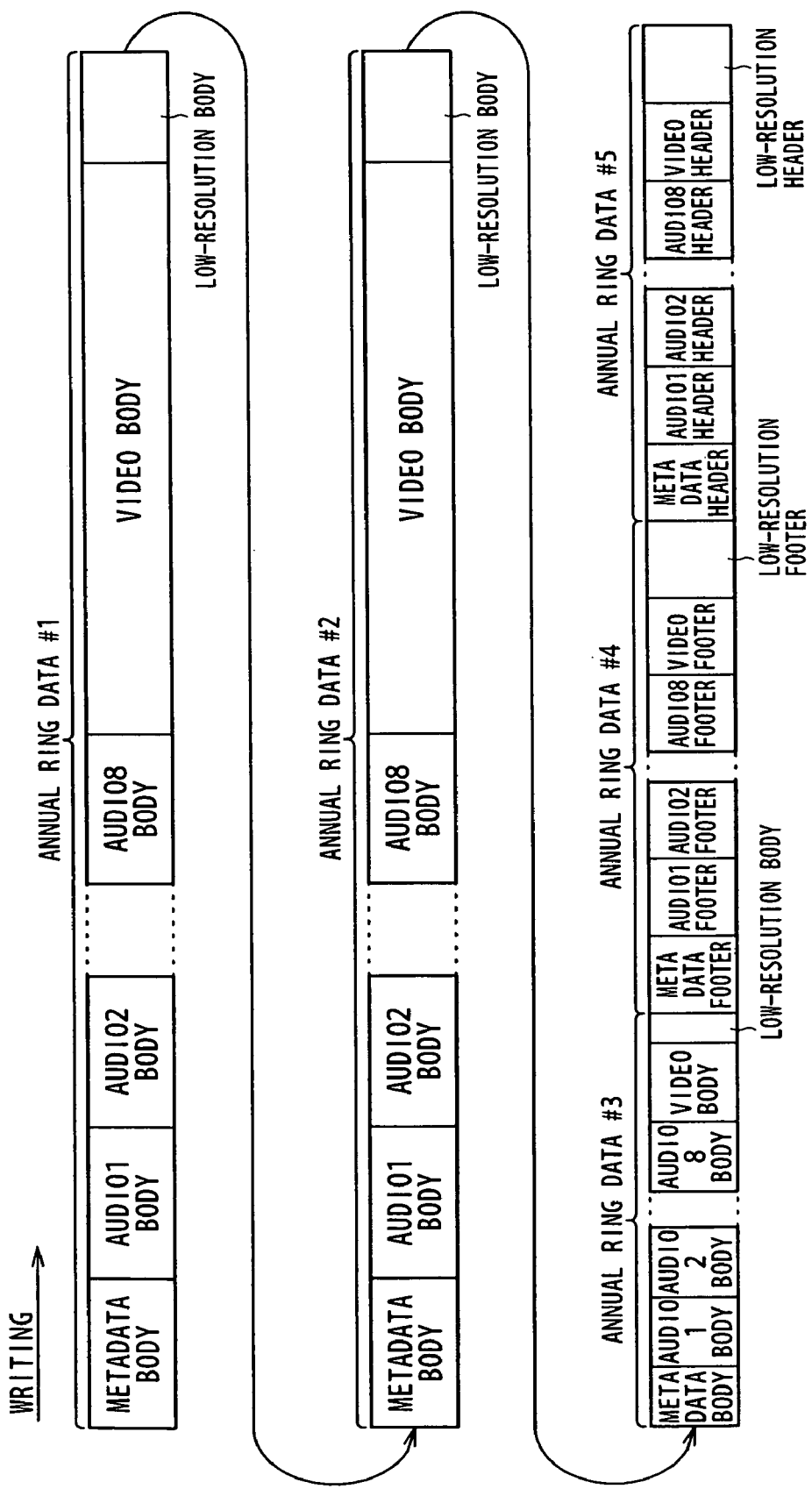
FIG. 48 is a diagram of assistance in explaining data recorded on the optical disk.

FIG. 48 shows how the disk drive device 11 writes and reads data on the optical disk 7. In FIG. 48, four data series of a metadata file, an audio file, a video file, and low resolution data are written and read on the optical disk 7.

In FIG. 48, the meta annual ring data #1, the audio annual ring data #1, the video annual ring data #1, and the low-resolution annual ring data #1 are represented as annual ring data #1. The meta annual ring data #2, the audio annual ring data #2, the video annual ring data #2, and the low-resolution annual ring data #2 are represented as annual ring data #2. Similarly, Nth meta annual ring data #N, Nth audio annual ring data #N, Nth video annual ring data #N, and Nth low-resolution annual ring data #N are represented as annual ring data #N.

When the data is written to the optical disk 7, on an assumption that there is a sufficiently large, continuous space area on the optical disk 7 and that there is no defect in the space area, the audio annual ring data, the video annual ring data, the low-resolution annual ring data, and the meta annual ring data extracted from the data series of the metadata, the audio file, the video file, and the low resolution data are written to the space area on the optical disk 7 as with a single stroke of a brush, so to speak, as shown in FIG. 48. Incidentally, the meta annual ring data, the audio annual ring data, the video annual ring data, and the low-resolution annual ring data each have a data amount of an integral multiple of an ECC block on the optical disk 7, and are recorded such that boundaries of the data coincide with ECC block boundaries.

As described with reference to the flowchart of the metadata file generating process of FIG. 13 and the flowchart of the video file generating process of FIG. 15, the metadata file and the video file are supplied to the disk drive device 11 in order of a body, a footer, and a header.

As described with reference to the flowchart of the audio file generating process of FIG. 16, as for the audio file, a value of an audio item of a body and a filler in a KLV structure are supplied to the disk drive device 11, a footer is then supplied to the disk drive device 11, and thereafter a header and a key and a length of the audio item are supplied to the disk drive device 11.

As described with reference to the flowchart of the low-resolution file synthesizing process of FIG. 32, the low-resolution file is supplied to the memory controller 116 in order of a body, a footer, and a header.

Thus, the audio annual ring data, the video annual ring data, the low-resolution annual ring data, and the meta annual ring data extracted from the data series of the metadata, the audio file, the video file, and the low resolution data are written to the space area on the optical disk 7 in order of the body, the footer, and the header, as shown in FIG. 48.

Figure 49:
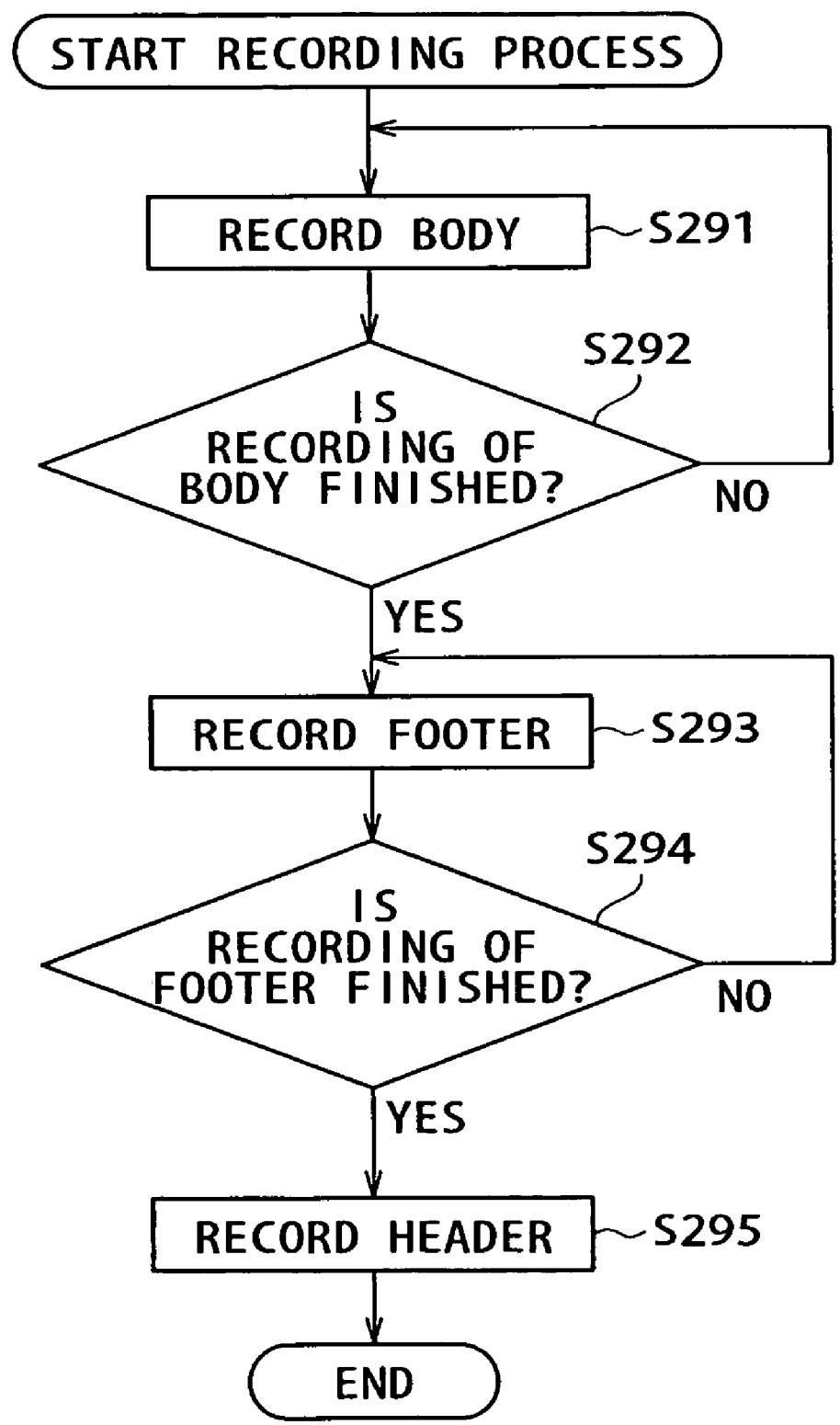
FIG. 49 is a flowchart of assistance in explaining a recording process.

The processes described with reference to the flowchart of the metadata file generating process of FIG. 13, the flowchart of the video file generating process of FIG. 15, the flowchart of the audio file generating process of FIG. 16, the flowchart of the low-resolution file synthesizing process of FIG. 32, and the flowchart of the recording process of FIG. 33 will be referred to collectively as a recording process, which will be described with reference to a flowchart of FIG. 49.

In step S291, the control unit 119 of the disk drive device 11 records the bodies of the metadata file, the video file, the audio file, and the low resolution file onto the optical disk 7. The process proceeds to step S292. In step S292, the control unit 119 determines whether the recording of the bodies of the metadata file, the video file, the audio file, and the low resolution file is completed. When the control unit 119 determines that the recording of the bodies is not completed, the process returns to step S291 to repeat the process of recording the bodies.

When the control unit 119 determines in step S292 that the recording of the bodies is completed, the process proceeds to step S293, where the control unit 119 records the footers of the metadata file, the video file, the audio file, and the low resolution file onto the optical disk 7. The process proceeds to step S294. In step S294, the control unit 119 determines whether the recording of the footers of the metadata file, the video file, the audio file, and the low resolution file is completed. When the control unit 119 determines that the recording of the footers is not completed, the process returns to step S293 to repeat the process of recording the footers.

When the control unit 119 determines in step S294 that the recording of the footers is completed, the process proceeds to step S295, where the control unit 119 records the headers of the metadata file, the video file, the audio file, and the low resolution file onto the optical disk 7. Then the recording process is ended.

Therefore the header, which includes data that is not determined until the body and the footer are set, such as audio data reproduction time, a time code (TC) or the like, can be generated by one process.

Also, it is possible to reliably record the header following the body and the footer, or reliably record the header at a position close to the body and the footer on the optical disk 7.

Incidentally, when the file is read from the optical disk 7, seeks to the header, the body, and the footer are performed in order, and the header, the body, and the footer are read in order.

In the present embodiment, the memory controller 116 extracts audio annual ring data by reading an audio file having a data amount that is an integral multiple of a unit of reading and writing such for example as an ECC block and which is a maximum amount of data readable from the memory 117 at each time of an integral multiple of the audio annual ring size $T_{sa}$. That is, when an audio file having a data amount that is larger than that of N ECC blocks but smaller than that of (N+1) ECC blocks is stored in the memory 117 at a time of an integral multiple of the audio annual ring size $T_{sa}$, an audio file having the data amount of N ECC blocks is extracted as audio annual ring data. However, it is also possible for example to wait for an audio file having a data amount of (N+1) ECC blocks or more to be stored in the memory 117 after a time of an integral multiple of the audio annual ring size $T_{sa}$, and extract audio annual ring data by reading an audio file having a data amount of (N+1) ECC blocks. The same is true for extraction of video annual ring data, low-resolution annual ring data, and meta annual ring data. That is, the data amount of annual ring data needs only to be a data amount of an integral multiple of a unit of reading and writing on the optical disk 7 and a data amount close to a data amount required for reproduction for a reproduction time set as the audio annual ring size or the like.

Further, it is possible not only to include all components of metadata in meta annual ring data but also to include a part of the components in meta annual ring data and record the other components separately from the meta annual ring data. Specifically, it is possible to divide metadata into components usable for retrieval of a frame in a video file, such for example as a time code, and other components, to record the components usable for the retrieval en bloc on an inner circumference side on the optical disk 7, for example, and to periodically record the other components onto the optical disk 7 by including the other components in meta annual ring data. In this case, since the components usable for the retrieval are recorded en bloc on the optical disk 7, a time required for the retrieval can be reduced.

Incidentally, all the components of metadata may be recorded en bloc on an inner circumference side or the like on the optical disk 7. When all the components of metadata are recorded en bloc on the inner circumference side or the like on the optical disk 7, however, it is necessary to record data series other than the metadata after waiting until the recording of all the components of the metadata is completed, or store all the components of the metadata until the recording of the data series other than the metadata is completed. On the other hand, when only components of the metadata which components are usable for retrieval are recorded en bloc on the optical disk 7, a time of waiting for the recording of the data series other than the metadata can be shortened, or a data amount of metadata required to be stored until the recording of the data series other than the metadata is completed can be reduced, as compared with the case where all the components of the metadata are recorded en bloc on the optical disk 7.

The present invention is also applicable to disk-shaped recording media other than optical disks.

In addition, while the above description has been made by taking a case of disposing a video file and an audio file on a spiral track as an example, the video file and the audio file can be disposed on concentric tracks alternately. In this case, each track on an inner circumference side is continuous with an adjacent track on an outer circumference side.

FIG. 50 shows a configuration of the independent/standard converting unit 22 in FIG. 7.

A buffer 301 temporarily stores files in the AV independent format (a master file, a file unit metadata file, a frame unit metadata file, an auxiliary file, a video file, an audio file of each of eight channels, and a low resolution data file) supplied from the disk drive device 11 (FIG. 1).

A file obtaining unit 302 recognizes file names of the file unit metadata file, the frame unit metadata file, the auxiliary file, the video file, the audio file of each of the eight channels, and the low resolution file by referring to the master file stored in the buffer 301. The file obtaining unit 302 makes the disk drive device 11 read the file unit metadata file, the frame unit metadata file, the auxiliary file, the video file, the audio file of each of the eight channels, and the low resolution file from the optical disk 7 on the basis of the file names, and thereby obtains the file unit metadata file, the frame unit metadata file, the auxiliary file, the video file, the audio file of each of the eight channels, and the low resolution file via the buffer 301. Further, the file obtaining unit 302 supplies the obtained file unit metadata file and the frame unit metadata file to a metadata file processing unit 303, supplies the auxiliary file to an auxiliary file processing unit 304, supplies the video file to a video file processing unit 305, and supplies the audio file of each of the eight channels to an audio file processing unit 306. The file obtaining unit 302 also supplies the low resolution file to a buffer 308.

The metadata file processing unit 303 extracts file unit metadata from the file unit metadata file supplied from the file obtaining unit 302. The metadata file processing unit 303 also extracts system items having frame unit metadata disposed therein from the frame unit metadata file. The metadata file processing unit 303 then supplies the file unit metadata and the system items to a data synthesizing unit 307.

The auxiliary file processing unit 304 extracts auxiliary items from the auxiliary file supplied from the file obtaining unit 302, and then supplies the auxiliary items to the data synthesizing unit 307.

The video file processing unit 305 extracts picture items from the video file supplied from the file obtaining unit 302, and then supplies the picture items to the data synthesizing unit 307.

The audio file processing unit 306 extracts audio data of each channel from the audio file of each of the eight channels supplied from the file obtaining unit 302. Further, the audio file processing unit 306 constructs sound items in which the audio data of each channel is multiplexed and disposed, and then supplies the sound items to the data synthesizing unit 307.

The data synthesizing unit 307 constructs a file in the standard AV multiplex format using the file unit metadata and the system items supplied from the metadata file processing unit 303, the auxiliary items supplied from the auxiliary file processing unit 304, the picture items supplied from the video file processing unit 305, and the sound items supplied from the audio file processing unit 306. The data synthesizing unit 307 then supplies the file in the standard AV multiplex format to the buffer 308.

The buffer 308 temporarily stores the file in the standard AV multiplex format supplied from the data synthesizing unit 307 or the low resolution file supplied from the file obtaining unit 302, and then supplies the file in the standard AV multiplex format or the low resolution file to the communication I/F 13 (FIG. 1).

FIG. 51 shows a configuration of the video file processing unit 305 in FIG. 50.

The video file supplied from the file obtaining unit 302 is supplied to a header/footer removing unit 311. The header/footer removing unit 311 removes a header and a footer from the video file supplied to the header/footer removing unit 311. The header/footer removing unit 311 supplies a remaining body to a disintegrating unit 312. The disintegrating unit 312 separates a sequence of picture items disposed in the body supplied from the header/footer removing unit 311, and thereby extracts, from the sequence, each picture item in which video data in a unit to be multiplexed with other items (a system item, a sound item, and an auxiliary item), that is, a frame unit in this case is disposed. The disintegrating unit 312 then supplies the picture item to the data synthesizing unit 307 (FIG. 50).

FIG. 52 shows an example of configuration of the audio file processing unit 306 in FIG. 50.

The audio file of each of the eight channels supplied from the file obtaining unit 302 is supplied to a header/footer removing unit 321. The header/footer removing unit 321 removes a header and a footer from the audio file of each of the eight channels supplied to the header/footer removing unit 321, and then supplies a body of each channel remaining as a result of the removal to a KLV decoder 322.

The KLV decoder 322 disintegrates a KLV structure of the body of each channel supplied from the header/footer removing unit 321. The KLV decoder 322 supplies thereby obtained audio data in the WAVE format of each channel to a data converting unit 323.

The data converting unit 323 subjects the audio data supplied from the KLV decoder 322 to conversion processing reverse to that of the data converting unit 63 in FIG. 10. Specifically, the data converting unit 323 converts the audio data in the WAVE format of each channel supplied from the KLV decoder 322 into audio data in the AES3 format of each channel. The data converting unit 323 then supplies the audio data in the AES3 format of each channel to a channel multiplexing unit 324.

The channel multiplexing unit 324 multiplexes the audio data of each channel supplied from the data converting unit 323 in sample units. The channel multiplexing unit 324 supplies multiplexed audio data obtained as a result of the multiplexing to a KLV encoder 325.

The KLV encoder 325 divides the multiplexed audio data supplied from the channel multiplexing unit 324 into units corresponding to respective frames of the video data. The KLV encoder 325 KLV-codes the multiplexed audio data corresponding to each frame into a KLV structure. Further, the KLV encoder 325 adds a KLV structure of a filler wanted to the fixed length of a sound item to the KLV structure of the multiplexed audio data corresponding to each frame. The KLV encoder 325 thereby constructs a sound item, and then supplies the sound item to the data synthesizing unit 307 (FIG. 50).

FIG. 53 shows an example of configuration of the data synthesizing unit 307 in FIG. 50.

A header/footer generating unit 331 is supplied with the file unit metadata outputted by the metadata file processing unit 303. The header/footer generating unit 331 generates a header and a footer for a file in the standard AV multiplex format. Further, the header/footer generating unit 331 disposes the file unit metadata from the metadata file processing unit 303 in header metadata of the header. The header/footer generating unit 331 then supplies the header and the footer to a header/footer adding unit 333.

A multiplexing unit 332 is supplied with the system items outputted by the metadata file processing unit 303, the auxiliary items supplied from the auxiliary file processing unit 304, the picture items supplied from the video file processing unit 305, and the sound items supplied from the audio file processing unit 306. The multiplexing unit 332 constructs a sequence of edit units by sequentially multiplexing the system items, the picture items, the sound items, and the auxiliary items supplied thereto in that order. The multiplexing unit 332 supplies the sequence of edit units as a body to the header/footer adding unit 333.

The header/footer adding unit 333 adds the header and the footer supplied from the header/footer generating unit 331 to the body supplied from the multiplexing unit 332, and thereby constructs and outputs a file in the standard AV multiplex format.

The independent/standard converting unit 22 in FIG. 50 performs metadata file processing for processing metadata files, auxiliary file processing for processing an auxiliary file, video file processing for processing a video file, audio file processing for processing an audio file, and synthesizing processing for synthesizing (generating) a file in the standard AV multiplex format using results of these processings.

Accordingly, the metadata file processing, the auxiliary file processing, the video file processing, the audio file processing, and the synthesizing processing performed by the independent/standard converting unit 22 will be described with reference to flowcharts of FIGS. 54 to 58.

Figure 54:
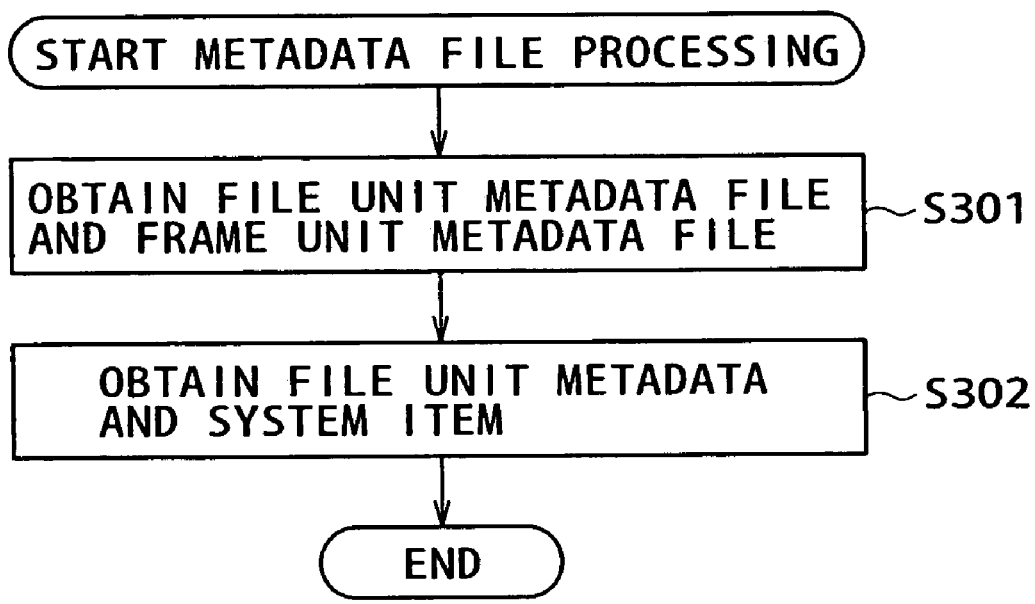
FIG. 54 is a flowchart of assistance in explaining metadata file processing.

The metadata file processing will first be described with reference to the flowchart of FIG. 54.

The metadata file processing is started when the disk drive device 11 reads a master file from the optical disk 7 and stores the master file in the buffer 301, for example.

In first step S301, the file obtaining unit 302 recognizes file names of a file unit metadata file and a frame unit metadata file by referring to the master file stored in the buffer 301. Further, in step S301, the file obtaining unit 302 makes the disk drive device 11 read the file unit metadata file and the frame unit metadata file from the optical disk 7 on the basis of the file names, and thereby obtains the file unit metadata file and the frame unit metadata file via the buffer 301. The file obtaining unit 302 supplies the file unit metadata file and the frame unit metadata file to the metadata file processing unit 303. The process proceeds to step S302. In step S302, the metadata file processing unit 303 extracts file unit metadata from the file unit metadata file supplied from the file obtaining unit 302. The metadata file processing unit 303 also extracts system items having frame unit metadata disposed therein from the frame unit metadata file. The metadata file processing unit 303 then supplies the file unit metadata and the system items to the data synthesizing unit 307. Thereby the metadata file processing is ended.

Figure 55:
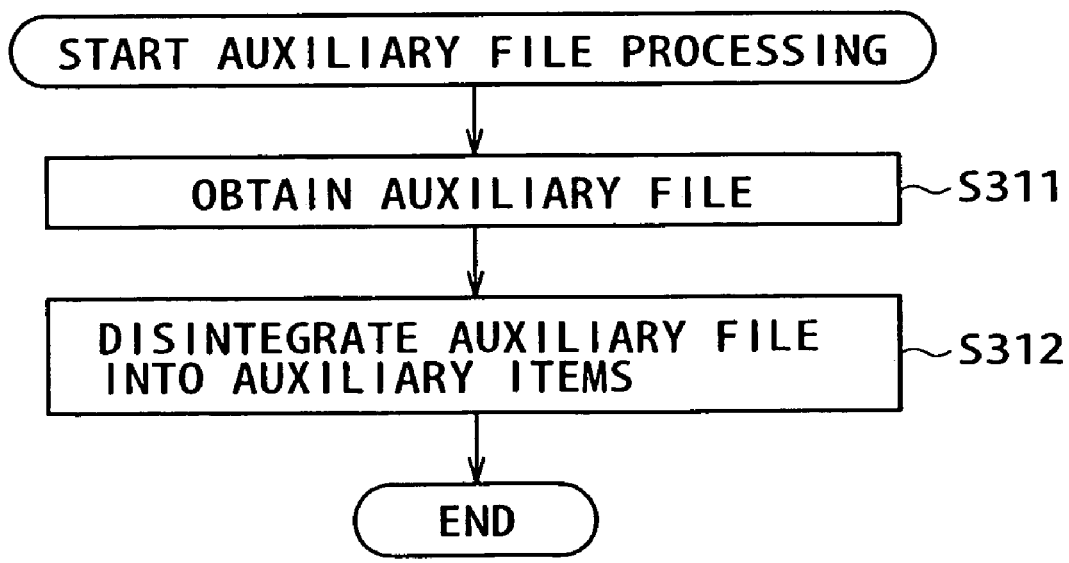
FIG. 55 is a flowchart of assistance in explaining auxiliary file processing.

The auxiliary file processing will next be described with reference to the flowchart of FIG. 55.

The auxiliary file processing is started when the disk drive device 11 reads a master file from the optical disk 7 and stores the master file in the buffer 301, for example.

In first step S311, the file obtaining unit 302 recognizes a file name of an auxiliary file by referring to the master file stored in the buffer 301. Further, in step S311, the file obtaining unit 302 makes the disk drive device 11 read the auxiliary file from the optical disk 7 on the basis of the file name, and thereby obtains the auxiliary file via the buffer 301. The file obtaining unit 302 supplies the auxiliary file to the auxiliary file processing unit 304. The process proceeds to step S312.

In step S312, the auxiliary file processing unit 304 disintegrates the auxiliary file supplied from the file obtaining unit 302 into auxiliary item units, and thereby extracts (obtains) auxiliary items from the auxiliary file. The auxiliary file processing unit 304 then supplies the auxiliary items to the data synthesizing unit 307, whereby the auxiliary file processing is ended.

Figure 56:
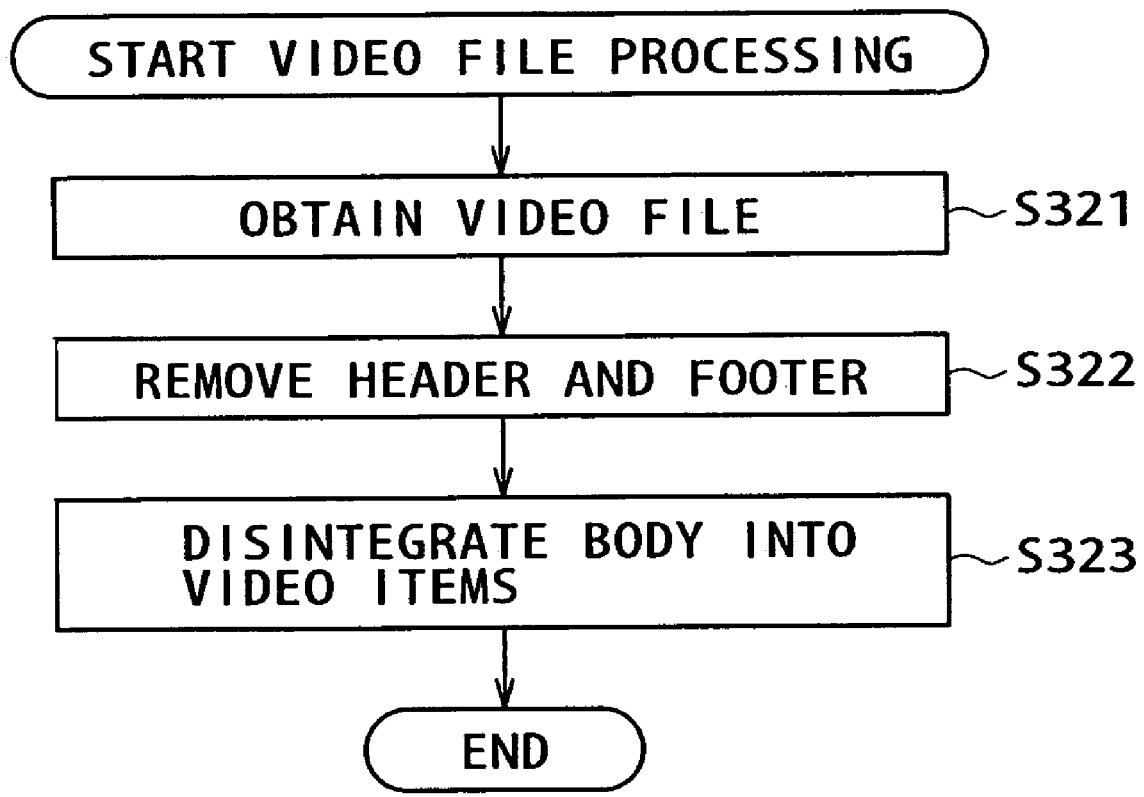
FIG. 56 is a flowchart of assistance in explaining video file processing.

The video file processing will next be described with reference to the flowchart of FIG. 56.

The video file processing is started when the disk drive device 11 reads a master file from the optical disk 7 and stores the master file in the buffer 301, for example.

In first step S321, the file obtaining unit 302 recognizes a file name of a video file by referring to the master file stored in the buffer 301. Further, in step S321, the file obtaining unit 302 makes the disk drive device 11 read the video file from the optical disk 7 on the basis of the file name, and thereby obtains the video file via the buffer 301. The file obtaining unit 302 supplies the video file to the video file processing unit 305. The process proceeds to step S322.

In step S322, the header/footer removing unit 311 of the video file processing unit 305 (FIG. 51) removes a header and a footer from the video file supplied from the file obtaining unit 302. The header/footer removing unit 311 supplies a body remaining as a result of the removal to the disintegrating unit 312. The process proceeds to step S323. In step S323, the disintegrating unit 312 disintegrates a sequence of picture items disposed in the body supplied from the header/footer removing unit 311 into individual picture items. The disintegrating unit 312 supplies the picture items to the data synthesizing unit 307, whereby the video file processing is ended.

Figure 57:
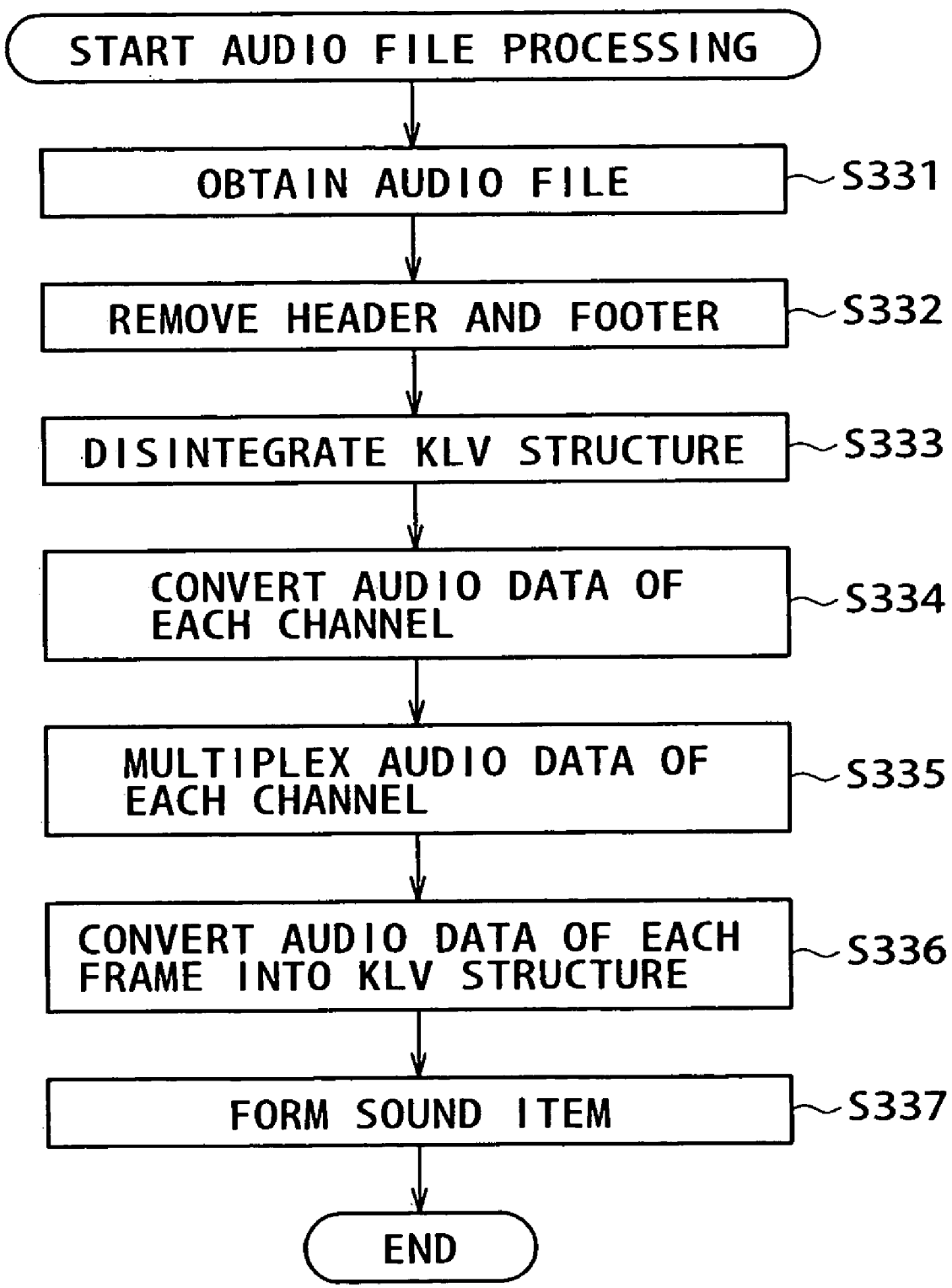
FIG. 57 is a flowchart of assistance in explaining audio file processing.

The audio file processing will next be described with reference to the flowchart of FIG. 57.

The audio file processing is started when the disk drive device 11 reads a master file from the optical disk 7 and stores the master file in the buffer 301, for example.

In first step S331, the file obtaining unit 302 recognizes a file name of an audio file of each of eight channels by referring to the master file stored in the buffer 301. Further, in step S331, the file obtaining unit 302 makes the disk drive device 11 read the audio file of each of the eight channels from the optical disk 7 on the basis of the file name, and thereby obtains the audio file of each of the eight channels via the buffer 301. The file obtaining unit 302 supplies the audio file of each of the eight channels to the audio file processing unit 306. The process proceeds to step S332.

In step S332, the header/footer removing unit 321 of the audio file processing unit 306 (FIG. 52) removes a header and a footer from the audio file of each of the eight channels supplied from the file obtaining unit 302, and then supplies a body of each channel remaining as a result of the removal to the KLV decoder 322. The process proceeds to step S333. In step S333, the KLV decoder 322 disintegrates a KLV structure of the body of each channel supplied from the header/footer removing unit 321. The KLV decoder 322 supplies thereby obtained audio data in the WAVE format of each channel to the data converting unit 323. The process proceeds to step S334.

In step S334, the data converting unit 323 converts the audio data in the WAVE format of each channel supplied from the KLV decoder 322 into audio data in the AES3 format of each channel. The data converting unit 323 then supplies the audio data in the AES3 format of each channel to the channel multiplexing unit 324. The process proceeds to step S335. In step S335, the channel multiplexing unit 324 multiplexes the audio data of each channel supplied from the data converting unit 323. The channel multiplexing unit 324 supplies multiplexed audio data obtained as a result of the multiplexing to the KLV encoder 325. The process proceeds to step S336.

In step S336, the KLV encoder 325 divides the multiplexed audio data supplied from the channel multiplexing unit 324 into units corresponding to respective frames of the video data. The KLV encoder 325 KLV-codes the multiplexed audio data corresponding to the frames into a KLV structure. The process proceeds to step S337. Further, in step S337, the KLV encoder 325 adds a KLV structure of a necessary filler to the KLV structure of the multiplexed audio data corresponding to each frame. The KLV encoder 325 thereby constructs a sound item. The KLV encoder 325 then supplies the sound item to the data synthesizing unit 307, whereby the audio file processing is ended.

Figure 58:
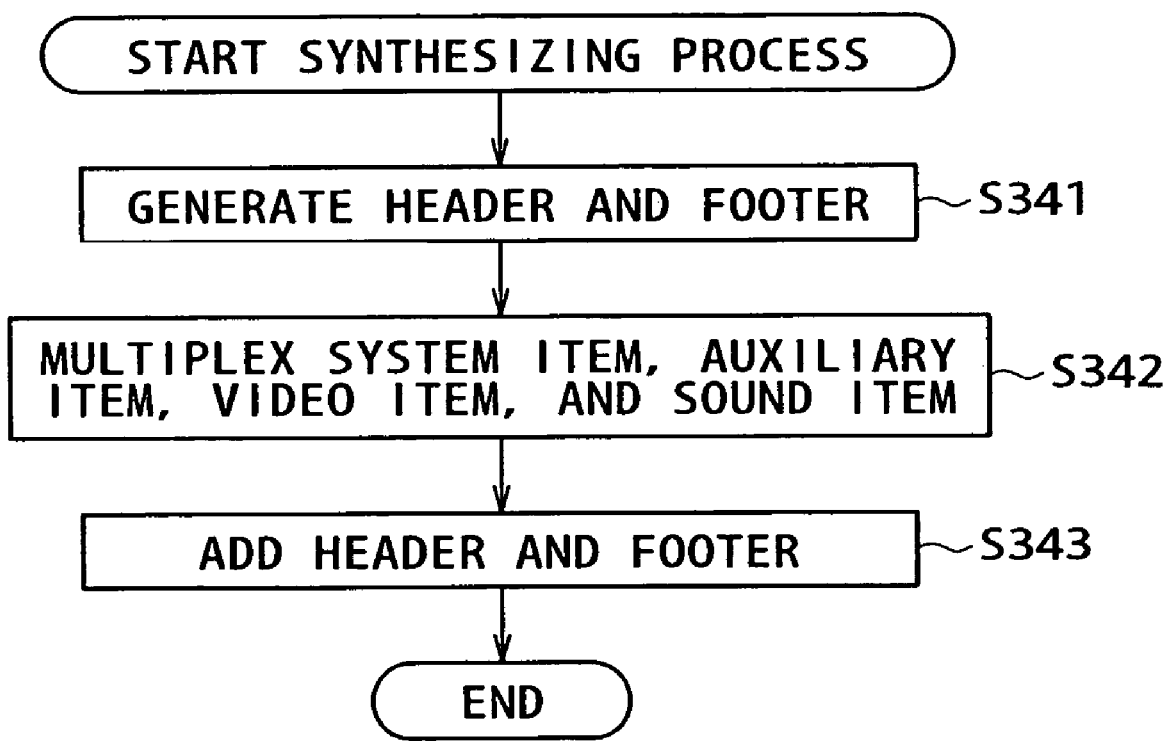
FIG. 58 is a flowchart of assistance in explaining synthesizing processing.

The synthesizing processing will next be described with reference to the flowchart of FIG. 58.

The synthesizing processing is started when the data synthesizing unit 307 is supplied with the file unit metadata and the system items from the metadata file processing unit 303, the auxiliary items from the auxiliary file processing unit 304, the picture items from the video file processing unit 305, and the sound items from the audio file processing unit 306, for example.

In first step S341, the header/footer generating unit 331 of the data synthesizing unit 307 (FIG. 53) generates a header and a footer for a file in the standard AV multiplex format. Further, the header/footer generating unit 331 disposes the file unit metadata from the metadata file processing unit 303 in header metadata of the header. Further, in step S341, the header/footer generating unit 331 supplies the header and the footer thus obtained to the header/footer adding unit 333. The process proceeds to step S342.

In step S342, the multiplexing unit 332 multiplexes the system items outputted by the metadata file processing unit 303, the auxiliary items supplied from the auxiliary file processing unit 304, the picture items supplied from the video file processing unit 305, and the sound items supplied from the audio file processing unit 306. The multiplexing unit 332 supplies a sequence of edit units obtained as a result of the multiplexing as a body to the header/footer adding unit 333. The process proceeds to step S343.

In step S343, the header/footer adding unit 333 adds the header and the footer supplied from the header/footer generating unit 331 to the body supplied from the multiplexing unit 332, and thereby constructs and outputs a file in the standard AV multiplex format. Then the synthesizing processing is ended.

As described above, when data of respective data series is recorded so as to be disposed periodically, convenience of the recording medium can be improved.

Further, when second data logically disposed at a start of a file is generated, and recording control is performed to record the file onto a recording medium such that first data of each data series is recorded so as to be disposed periodically and the second data is recorded next, the convenience of the recording medium is improved, and a reading and a writing process can be performed more efficiently.

The series of processes described above can be carried out not only by hardware but also by software. When the series of processes is to be carried out by software, a program constituting the software is installed onto a general-purpose personal computer or the like.

FIG. 59 shows an example of configuration of an embodiment of the computer on which the program for performing the above-described series of processes is installed.

The program can be recorded in advance on a hard disk 405 or in a ROM 403 as a recording medium included in the computer.

Alternatively, the program can be stored (recorded) temporarily or permanently on a removable recording medium 411 such as a flexible disk, a CD-ROM (Compact Disc Read Only Memory), an MO (Magneto Optical) disk, a DVD (Digital Versatile Disc), a magnetic disk, a semiconductor memory or the like. Such a removable recording medium 411 can be provided as so-called packaged software.

Incidentally, in addition to being installed from the removable recording medium 411 as described above onto the computer, the program can be transferred by wireless from a download site to the computer via an artificial satellite for digital satellite broadcast, or transferred by wire to the computer via a network such as a LAN (Local Area Network), the Internet or the like, and the computer can receive the thus transferred program by a communication unit 408 and install the program onto the built-in hard disk 405.

The computer includes a CPU (Central Processing Unit) 402. The CPU 402 is connected with an input-output interface 410 via a bus 401. When a command is inputted via the input-output interface 410 by a user operating an input unit 407 including a keyboard, a mouse, a microphone and the like, the CPU 402 accordingly executes a program stored in the ROM (Read Only Memory) 403. Alternatively, the CPU 402 loads into a RAM (Random Access Memory) 404 a program stored in the hard disk 405, a program transferred from the satellite or the network, received by the communication unit 408, and then installed on the hard disk 405, or a program read from the removable recording medium 411 loaded in a drive 409 and installed on the hard disk 405, and then executes the program. Thereby, the CPU 402 performs processes according to the above-described flowcharts or processes performed by the configurations of the above-described block diagrams. Then, as required, the CPU 402 for example outputs a result of the processes from an output unit 406 including an LCD (Liquid Crystal Display), a speaker and the like via the input-output interface 410, or transmits the result from the communication unit 408 via the input-output interface 410, and further records the result onto the hard disk 405, for example.

Further, the program may be processed by a single computer, or subjected to distributed processing by a plurality of computers. Further, the program may be transferred to a remote computer and executed by the remote computer.

As described above, interconversion is performed between files in the standard AV multiplex format in which video data and audio data are multiplexed and disposed in a body and files in the AV independent format in which each of video data and audio data is disposed en bloc in a body separately from the other. It is therefore possible, for example, to use the standard AV multiplex format in file transmission (file exchange or streaming) via the network 4, and to use the AV independent format in recording a file onto the optical disk 7.

When a file in the AV independent format is recorded on the optical disk 7, AV independent editing, for example, can be performed easily.

In addition, in the AV independent format, frame unit metadata is collected (en bloc) and disposed in one file (a frame unit metadata file), so that the frame unit metadata can be retrieved quickly.

Further, in the AV independent format, WAVE is used as an audio data encoding system, and therefore a data amount of audio data can be reduced as compared with the standard AV multiplex format using AES3.

Further, since the AV independent format uses a structure of a header, a body, and a footer, which structure is the same as in the standard AV multiplex format, and the header and the footer are in the same format as in the standard AV multiplex format, a standard apparatus supporting the standard AV multiplex format can transmit and receive files in the AV independent format, and read and write files in the AV independent format on a recording medium.

Further, while a plurality of essences such as video data, audio data, user data, and frame unit metadata are multiplexed and disposed in a body of a file in the standard AV multiplex format, only video data or audio data is disposed in a body of a file in the AV independent format (a video file or an audio file in the AV independent format). A file in the AV independent format can therefore be said to be an MXF file having a single essence as a body thereof. An apparatus capable of understanding MXF having a single essence as a body thereof can read contents of a video file or an audio file as an MXF file having a single essence as a body thereof.

It is to be noted that while in the present embodiment, the disk apparatus 1 reads and writes files in the AV independent format on the optical disk 7, files in the AV independent format can be read and written not only to disk-shaped recording media such as the optical disk 7 and the like but also to tape-shaped recording media such as magnetic tapes and the like, semiconductor memories, and the like.

Also, while in the embodiment of FIG. 1, the disk drive device 11, the format converting unit 12, and the communication I/F 13 form the disk apparatus 1 as one apparatus, the disk drive device 11, the format converting unit 12, and the communication I/F 13 can each be one independent apparatus.

In addition, in the present embodiment, files complying with MXF are used as files in the standard AV multiplex format; however, in addition to files complying with MXF, files including a header, a body, and a footer and having two arbitrary pieces of data (or more) multiplexed and disposed in the body can be used as files in the standard AV multiplex format.

Further, in the present embodiment, video data and audio data are multiplexed and disposed in a body of a file in the standard AV multiplex format; however, in addition to this, two or more multiplexed pieces of video data (streams) or two or more multiplexed pieces of audio data (streams), for example, can be disposed in a body of a file in the standard AV multiplex format.

INDUSTRIAL APPLICABILITY

As described above, according to the first invention, the convenience of the recording medium can be improved.

Further, according to the first invention, the convenience of the recording medium is improved, and a reading and a writing process can be performed more efficiently.

According to the second invention, the convenience can be improved.

Further, according to the second invention, the convenience is improved, and a reading and a writing process can be performed more efficiently.

The invention claimed is:

1. A recording control apparatus for controlling recording a file of first data of each of a plurality of data series onto a recording medium, said recording control apparatus comprising:

means for generating second data that is logically disposed at a start of said file;

means for generating third data, that is logically disposed at an end of said file, that makes data amounts of said first data and said second data integral multiples of a unit of reading and writing of said recording medium, by being added to said first data or said second data;

means for generating a file unit metadata file in which header metadata is disposed and a frame unit metadata file in which system items of edit units are disposed en bloc, wherein system items include metadata of each edit unit;

a master file generating means for generating a master file in an audio-visual independent format, where the file unit metadata and the frame unit metadata are brought together into one file separately from each other and file names are generated for each of a plurality of video files, the respective audio files of a plurality of channels, a file unit metadata file, a frame unit metadata file, and an auxiliary file, and a link to the file of each file name is generated; and means for performing recording control to record said file onto said recording medium such that said first data is recorded so as to have data amount of an integral multiple of said unit of reading and writing of said recording medium by adding said third data onto said recording medium such that boundaries of said first data coincide with boundaries of said unit, and to record said second data made to have the data amount of an integral multiple of said unit by adding said third data onto said recording medium such that boundaries of said second data coincide with boundaries of said unit.

2. A recording control method for controlling recording a file of first data of each of a plurality of data series onto a recording medium, said recording control method comprising:

a step for generating second data that is logically disposed at a start of said file;

a step for generating third data that is logically disposed at an end of said file, that makes data amounts of said first data and said second data integral multiples of a unit of reading and writing of said recording medium, by being added to said first data or said second data;

a step of generating a file unit metadata file in which header metadata is disposed and a frame unit metadata file in which system items of edit units are disposed en bloc, wherein system items include metadata of each edit unit;

a step of generating a master file in an audio-visual independent format, where the file unit metadata and the frame unit metadata are brought together into one file separately from each other and file names are generated for each of a plurality of video files, the respective audio files of a plurality of channels, a file unit metadata file, a frame unit metadata file, and an auxiliary file, and a link to the file of each file name is generated; and a step for performing recording control to record said file onto said recording medium such that said first data is recorded so as to have data amount of an integral multiple of said unit of reading and writing of said recording medium by adding said third data onto said recording medium such that boundaries of said first data coincide with boundaries of said unit, and to record said second data made to have the data amount of an integral multiple of said unit by adding said third data onto said recording medium such that boundaries of said second data coincide with boundaries of said unit.

3. A recording medium containing a computer-executable program for making the computer perform a recording control process for controlling recording a file of first data of each of a plurality of data series onto a recording medium, said recording control process comprising:

a step for generating second data that is logically disposed at a start of said file;

a step for generating third data that is logically disposed at an end of said file, that makes data amounts of said first data and said second data integral multiples of a unit of reading and writing of said recording medium, by being added to said first data or said second data;

a step of generating a file unit metadata file in which header metadata is disposed and a frame unit metadata file in which system items of edit units are disposed en bloc, wherein system items include metadata of each edit unit;

a step of generating a master file in an audio-visual independent format, where the file unit metadata and the frame unit metadata are brought together into one file separately from each other and file names are generated for each of a plurality of video files, the respective audio files of a plurality of channels, a file unit metadata file, a frame unit metadata file, and an auxiliary file, and a link to the file of each file name is generated; and a step for performing recording control to record said file onto said recording medium such that said first data is recorded so as to have data amount of an integral multiple of said unit of reading and writing of said recording medium by adding said third data onto said recording medium such that boundaries of said first data coincide with boundaries of said unit, and to record said second data made to have the data amount of an integral multiple of said unit by adding said third data onto said recording medium such that boundaries of said second data coincide with boundaries of said unit.

* * * * *